United States Patent [19]
Park et al.

[11] Patent Number: 5,748,231
[45] Date of Patent: May 5, 1998

[54] ADAPTIVE MOTION VECTOR DECISION METHOD AND DEVICE FOR DIGITAL IMAGE STABILIZER SYSTEM

[75] Inventors: Yong-Chul Park, Incheon; Joon-Ki Paik; Dong-Wook Kim, both of Seoul, all of Rep. of Korea

[73] Assignee: Samsung Electronics Co., Ltd., Suwon, Rep. of Korea

[21] Appl. No.: 72,785

[22] Filed: Jun. 7, 1993

[30] Foreign Application Priority Data

Oct. 13, 1992 [KR] Rep. of Korea ............... 18833/1992
Feb. 27, 1993 [KR] Rep. of Korea ............... 2996/1993

[51] Int. Cl.$^6$ ................................................. H04N 5/228
[52] U.S. Cl. ................................ 348/208; 348/699
[58] Field of Search ........................ 382/1; 348/208, 348/699, 700; 354/430, 410

[56] References Cited

U.S. PATENT DOCUMENTS

| | | | |
|---|---|---|---|
| 4,760,606 | 7/1988 | Lesnick et al. | 382/306 |
| 4,984,074 | 1/1991 | Uomori et al. | 348/699 |
| 5,107,293 | 4/1992 | Sekine et al. | 396/55 |
| 5,208,667 | 5/1993 | Saunders | 348/452 |
| 5,237,405 | 8/1993 | Egusa et al. | 348/208 |

OTHER PUBLICATIONS

Automatic Image Stabilization by Full Digital Signal Processing, Uomori et al., IEEE Trans. on Consumer Electronics—Aug. 1990.

An Edge Detection Approach to Digital Image Stabilization Based on Tri-State Adaptive Linear Neurons, Paik et al., IEEE Transactions on Consumer Electronics—Aug. 1991.

*Primary Examiner*—Andrew Faile
*Assistant Examiner*—Andrew B. Christensen
*Attorney, Agent, or Firm*—Allen LeRoy Limberg

[57] ABSTRACT

A digital image stabilization device receives correlation data generated from a plurality of local motion estimation areas and adaptively decides a motion vector according to irregular image environment. To do this, statistical variables and local motion vector are generated to check reliability by checking correlation values generated from each local motion estimation area. Then, it is determined that there is irregular image data deteriorating reliability of local motion vector, by analyzing statistical variables. Here, the irregular image environment can be in an image signal with low contrast, an image signal with a moving object, an image signal with repeated motion, etc. Also, isolativity and stability are obtained by analyzing local motion vector and a weight signal is generated with a predefined rate according to a computed result. Then, the output of the weight signal is controlled, according to a result of the reliability determination signal, where if there is irregular image data, the output of weight signal is blocked. And, a field motion vector is generated by multiplying a weight signal by a corresponding local motion vector and then averaging them. Finally, an accumulated motion vector is generated by attenuating a previous accumulated motion vector and adding the attenuated previous accumulated motion vector into the field motion vector.

70 Claims, 16 Drawing Sheets

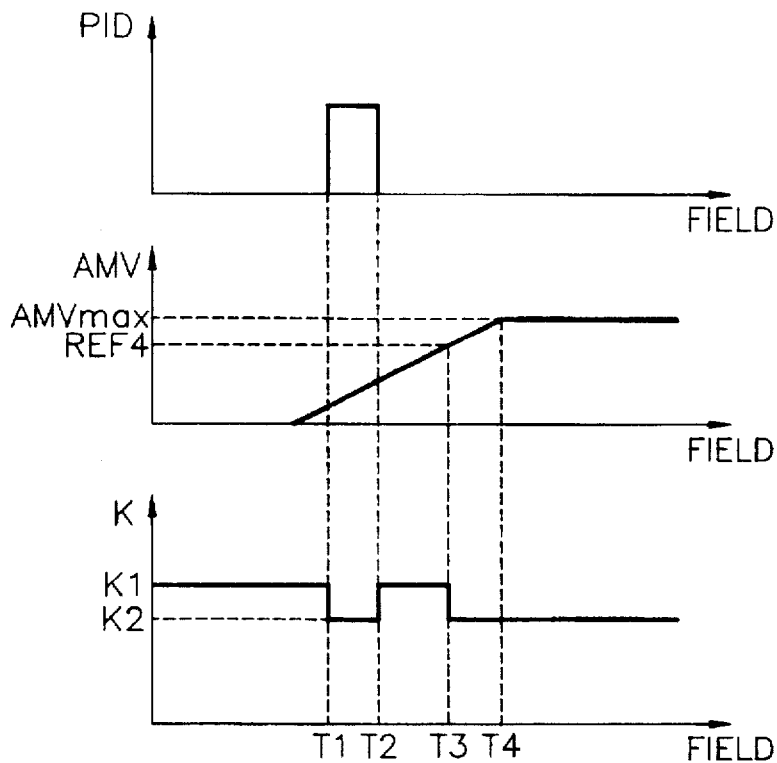
FIG. 12A
FIG. 12B
FIG. 12C
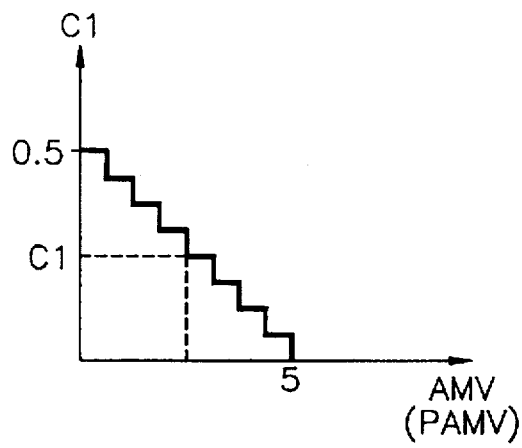
FIG. 15A
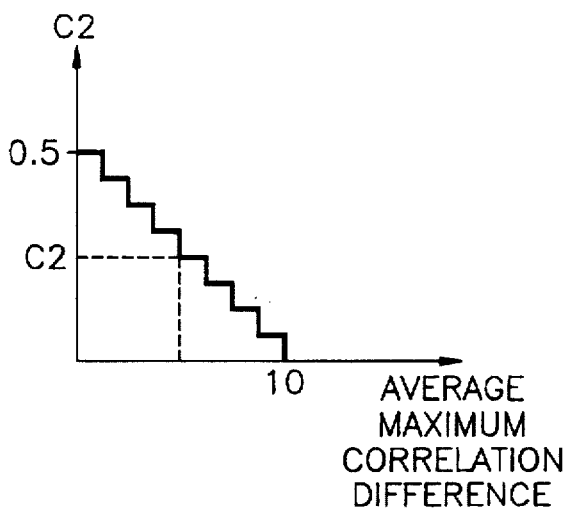
FIG. 15B

ADAPTIVE MOTION VECTOR DECISION METHOD AND DEVICE FOR DIGITAL IMAGE STABILIZER SYSTEM

BACKGROUND OF THE INVENTION

The present invention relates to an image stabilization device and method and more particularly to a device and method for an image stabilization system, which can adaptively decide motion vectors for image stabilization.

Generally, a video camera has been developed with the trend preferring miniaturization, reduced weight, multiple functions provided with digital zooming of high magnification and special effects, etc. Here, fluctuation of image is provided by hand-fluctuation during photographing with a camera and is magnified when a long-distance object to be photographed is zoomed by optical or digital zooming. Accordingly, a correction function given by a digital image stabilization system (hereinafter, referred to as DIS system) for providing a stabilized image is essential in such irregular environments including that in a car.

In the concept of DIS system, a motion vector between two temporally consecutive image frames is decided, and then the position of following image frame is moved in the backward direction of the previously detected motion vector, thereby stabilizing the fluctuating image. As a conventional digital stabilization method for the above function, a technique for implementing detection of hand-fluctuation by an angular velocity sensor with control of mechanical image optical system has been disclosed by Oshima et. al. (M. Oshima, et. al., "VHS camcorder with electronic image stabilizer," *IEEE Trans. Consumer Electronics*, vol.35 ,no.4, pp.749–758,November 1989). The above Oshima's image stabilization method uses a gyro sensor for sensing angular velocity of undesirable camera motion, and compensates the image fluctuation by rotating the lens unit. However, the image stabilization method has a problem in that it is not proper in the trend requiring the product having miniaturization and reduced-weight.

A DIS system detects a degree of hand-fluctuation by only digital signal process of image and compensates the hand-fluctuation by LSI technique for adaptively controlling the system by discriminating the image characteristic. To implement such a DIS system, a motion estimation unit for estimating motion of image by minimum hardware and algorithm for adaptively deciding motion vector in varied conditions are important elements. As the motion estimation unit, there are an edge matching technique using a tri-state adaptive linear neurons (ADALINES) on the assumption of block matching algorithm (BMA) proposed by Paik et.al. (J. K. Paik, Y. C. Park, S. W. Park. "An Edge Detection Approach to Digital Image Stabilization Based on Tri-State Linear Neurons" *IEEE Trans. Consumer Electronics*, vol.37, no.3,pp.521–530, August 1991), a BERP(Band Extract Representative Point) matching technique proposed by Umori et.al. (K. Umori,et.al., "Automatic Image Stabilizing System Full-Digital Signal Processing," *IEEE Trans. Consumer Electronics*, vol.36, no.3, pp.510–519, August 1990), a three-step search method proposed by Komarek et. al., (T. Komarek. et. al., "VLSI Architecture for Hierachical Block Matching Algorithms," *IEEE Trans. Consumer Electronics*, pp.45–48, August 1990). etc.

Generally, the DIS system compensates the whole motion of screen by a motion vector detected in each field and has M local motion vector estimation areas in edges by expecting that motion of main object to be photographed will exist in central area according to image characteristic. The respective local motion vectors are obtained from the M motion estimation areas by the motion vector estimation unit, and various formed correlation data of these vectors become an input of motion decision unit. The local motion vector decided as described above can be differently detected according to the state of object to be photographed and accordingly, a field motion vector representing optimum motion of video camera is adaptively determined according to the image state by the motion decision unit. Umori et alii suggest a method in which local motion vectors and the measurements of correlation within the M motion estimation area are used to determine which of the local motion vectors are presumably valid, and the most representative one of these valid local motion vectors is selected as the field motion vector. Instead of doing this, Paik, Park and Park use a weighted averaging of local motion vectors (LMVs) within each field to generate the field motion vector (FMV) for that field, the weights being chosen such that more reliable ones of the local motion vectors weigh more heavily in the averaging than the less reliable ones. As long as the LMVs are similar, weighted averaging of the LMVs in a field to generate the FMV, rather than selecting the most representative one of the LMVs in a field to generate the FMV, improves the signal-to-noise ratio of the FMV by a few dB. This is because noise is randomly directed in the MEAs while camera shake is uniformly directed. So, in the averaging, actual camera motion tends always to combine constructively while the noise randomly combines.

The method suggested by Umori causes a problem in being implemented with pure hardware because of the use of microcomputer. However, the motion decision can be implemented only with hardware by using an edge matching technique in motion estimation, and accordingly, the processing speed can be faster.

And, the conventional image stabilizing method for the DIS system divides the whole picture into a plurality of small pictures, from which corresponding local motion vectors are respectively obtained, and then are combined by a proper way, thereby deciding a whole motion vector. However, in the above method, motion vector can be falsely detected due to the effect of irregular environment of image, noise, etc., and accordingly, the whole system becomes unstable, thereby causing a hindrance function against image stabilization. The undesirable image conditions can be in intentional panning of a camera, in an image with low contrast, in an image with repeated form, in an image with a moving object, in an image having two or more diverging local motion vectors, and in an image having temporally and minutely changed motion vector due to noise, etc. Accordingly, a DIS system should stabilize image by adaptively deciding motion vector even if the undesirable image is generated.

SUMMARY OF THE INVENTION

Accordingly, it is an object of the present invention to provide a device and method for a DIS system, for adaptively deciding motion vectors by determining environment of image and the form of an object to be photographed.

It is another object of the present invention to provide an adaptive motion vector decision device and method for a DIS system, which uses correlation by block-matching.

It is still another object of the present invention to provide a device and method for a DIS system, for continuously and uniformly stabilizing an image regardless of motion frequency while the motion does not exceed a predetermined range.

It is yet another object of the present invention to provide a device and method for a DIS system, for stabilizing an image corresponding to the generation of intentional panning of a camera. It is yet still another object of the present invention to provide a device and method for a DIS system, which can stabilize an image having low contrast.

It is a further object of the present invention to provide a device and method for a DIS system, which can stabilize an image with repeated form.

It is still a further object of the present invention to provide a device and method for a DIS system, which can stabilize an image with moving objects.

One more object of the present invention to provide a device and method for a DIS system, which can stabilize an image whose motion vector is temporally and minutely changed due to a noise.

To achieve the objects of the present invention, the present invention comprises:

means for receiving digital image data generated from a camera, converting the received image data into binary edge data, sequentially generating correlation data in local motion estimation areas by matching patterns of current field and previous field edge data, and sequentially generating statistical variables and local motion vectors of corresponding local motion estimation areas by analyzing the generated correlation data;

means for receiving the sequentially generated local motion vectors and statistical variables, computing weights by computing isolativity and stability of the local motion vector, and generating a field motion vector, by multiplying the computed weights by the corresponding local motion vectors and then operating the multiplied result by a field period;

means having attenuator means, for receiving the field motion vector and correlation, identifying existence or absence of intentional panning from the field motion vector, selecting an attenuation value of the attenuator means according to existence of generation of a panning identification signal PID, and generating and simultaneously supplying to the attenuator means the accumulated motion vector by accumulating the received field motion vector into a previous accumulated motion vector generated from the attenuator means;

a memory for receiving the image data and storing it in the unit of field; and a control portion for controlling a stable image picture by adaptively compensating a motion vector included in image data by controlling the memory.

BRIEF DESCRIPTION OF THE DRAWINGS

The above objects and other advantages of the present invention will become more apparent by describing the preferred embodiments of the present invention with reference, to the attached drawings, in which;

FIG. 12 is a view for explaining the selection of proper attenuation-coefficient according to the state of previous accumulated motion vector and the existence or absence of panning in the accumulated motion vector generation unit shown in FIG. 11;

FIG. 15A is a view showing correlation characteristic between the accumulated motion vector and the error vector compensating value processed in the first error vector compensation deciding block shown in FIG. 14, and FIG. 15B is a view showing correlation characteristic between average maximum correlation difference and error vector compensating value in the second error vector compensation deciding block;

DETAILED DESCRIPTION OF THE INVENTION

Figure 1:
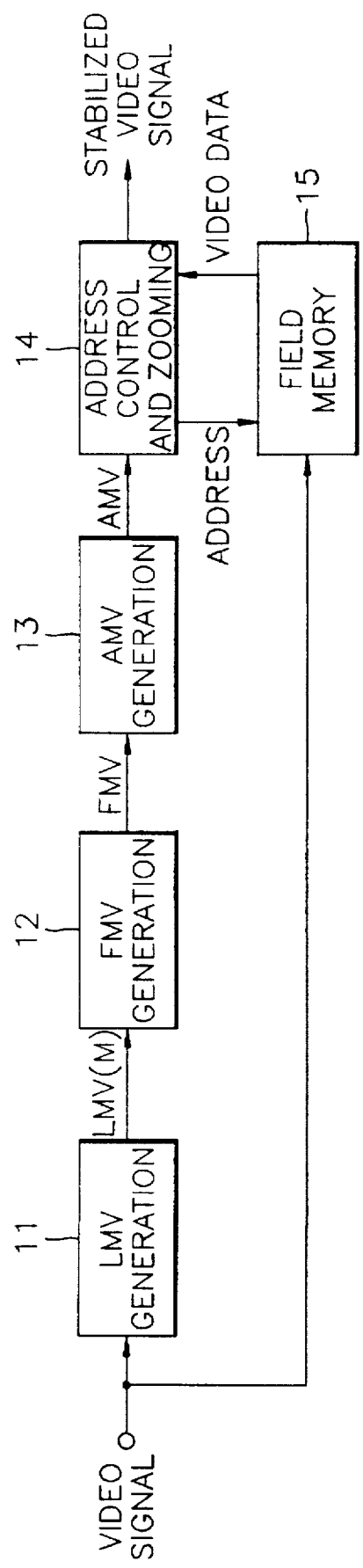
FIG. 1 is a constitution diagram showing a first embodiment of a DIS system according to the present invention.

It is noted that identical constituent elements in the drawings are represented with identical reference numerals wherever they are, if possible. In the following description, the contents described as an example with specific numeral data are provided to help the overall understanding of the present invention. The present invention is described assuming a step of dividing one-field area into four local motion estimation areas and processing the divided areas. Accordingly, it is clear for those skilled in the art that the present invention can be done with modifying the data.

FIG. 1 is a constitution diagram of a first embodiment of a DIS system according to the present invention, in which digital image data generated from a camera is supplied to a local motion vector generation unit 11 and a field memory 15. The local motion vector generation unit 1 1 receives digital image data, detects binary edge signal of current field from the received image data, computes correlation with comparison between two consecutive fields by block-matching patterns of detected current-field binary edge signal and previous-field binary edge signal in local motion estimation area, and generates local motion vector (hereinafter referred to as LMV) and statistical variables of corresponding local motion estimation area using the correlation data. A field motion vector generation unit 12 coupled to an output terminal of the LMV generation unit 11 receives LMVs and statistical variables. The field motion vector generation unit 12 generates a field motion vector (hereinafter referred to as FMV) showing a complete one-field motion from the received LMVs and statistical variables. An accumulated motion vector generation unit 13 coupled to an output terminal of the FMV generation unit 12 generates an accumulated motion vector (hereinafter referred to as AMV) for stabilizing the fluctuation between consecutive fields into an initial state, by accumulating the received FMVs. The field memory 15 receives and stores the image data and reads and outputs the image data stored in corresponding area by a received read address. An address control and zooming process unit 14 performs a digital zooming process, which generates a read address from the AMV received from the AMV generation unit 13, to supply it to the field memory 15, and at the same time, receives the image data read from the field memory 15, to compensate blank data of the contour by motion compensation. That is, the address control and zooming process unit 14 performs a digital zooming process step for image data received from the field memory by a read address, so as to compensate blank data of the contour by motion compensation through the above steps. And the digital zooming process outputs a finally stabilized image by zooming a predetermined portion of image with interpolation of the image signal.

In such a DIS system shown in FIG. 1, to determine motion vector between two consecutive images, i.e., a reference image and a compared image, the LMV generation unit 11 first sets proper positions of received image data in a local motion estimation area (hereinafter referred to as MEA). Then, the LMV generation unit 11 compares image data of MEA having a reference image with image data of corresponding MEA having compared images. At this time, each compared image in the MEA is shifted by corresponding LMV candidate. When image data of the reference MBA and each compared MEA are respectively compared, correlation values are assigned into corresponding motion vector candidates, respectively. Among a plurality of motion vector candidates, one having a maximum correlation value is selected and outputted as a corresponding LMV. Also, to more reliably determine a motion vector, the LMV generation unit 11 divides one field into M MEAs and determines the different M LMVs in a time order. In the above determination of LMVs, the present invention uses binary edge image data instead of using real image data or filtered multiple-bit image data, so as to reduce the number of hardware for computation and storage means. Accordingly, using the above edge pattern matching technique in the generation of the LMV, hardware of DIS system can be greatly reduced and consecutive image data can be uniformly stabilized regardless of motion frequency while the motion of image data does not exceed a predetermined range.

And, a FMV can be obtained by properly combining the generated LMVs. To do this, the FMV generation unit 12 receives M LMVs from the LMV generation unit 11 to obtain a FMV which is a desired motion vector between reference field and compared field. To generate such a FMV, the FMV generation unit 12 adaptively determines weights for isolativity and stability of each LMV and combines the weights determined as described above with LMV. Also, the AMV generation unit 13 receiving an output of the FMV generation unit 12 accumulates consecutively received FMVs to generate an AMV, so as to further stabilize the fluctuation of image data between two consecutive fields. The address control and zooming process unit 14 receives the AMV outputted from the AMV generation unit 13 and controls the output of image data stored in the field memory 15, thereby compensating the motion. That is, the address control and zooming process unit 14 receives the AMV of the AMV generation unit 13, thereby computing a read address of the field memory 15, and the field memory 15 outputs image data stored in corresponding area. At this time, the address control and zooming process unit 14 compensates blank data of the contour generated in the motion of image data, where a finally stabilized image is outputted by zooming a constant portion of received image data with an interpolation method.

As described above, the DIS system of the present invention mainly comprises five constituent units which are the LMV generation unit 11, the FMV generation unit 12, the AMV generation unit 13, the address control and zooming process unit 14, and the field memory 15. In the constituent units, image data are adaptively compensated according to variously generated irregular conditions of image data. The above irregular conditions can be in a picture moved by intentional panning, in an image received with low contrast, in an image with repeated form, in an image with a moving object, and in an image having a noise component in a motion vector. The condition in the generation of intentional panning is an irregular condition deteriorating the AMV, and the other conditions are irregular conditions deteriorating LMV.

An operation of first embodiment for the present DIS system having the constitution shown in FIG. 1 is described.

Figure 2:
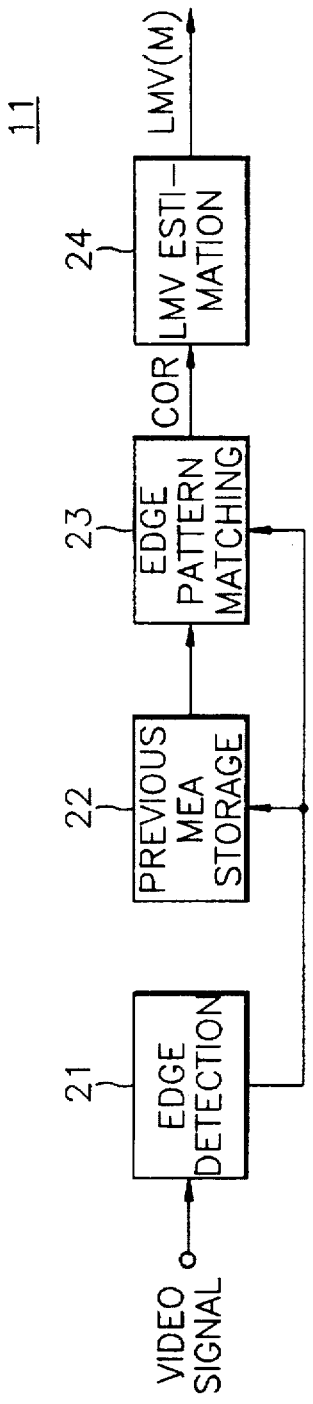
FIG. 2 is a constitution diagram of a local motion vector generation unit, as shown in FIG. 1, which converts a received image signal into a binary edge signal, computes correlation by matching patterns of current-field binary edge signal and previous-field binary edge signal in local motion estimation area, and generates a local motion vector and statistical variables in each local motion estimation area using the computed correlation.

FIG. 2 shows a constitution diagram of the LMV generation unit 1 1 shown in FIG. 1, in which an edge detection block 21 receives image data and detects and outputs binary edge data from the received real-time image data, i.e., image data of current field. The constitution and operation of the edge detection block 21 has been disclosed in detail in Korean Patent Application no. 91-4871 previously filed by Samsung Electronics Co., Ltd. The edge detection block 21 supplies the binary edge data to an edge pattern matching block 23 and to a previous MEA storage block 22. The previous MEA storage block 22 composed of M MEAs scans binary edge data of present field received from the edge detection block 21 in the unit of MEA and stores it in corresponding MEA. Accordingly, the previous MEA storage block 22 delays binary edge data stored in each MEA for a one-field period, and outputs delayed binary edge data to the edge pattern matching block 23 when LMV is detected from corresponding MEA. The edge pattern matching block 23 receives current-field binary edge data from the edge detection block 21, and previous-field binary edge data of each corresponding MEA from the previous MEA storage block 22. The edge pattern matching block 23 pattern-matches in the unit of MEA the current binary edge data and previous field binary edge data, thereby outputting M correlation data CORs. The constitutions and operations of the previous MEA storage block 22 and the edge pattern matching block 23 have been disclosed in detail in the previously Korean Patent Application No. 91-10201 previously filed by Samsung Electronics Co., Ltd. The LMV estimation block 24 receives an output of the edge pattern matching block 23 and generates LMVs of the respective corresponding MEAs from the received correlation values CORs.

Figure 3A:
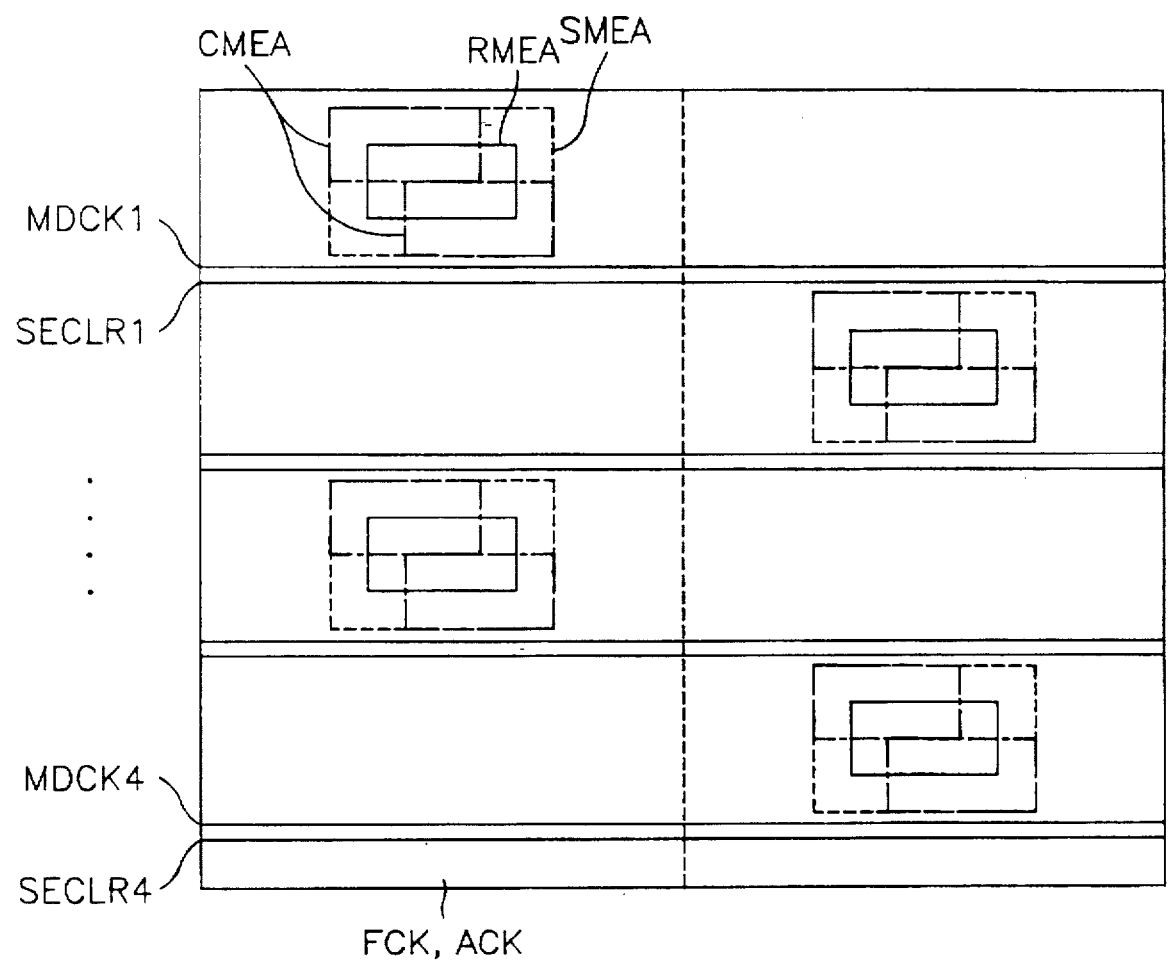
FIG. 3A is a view for explaining the generation of correlation data by pattern-matching the binary edge signals in local motion estimation area, as shown in FIG. 2.
Figure 3B:
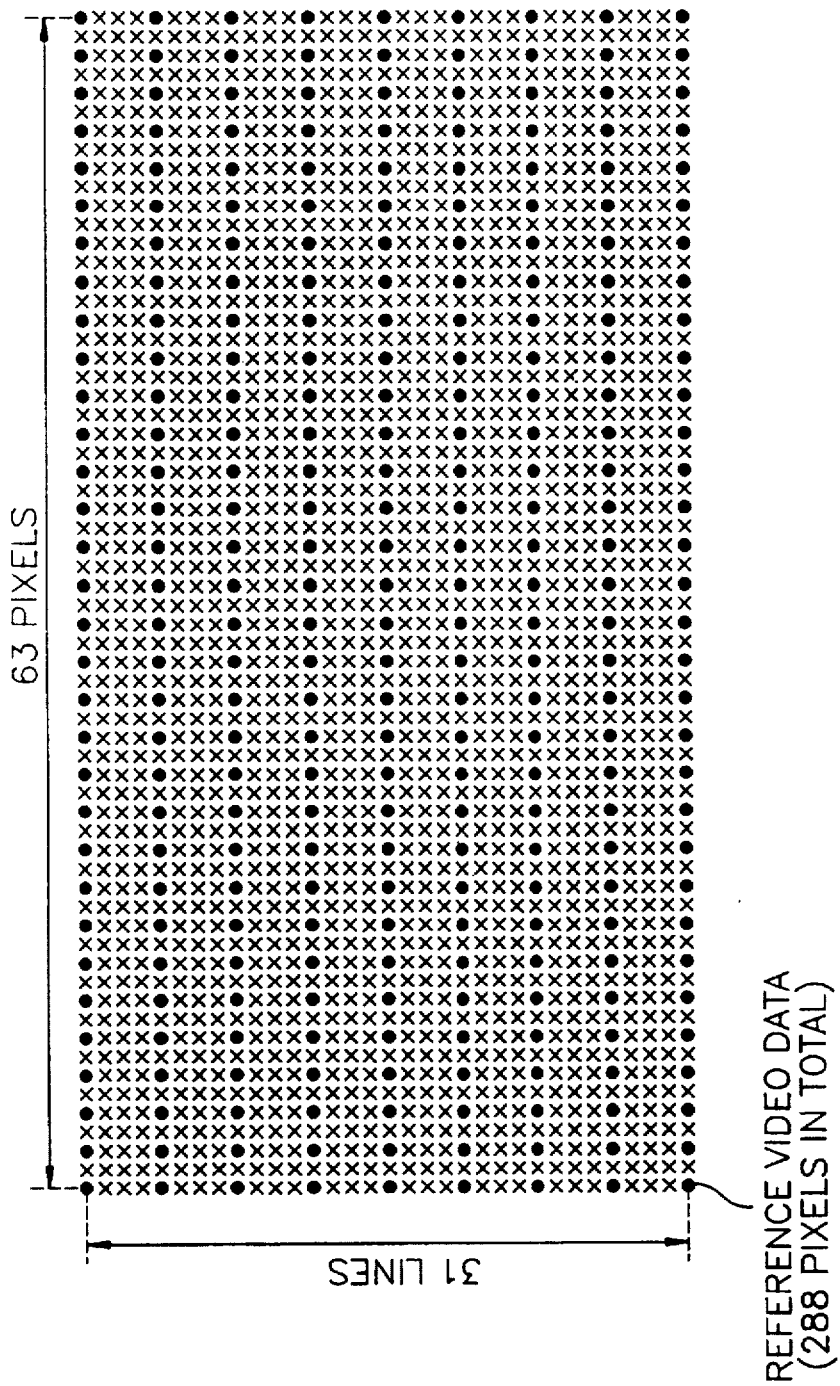
FIG. 3B is a view showing a form of pixels constituting each local motion estimation area in FIG. 3A.

FIG. 3A is a view showing a step, according to the present invention, of converting one-field image data into binary edge signal and then generating a LMV of corresponding area in the unit of MEA, and shows an example composed of four local MEAs. And, each MEA has a search motion estimation area (hereinafter referred to as SMEA) around a reference motion vector estimation area (hereinafter referred to as RMEA), and two compared motion vector estimation areas (hereinafter referred to as CMEAs) are within the SMEA. FIG. 3B is a view showing the number of image data in RMEA and CMEA, where the number of constituent pixels of the MEA is assumed as 32*9 in the present invention. Pixels in each row are odd or even pixels selected from 63 pixels by selecting one pixel from two pixels. Pixels in each column are composed by selecting each pixel with a four-line period. Accordingly, the pixels in the MEA need to be composed of 63 pixels in row direction and 31 lines in column direction.

Figure 3C:
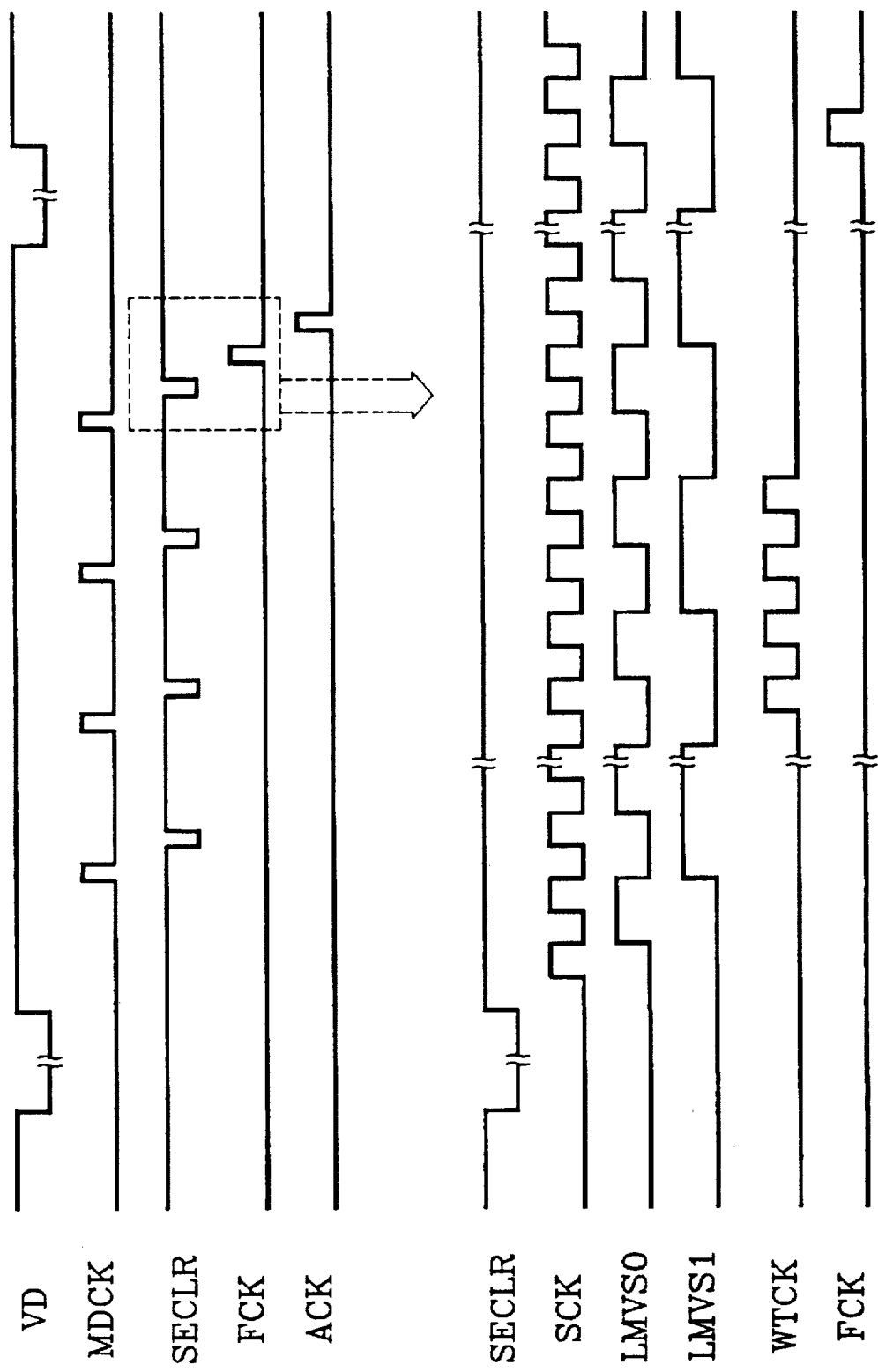
FIG. 3C is a view showing the timing at the respective portions according to the present invention.

FIG. 3C shows several timing signals used in the present invention, where the VD represents a vertical sync signal, the MDCK is a sampling clock of LMV generated in the ending of search in MEA shown in FIG. 3A for one-field period, the SECLR is a clear signal for clearing information in previous MEA after generation of the MEDK and detecting information of next MEA, the FCK is a FMV sampling clock for generating the FMV, and the ACK represents an AMV sampling clock for generating the AMV. Also, a FMV is generated by sequentially processing information of MEAs generated and stored until now between the SECLR and FCK, in which the SCK represents a sampling clock of image data, LMVS0 and LMVS1 represent control signals for sequentially selecting corresponding LMV and weight signal when the FMV is generated, and the WTCK represents a clock for multiplication and addition of a weight signal corresponding to each LMV and a LMV.

Figure 4:
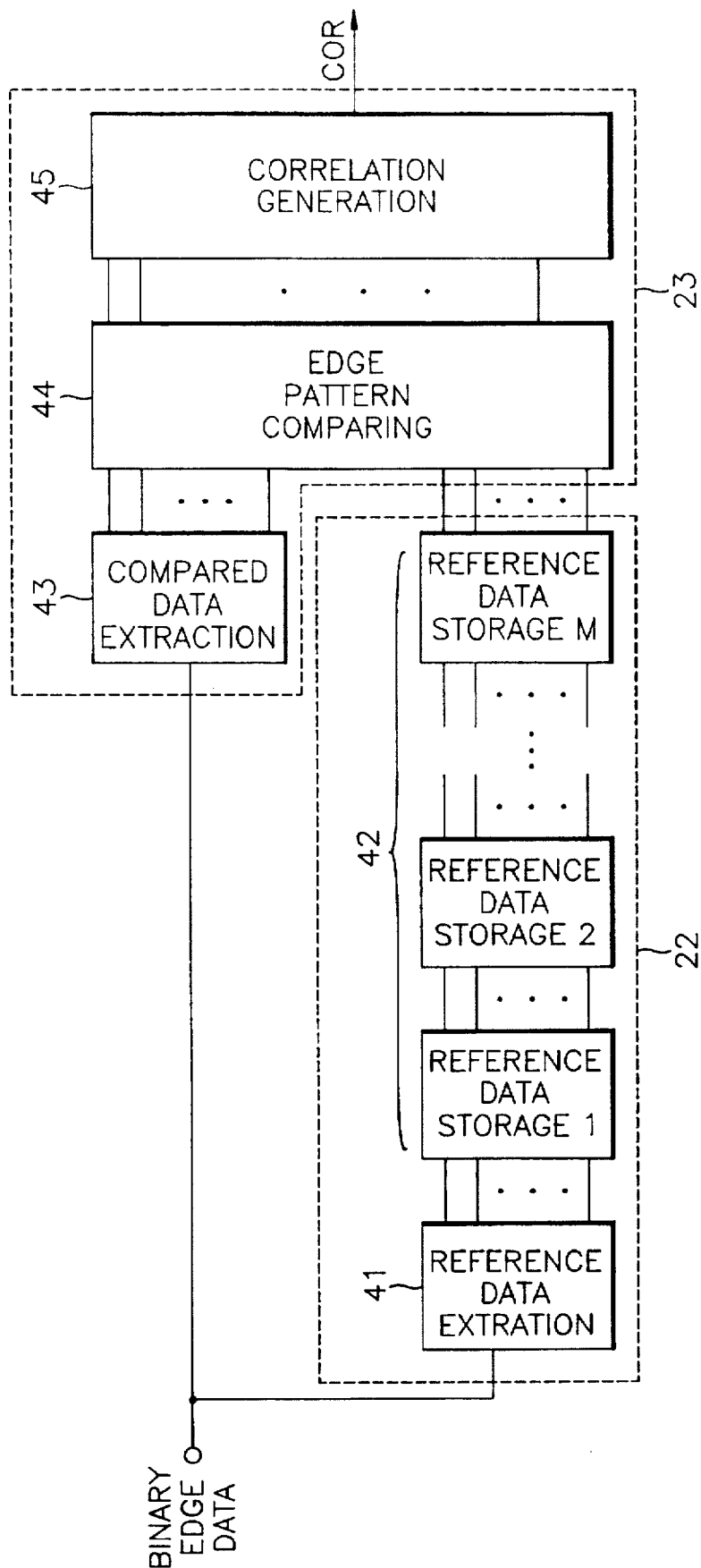
FIG. 4 is a view showing the constitutions of a previous-field motion-estimation-area storage block and an edge pattern matching block, shown in FIG. 2.

FIG. 4 shows the constitution of previous MEA storage block 22 and edge pattern matching block 23 shown in FIG. 2. Here, the previous MEA storage block 22 should store data of RMEA of each MEA in one-field image.

Accordingly, a reference data extraction portion 41 extracts binary edge signals corresponding to the position of RMEA of each MEA from one-field binary edge signal outputted from the edge detection block 21. The binary edge signal outputted from the reference data extraction portion 41 becomes reference data composed of 32*9=288 pixels. Reference data storage portions 42 receiving the output of reference data extraction portion 41 store reference data generated from the RMEAs. Accordingly, the reference data storage portions 42 whose number corresponds to the number of MEAs, shift and store the received reference area data, whenever MEA is moved. The reference data storage portion 42 outputs the reference area data to the edge pattern matching block 23 after a delay for an one-field period.

In the edge pattern matching block 23, a compared data extraction portion 43 receives an output of the edge detection block 21 and generates the received binary edge signal as area data of 32*9(288) pixels as shown in FIG. 3B. The edge pattern comparing portion 44 receives an output of the compared data extraction portion 43 as compared area data, and an output of the reference data storage portion 42 as reference area data. The edge pattern comparing portion 44 compares the edge patterns of the two area data in unit of pixel and then outputs the result. A correlation generation portion 45 receives an output of the edge pattern comparing portion 44 and generates correlation data COR by computing the number of pixels having the same logic from the comparing signals of compared pixels. Here, the block data are composed of 288 pixels, and the correlation data COR is generated as 9-bit data.

Figure 5:
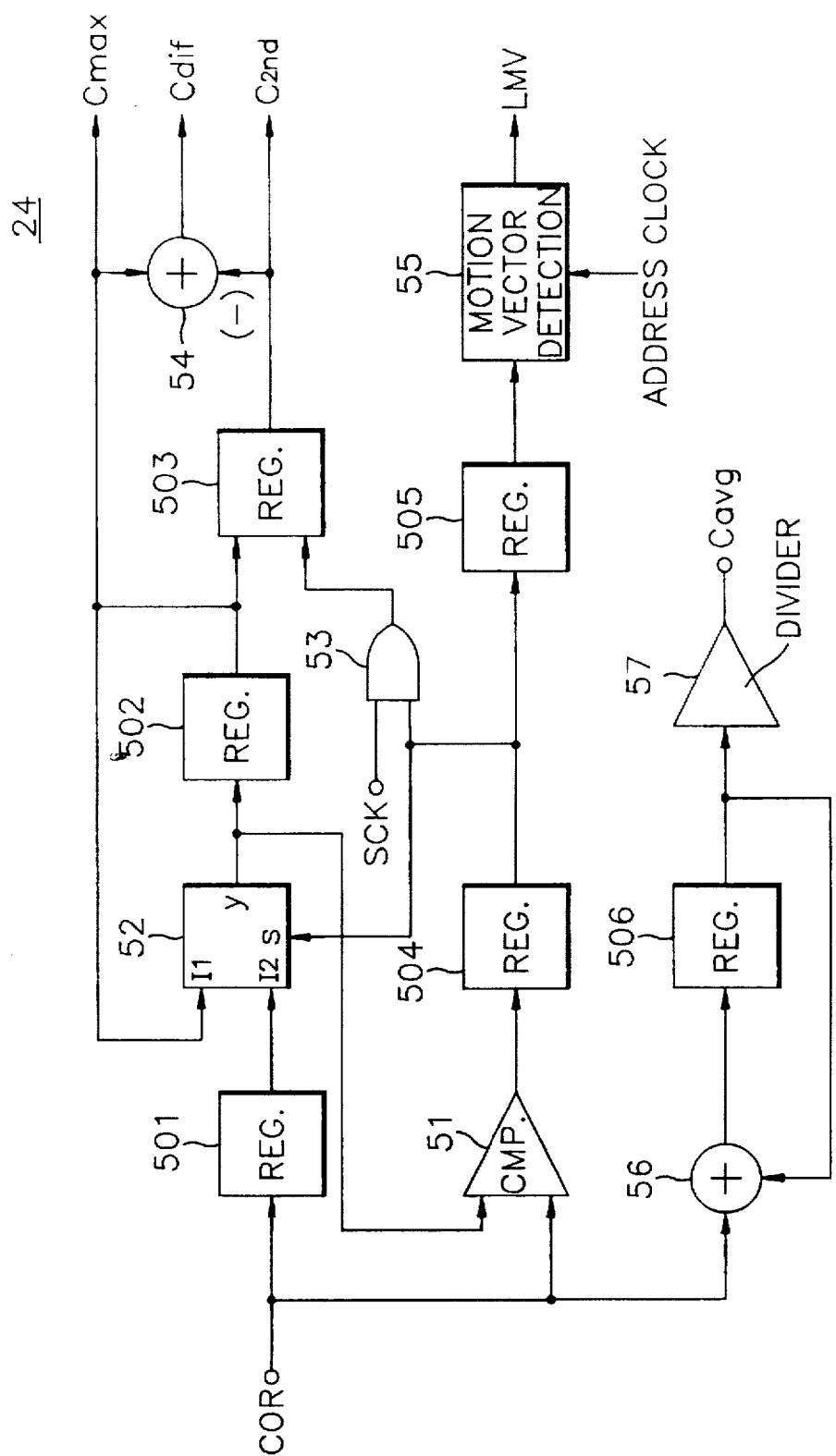
FIG. 5 is a constitution diagram of a local motion vector estimation block shown in FIG. 2, which detects a maximum correlation value by analyzing correlation value of each local motion estimation area and generates a local motion vector of corresponding local motion estimation area by detecting a position having the maximum correlation value.

FIG. 5 is a constitution diagram of LMV estimation block 24 shown in FIG. 2, and shows the constitution of LMV estimation block 24 for generating LMVs. In consideration of the constitution of the LMV estimation block 24, the received correlation data COR are correlation values sequentially generated according to the positions of SMEAs from the edge pattern matching block 23. The LMV estimation block 24 receives the correlation values and generates a LMV, a maximum correlation value Cmax, a second maximum correlation value C2nd, a maximum correlation difference Cdif, and an average correlation value Cavg, etc. Means for generating the maximum correlation value Cmax comprises registers 501, 502 and 504, a comparator 51, and a multiplexer 52. The register 501 receives and stores correlation data COR of corresponding MEA generated from the edge pattern matching block 23. The comparator 51 receives the correlation data COR and a previous maximum correlation value Cmax, and compares magnitudes of received two signals, thereby generating a compared result signal. The compared result signal is an 1-bit signal, and shows that the current correlation data COR is smaller or larger than the previous maximum correlation value Cmax. The register 504 receives an output of the comparator 51, and stores the received compared result signal. The multiplexer 52 receives a previous maximum correlation value Cmax in its first terminal, a current correlation data COR outputted from the register 501 in its second terminal, and a compared result signal outputted from the register 504 in its selection terminal. The multiplexer 52 selects and outputs the previous maximum correlation value Cmax received in its first terminal or changes the received current correlation data COR received in its second terminal into a maximum correlation Cmax and outputs the changed value, according to the logic of compared result signal. The register 502 stores the maximum correlation value Cmax outputted from the multiplexer 52. Means for generating the maximum correlation value Cmax compares the current correlation data COR received from the edge pattern matching block 23 with a previous maximum correlation value Cmax, and outputs and at the same time, stores as a maximum correlation value Cmax the correlation data having a larger correlation value according to the compared result. Means for generating a second maximum correlation value C2nd is composed of an AND gate 53 and a register 503. The AND gate 53 receives an output of register 504 and a system clock SCK, and controls the output of the system clock SCK according to the logic of the compared result signal. The register 503 receives the previous maximum correlation value Cmax, and outputs the received previous maximum correlation value Cmax as a second maximum correlation value C2nd when the system clock SCK is received. Means for generating the second maximum correlation value C2nd outputs and simultaneously stores the maximum correlation value Cmax of previous state as a second maximum correlation value C2nd when the maximum correlation value Cmax is changed. Means for generating the maximum correlation difference Cdif is a subtracter 54, which generates a maximum correlation difference Cdif by subtracting the second maximum correlation value C2nd from the maximum correlation value Cmax. Means for generating an average correlation value Cavg is composed of an adder 56, a register 506, and a divider 57. The adder 56 adds current correlation data COR received from the edge pattern matching block 23 to accumulated correlation data. The register 506 receives and stores an output of the adder 56 and at the same time, supplies the accumulated correlation data to the adder 56. The divider 57 receives an output of the register 506 and generates an average correlation value Cavg by dividing the received value by the number of motion vector candidates. Means for generating the average correlation value Cavg continuously adds the received correlation data COR to the correlation data corresponding to the motion vector candidate and divides the added accumulated correlation value by the number of motion vector candidates, thereby generating an average correlation value Cavg. Means for detecting a LMV is composed of a register 505 and a LMV detection portion 55. The register 505 stores an output of the register 504. The LMV detection portion 55 computes the position of current correlation data COR by counting the received address clocks, and detects as a LMV the positional information of current correlation data COR at the corresponding time point, when the maximum correlation value Cmax is renewed according to the logic of compared result signal outputted from the register 505.

Figure 6:
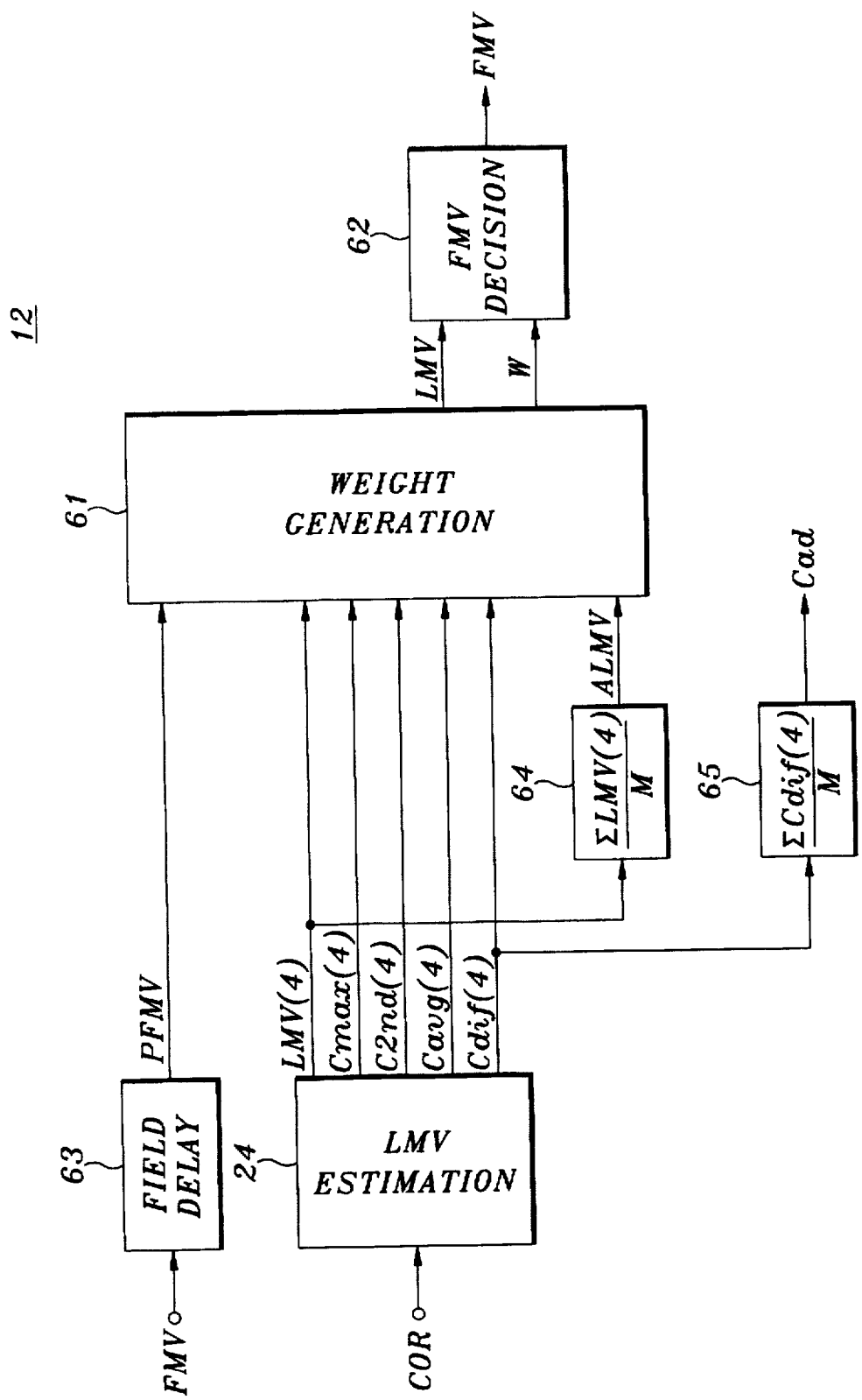
FIG. 6 is a constitution diagram of a field motion vector generation unit shown in FIG. 1, which computes a weight of each local motion estimation area using statistical variables and generates a field motion vector, using a corresponding weight and a local motion vector of each local motion estimation area.

FIG. 6 is a constitution diagram of the FMV generation unit 12 for receiving statistical variables and LMVs outputted from the LMV estimation block 24 shown in FIGS. 2 and 5 and generating a FMV. As described above, the LMV estimation block 24 receives correlation data COR of each MEA generated from the edge pattern matching block 23 and generates LMVs and statistical variables. A field delay 63 receives a FMV and generates a previous field motion vector (hereinafter referred to as PFMV) delayed for one-field period. An average LMV generation block 64 adds and divides LMVs received from the LMV estimation block 24, thereby generating an average local motion vector (hereinafter referred to as ALMV). An average maximum correlation difference generation block 65 adds and divides the maximum correlation difference Cdif received from the LMV estimation block 24, thereby generating an average maximum correlation difference Cad. A weight generation block 61 receives a PFMV, a LMV, an ALMV, an average correlation value Cavg, a maximum correlation value Cmax, and a second maximum correlation value C2nd, and consecutively generates weight signals corresponding to LMVs sequentially generated from the LMV estimation block 24. The weight generation block 61 generates weights for stability and isolativity using the LMV, the PFMV, and the ALMV, and determines whether image signal is of irregular condition, using statistical variables Cavg, Cmax, and C2nd and then determines that the computed weight signal is reset or not. A FMV decision block 62 gives weights for the respective LMVs by multiplying received weight signals by corresponding LMVs, respectively, and generates a FMV by combining the weighted LMVs.

Figure 7:
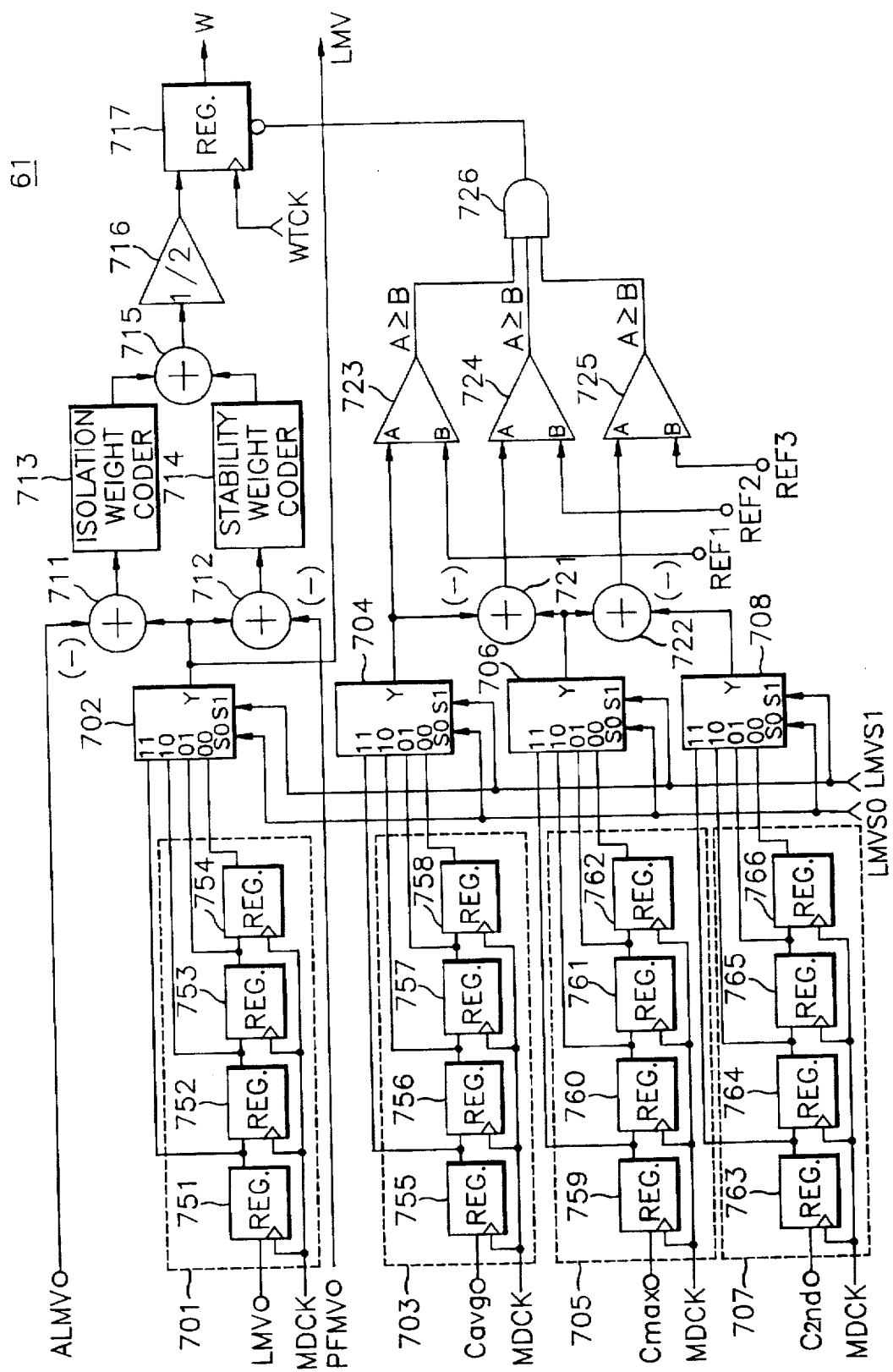
FIG. 7 is a constitution diagram of a weight generation block shown in FIG. 6, which computes weights of isolativity and stability for local motion vector of corresponding local motion estimation area, and adaptively gives weight of corresponding local motion vector by determining the existence or absence of irregular image.

FIG. 7 is a constitution diagram of the weight generation block 61, shown in FIG. 6, for adaptively processing LMV generated in irregular image, where means for selectively outputting a LMV is composed of a first storage part 701 and a first selector 702. The first storage part 701 receives the LMV and stores a received LMV by the MDCK generated in completion of LMV search. The first storage part 701 shows an example assuming that four LMVs are generated. Accordingly, the LMVs are sequentially stored in registers 751 to 754 by the MDCK according to the order of generation. The first selector 702 receives a LMV outputted from the first storage part 701 and selects as a LMV a corresponding LMV stored in the first storage part 701 according to logic of LMVS0 and LMVS1 generated after the completion of one-field search and outputs the selected LMV. Means for selectively outputting an average correlation value Cavg is composed of a second storage part 703 and a second selector 704. The second storage part 703 receives the average correlation value Cavg and stores the received average correlation value Cavg by the MDCK generated in completion of MEA search. It is shown as an example that four average correlation values Cavg are generated in the second storage part 703. The second selector 704 receives the average correlation value Cavg received from the second storage part 703 and generates an average correlation value Cavg by selecting a corresponding average correlation value Cavg stored in the second storage part 703 according to the logic of LMVS0 and LMVS1 generated after the completion of one-field search. Means for selectively outputting a maximum correlation value Cmax is composed of a third storage part 705 and a third selector 706. The third storage part 705 receives the maximum correlation value Cmax and stores the received maximum correlation Cmax by the MDCK generated in completion of MEA search. It is shown as an example that four maximum correlation values Cmax are generated in the third storage part 705. The third selector 706 receives a maximum correlation value Cmax received from the third storage part 705 and generates a maximum correlation value Cmax by selecting a corresponding maximum correlation value Cmax stored in the third storage part 705 according to the logic of LMVS0 and LMVS1 generated after completion of one-field search. Means for selectively outputting a second maximum correlation value C2nd is composed of a fourth storage part 707 and a fourth selector 708. The fourth storage part 707 receives the second maximum correlation value C2nd and stores the received second maximum correlation value C2nd by the MDCK generated in completion of MEA search. It is shown as an example that four second maximum correlation values C2nd are generated in the fourth storage part 707. The fourth selector 708 receives a second maximum correlation value C2nd received from the fourth storage part 707 and generates a second maximum correlation value C2nd by selecting a corresponding second maximum correlation value C2nd stored in the fourth storage part 707 according to the logic of LMVS0 and LMVS1 generated after completion of one-field search.

Means for deciding isolation weight is composed of a subtracter 711 and an isolation weight coder 713. The subtracter 711 detects isolativity by computing a difference between the ALMV and a LMV. The isolation weight coder 713 receives isolativity outputted from the subtracter 711, and generates isolation weight of corresponding LMV by giving a corresponding weight to the isolativity value. Means for deciding stability is composed of a subtracter 712 and a instability weight coder 714. The subtracter 712 detects stability by computing a difference between the LMV and the PFMV. The stability weight coder 714 receives instability measurement from the subtracter 712 and generates a stability weight for each LMV that is substantially complementary or inversely related to the corresponding received instability measurement. Also, when the LMV is generated in irregular image data, a FMV should be adaptively generated according to such conditions. As the conditions of irregular image, there are having low contrast, having repeated image form, having a moving object, etc. First of all, a function of detecting an image having low contrast is performed by a comparator 723. The comparator 723 receives an average correlation value Cavg and a first threshold value REF1, compares the average correlation value Cavg with a reference of low contrast, i.e., the first threshold value REF 1, thereby deciding irregular image data when the average correlation value Cavg is smaller than the first threshold value REF1. Secondly, means for detecting an image having a moving object is composed of a subtracter 721 and a comparator 724. The subtracter 721 receives the average correlation value Cavg and the maximum correlation value Cmax and generates a difference signal by subtracting the average correlation value Cavg from the maximum correlation value Cmax. A comparator 724 receives an output of the subtracter 721 and a second threshold value REF2, and decides irregular image data when the difference signal is smaller than the second threshold value REF2 which is a reference to determine a moving object. Thirdly, means for detecting an image having repeated form is composed of a subtracter 722 and a comparator 725. The subtracter 722 receives a maximum correlation value Cmax and a second maximum correlation value C2nd and subtracts the second maximum correlation value C2nd from the maximum correlation value Cmax, thereby generating a difference signal. The comparator 725 receives an output of the subtracter 722 and a third threshold value REF3, and decides irregular image data when the difference signal is smaller than the third threshold value REF3 which is a reference for determining repeated image. Means for adaptively generating a LMV is composed of an adder 715, a divider 716, a register 717, and an AND gate 726. The adder 715 receives and adds the isolation weight and the stability weight. The divider 716 receives an output of the adder 715 and generates a weight W of corresponding LMV by averaging the added two weights. The register 717 stores the averaged weight W. The AND gate 726 receives the outputs of the comparators 723, 724, and 725 and supplies a signal for controlling the output of the register 717. The register 717 stores the averaged weight and controls the output of stored averaged weight W when an irregular image signal is received from the AND gate 726. Accordingly, means for adaptively generating a LMV controls to reset the averaged weight W of corresponding LMV when the received image signal has low contrast, has repeated image, or includes a moving object, and outputs the weight W, in other cases.

Figure 8:
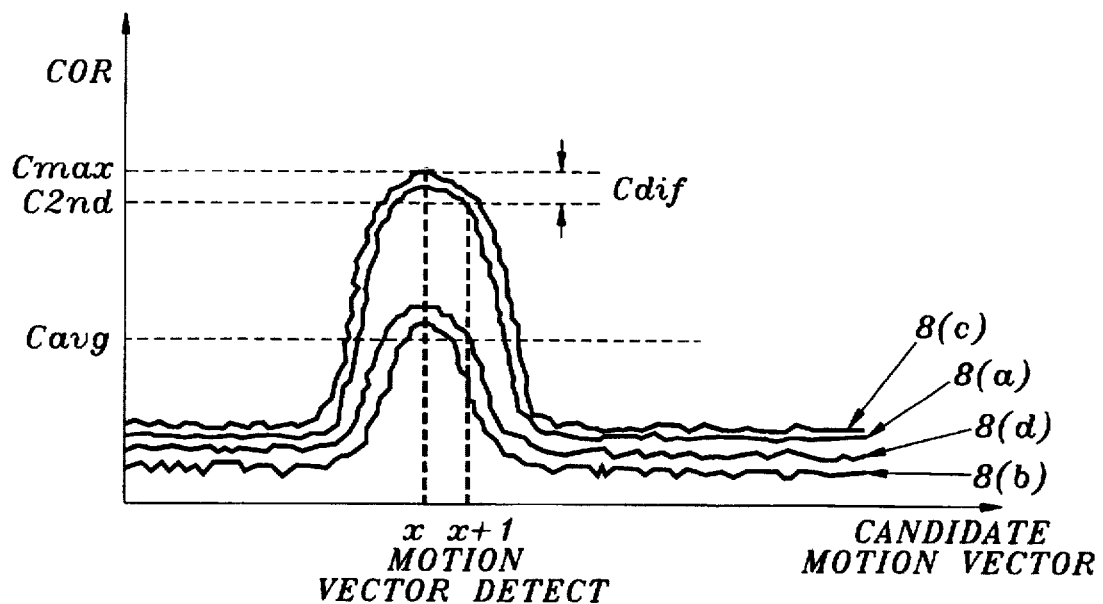
FIG. 8 is a characteristic view of correlation values and motion vector candidates, for explaining the generation of statistical variables and local motion vector using correlation in the local motion vector estimation block shown in FIG. 5, and the process for irregular image in the weight generation block shown in FIG. 7.

FIG. 8 is a characteristic view showing relation between correlation data COR and image data. In case of image data having normal contrast as shown in a curve 8(a), the range of correlation is wide, and in case of an image having low contrast as shown in a curve 8(b), a correlative average value is reduced, thereby deteriorating accuracy of detected LMV. Also, in case of repeated image as shown in a curve 8(c), the difference of correlation values becomes smooth.

Figure 9A:
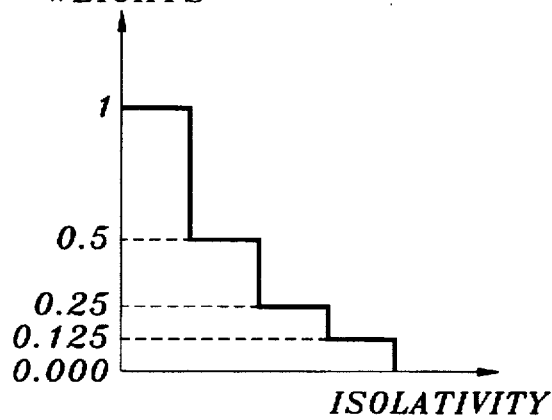
FIG. 9A is a characteristic view for giving a weight of isolativity according to the similarity relation of local motion vectors in an isolation weight computation portion in the weight generation block shown in FIG. 7.
Figure 9B:
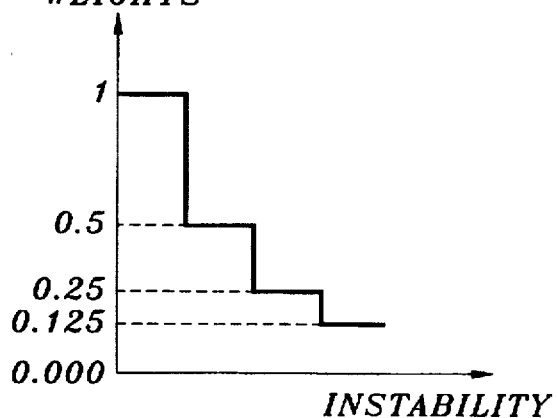
FIG. 9B is a characteristic view for giving a weight of stability by being determined according to the relation between the previous field motion vector and the local motion vector in the stability weight computation portion.

FIG. 9A shows a characteristic view, where isolativity is obtained by computing a difference between the LMV and ALMV and then isolation weight of corresponding LMV is given according to the isolativity value obtained in the isolation weight coder 713. Here, the isolativity is a magnitude of correlative deviation of each LMV. FIG. 9B shows a characteristic view, where instability is measured by computing the absolute value of a difference between the LMV and the PFMV, and where a respective stability weight for the LMV is determined from the instability measurement. The instability represents a magnitude of the deviation of the LMV from the PFMV.

Figure 10:
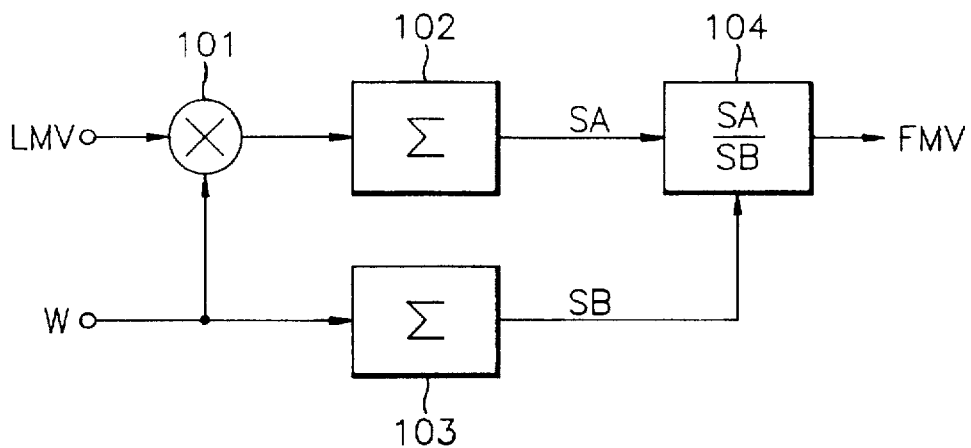
FIG. 10 is a constitution diagram of field motion vector decision block, shown in FIG. 6, which generates a field motion vector by multiplying local motion vectors detected from each local motion estimation area by weight signals, respectively, and then dividing a sum of multiplied results by a sum of weights.

FIG. 10 is a constitution diagram of the FMV decision block 62, in which means for performing a weighted averaging is composed of a multiplier 101 and an adder 102. The multiplier 101 sequentially multiplies LMVs sequentially outputted from the first selector 702 of the weight generation block 61 by weight signals corresponding to the LMVs, thereby giving a weight to each LMV. The adder 102 receives and sequentially adds an output of the multiplier 101, thereby generating a motion vector corresponding to one-field period, which is supplied as a dividend. Weight counting means is composed of an adder 103. The adder 103 adds the received weight signals, and supplies the added result as a divisor. The adder 103 cannot perform addition function when the weight signal is "0", so that only reliable LMVs in corresponding field period are multiplied by weight and then are outputted. FMV computing means is composed of a divider 104. The divider 104 receives the output of the adder 102 as a dividend, and the output of the adder 103 as a divisor, and generates a FMV by a dividing step.

Figure 11:
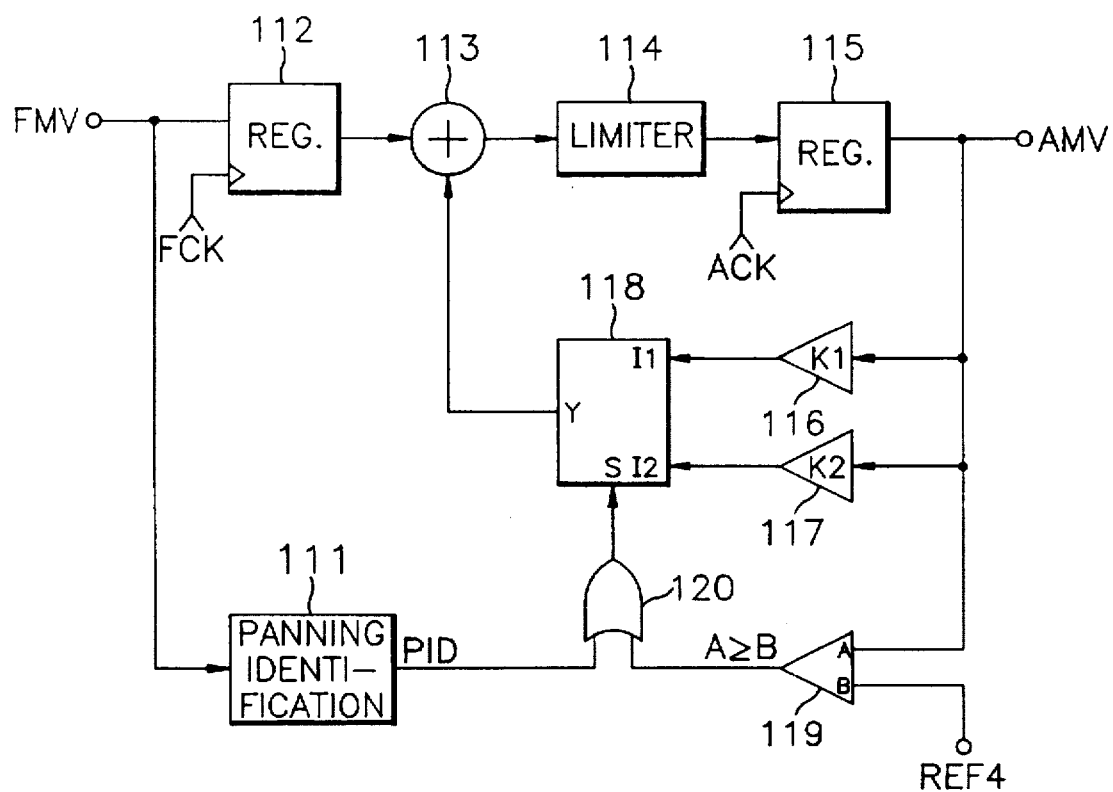
FIG. 11 is a constitution diagram of accumulated motion vector generation unit shown in FIG. 1, which attenuates an accumulated motion vector by selecting a proper attenuation-coefficient according to identification of panning and state of accumulated motion vector, and accumulates a received field motion vector into the attenuated accumulated motion vector.

FIG. 11 is a constitution diagram of the AMV generation unit shown in FIG. 1. The panning identifying block 111 receives the FMV and correlation data COR and regards as intentional panning that the FMV is generated in the identical direction over a predetermined number of frames, thereby generating a panning identification signal PID for changing an attenuation-coefficient of the AMV. Also, a comparator 119 receives previous AMV as a compared input and receives as a reference input a fourth threshold value REF4 not to exceed the maximum compensation area. The comparator 119 generates a compared result signal for changing an attenuation-coefficient of the AMV when the magnitude of AMV is larger than the fourth threshold value REF4. An OR gate 120 receives outputs of the panning identifying block 111 and comparator 119, and generates the received signal as a selection signal for selecting an attenuation-coefficient. Attenuation deciding means is composed of a multiplexer 118 and attenuators 116 and 117. The first attenuator 116 receives previous AMV and attenuates the received AMV by a first attenuation-coefficient K1. The second attenuator 117 receives previous AMV and attenuates the received AMV by a second attenuation-coefficient K2. The multiplexer 118 receives an output of the first attenuator 116 in its first terminal, an output of the second attenuator 117 in its second terminal, and an output of the OR gate 120 in its selection terminal. The multiplexer 118 selects and outputs an output of the second attenuator 117 when the panning identification signal PID or a compared result signal is received, and selects and outputs an output of the first attenuator 116, in other cases. AMV generation means is composed of registers 112 and 115, an adder 113, and a limiter 114. The register 112 stores the received FMV when FCK is generated. The adder 113 receives outputs the register 112 and the multiplexer 118, and generates an AMV by adding two signals. The limiter 114 receives the output of the adder 113 and performs limiting when the AMV is larger than a predetermined magnitude. The register 115 receives an output of the limiter 114 and stores the received one when the ACK is generated, and supplies the stored one as inputs of attenuators 116 and 117, and comparator 119 and at the same time, outputs the stored one to the address control and zooming process unit 14.

FIG. 12A shows timing for a panning identification signal PID in the panning identifying block 111, FIG. 12B shows a view showing a degree of movement of AMV with respect to time variation according to the generation or not of panning identification signal PID and comparator 119, and FIG. 12C shows the switching of attenuation-coefficients to generate an AMV as shown in FIG. 12B. In these drawings, a period T1–T12 shows that the panning identification signal PID is generated, thereby outputting an AMV attenuated by the first attenuation-coefficient K1, and a period T3–T4 shows that an AMV attenuated by the first attenuation-coefficient when the magnitude of AMV is larger than the fourth threshold value which is an upper limit of compensation.

With reference to FIGS. 2 through 14, the operational steps of first embodiment of the DIS system according to the present invention is described in detail.

The LMV generation unit 11 shown in FIG. 2 receives one-field real image data to be converted into and output binary edge pattern data, which are respectively pattern-matched with edge pattern data of previous field divided into M MEAs, thereby generating correlation data COR. The M correlation data CORs are received in the LMV estimation block 24, which generates LMV in corresponding MEA. Since the M LMVs are used in generation of FMV and AMV, they perform a very important function in the DIS system. Accordingly, if the LMVs are exactly generated, the FMV and the AMV are obtained by simply averaging and accumulating them.

In the LMV generation unit 11, as shown in FIG. 2, the edge detection block 21 detects edge of received real image data, and then converts and outputs the detected edge into binary edge signal. An edge signal outputted from the edge detection block 21 is an 1-bit binary signal. Then, the reference data extraction portion 41 of the previous MEA storage block 22 receives binary edge data outputted from the edge detection block 21 and extracts reference block data of RMEA in each MEA as shown in FIG. 3A. And, the reference data storage portion 42 stores the reference block data at the completion time point of each MEA, and shift-outputs reference block data of previous MEA previously extracted and stored. Accordingly, the reference data storage portion 42 delays the received reference block data for one-field period, and then outputs reference block data extracted in corresponding MEA of previous field when current-field binary edge data of corresponding MEA is outputted. And, the compared data extraction portion 43 receives the binary edge data and generates compared block data as shown in FIG. 3B. Then, the edge pattern comparing portion 44 compares block patterns of compared block data and reference block data, thereby discriminating the number of edge data having the same logic in corresponding MEAs of previous and current fields. In this case, in FIG. 3A, MEA having the largest correlation with the reference bock data will be a CMEA. The correlation generation portion 45 receiving an output of the edge pattern comparing portion 44 receives the compared result signal, computes the number of pixels having the same logic, and generates its result as correlation data COR. Accordingly, it can be known that the correlation data COR is the number of identical binary edge data in block data of respective MEAs in temporally consecutive two fields. Then, the LMV estimation block 24 sequentially generates LMV and statistical variables of each MEA using the correlation data COR.

First of all, the step of adaptively detecting motion vector using the correlation data is described. The LMV estimation block 24 receives correlation data COR of corresponding MEA, thereby generating a LMV and also computes statistical variables used in the weight generation block 61 and the FMV decision block 62. The statistical variables are a maximum correlation value Cmax, a second maximum correlation value C2nd, a maximum correlation difference Cdif, and an average correlation value Cavg, etc. Then, the FMV generation unit 12 obtains a LMV generated in each MEA using the LMV and statistical variables Cmax, C2nd, Cdif, Cavg, etc. outputted from the LMV estimation block 24, and then selects only reliable LMVs among them. Also, weights according to isolativity and stability of detected LMV are given by checking the LMV, the PFMV, and the ALMV, and a FMV is determined by averaging the weighted LMVs. That is, the weight generation block 61 computes isolativity and instability from the detected LMV, ALMV, and PFMV, and gives a weight for corresponding LMV by averaging weights of computed isolativity and stability. And, it is checked that image with low contrast, image with repeated form, or image including a moving object exists, and reliability of LMV is determined based on the checked result, thereby selecting only reliable LMVs. And, the FMV decision block 62 generates a reliable FMV by averaging weights obtained in the weight generation block 61 and the corresponding LMVs. The AMV generation unit 13 obtains an AMV for stabilizing fluctuation between consecutive fields into an initial state by temporally accumulating the FMV decided in the FMV generation unit 12. Then, the access control and zooming process unit 14 realizes zooming function using the AMV.

Referring to FIG. 5, the operation of LMV estimation block 24 is described. LMV and statistical variables are generated by receiving correlation data COR of each corresponding MEA, among correlation data CORs generated from the MEA as shown in FIG. 3A. The received correlation data COR is received from the edge pattern matching block 23 and becomes the number of identical binary edge data sequentially obtained in two fields according to the position of MEA. The respective registers 501 to 506 and the LMV detection portion 55 of LMV estimation block 24 are reset in every generation of the SECLR signal generated when search of MEA is completed, thereby being ready for detecting LMV and statistical variables of next MEA.

First of all, the generation of maximum correlation value Cmax is described. The correlation data COR outputted from the edge pattern matching block 23 is supplied to one terminal of comparator 51. At this time, the other terminal of the comparator 51 receives a previous maximum correlation value Cmax and is rest when search of MEA is initially started. Accordingly, the comparator 51 compares currently received correlation data COR with previous maximum correlation value Cmax, and outputs the result to the register 504. The register 504 supplies the compared result as a selection signal of multiplexer 52. At this time, the multiplexer 52 receives a maximum correlation value Cmax outputted from the register 502 in its first terminal, and current correlation data COR received through the register 501 in its second terminal. Accordingly, when the maximum correlation value Cmax is larger than the current correlation data COR in the comparator 51, a first compared signal is outputted as a compared result signal, and accordingly, the multiplexer 52 selects the maximum correlation value Cmax received in its first terminal as it is. Accordingly, the previous maximum correlation value Cmax is kept as a maximum correlation value Cmax. However, when the current correlation data COR is larger than the previous maximum correlation value Cmax, the comparator 51 outputs a second compared signal as a compared result signal, and accordingly, the multiplexer 52 selects and outputs as a maximum correlation value Cmax the current correlation data COR received in its second terminal. In this case, it is known that the maximum correlation is changed. And, the register 502 receives and stores the maximum correlation value Cmax outputted from the multiplexer 52.

Secondly, the generation of second maximum correlation value C2nd is described. The second maximum correlation value C2nd is determined according to a logic of compared result signal outputted from the comparator 51. That is, the AND gate 53 receiving the compared result signal blocks the outputting of system clock SCK when the first compared signal is received, thereby maintaining the value of register 503 as it is. That is, when the currently received correlation data COR is smaller than the previous maximum correlation value Cmax, the previous second maximum correlation value C2nd is kept as it is. However, when the maximum correlation value Cmax is changed and the second compared signal is received from the register 504, the AND gate 53 outputs the system clock SCK. Then, the register 503 receiving the previous maximum correlation value Cmax and also receiving the output of AND gate 53 as a clock stores the previous maximum correlation value Cmax as a second maximum correlation value C2nd by the system clock SCK. Accordingly, it is known that the second maximum correlation value C2nd is the maximum correlation value Cmax kept before changing, when the maximum correlation Cmax is changed.

Thirdly, the maximum correlation difference Cdif is obtained by subtracting the second maximum correlation value C2nd outputted from the register 503 from the maximum correlation value Cmax outputted from the register 502. This is performed in the subtracter 54. Fourthly, the average correlation value Cavg is obtained by adding the received correlations and then dividing the added value by a predetermined value. At this time, the predetermined value is the number of motion vector candidates in the MEA. To do this, the adder 56 adds the correlation data COR received from the edge pattern matching block 23 into the correlation value previously accumulated and stored in the register 506, which again stores the added result. And, the demulitiplier 57 divides the output of the register 506 by a predetermined value.

Then, the output value of divider 57 becomes an average correlation value Cavg and the correlation value added in the adder 56 is again stored in the register 506 and is prepared for the next state.

The Cmax, C2nd, Cdif, and Cavg generated as described above become statistical variables, and the motion vector detection portion 55 receives the statistical variables and obtains LMV in corresponding MEA. The detection of LMV is described. The compared result signal, outputted from the register 504, and obtained from the current correlation data COR and a previous maximum correlation value Cmax is supplied to and stored in the register 505. At this time, the motion vector detection portion 55 counts address clocks to compute the position of the corresponding correlation data COR. Here, the address clock is a correlation sampling clock within motion vector candidate estimation area. If a second comparing signal showing the renewal of maximum correlation value Cmax is received from the register 505, the motion vector detection portion 55 recognizes it and outputs the computed position value as a LMV at the corresponding time point. Accordingly, the LMV becomes information on block position having the maximum correlation value Cmax in corresponding MEA.

Accordingly, after the LMV estimation block 24 compares the received correlation data COR with the previous maximum correlation value Cmax, if the previous maximum correlation value Cmax is larger, the current state is maintained. And if it is smaller, the current correlation value is changed into the maximum correlation value Cmax and at the same time, the previous maximum correlation value Cmax is changed into the second maximum correlation value C2nd. Also, the motion vector detection portion 55 computes the position of current block using the address clock, and if the maximum correlation value Cmax is renewed, the position at this time is outputted as a LMV, which accordingly becomes the position of correlation data COR having the maximum correlation value Cmax. And, if the second maximum correlation value C2nd is subtracted from the maximum correlation value Cmax, the result becomes a maximum correlation difference Cdif. The average correlation Cavg can be computed by adding all of the received current correlation values and then dividing the added result by the number of motion vector candidates. The LMV estimation block 24 is reset to be ready for detecting LMV and statistical variables of next MEA, as shown in FIG. 3A, by a search completion signal SEC-CLR generated when search of each MEA is completed.

The LMV generated as described above greatly affects the reliability. The accuracy of the LMV detected as described above is changed according to the correlation data CORR (i,j) moved by a coordinate (i,j) of motion vector candidate which is a computed result of the correlation computing block. If the correlation data COR are similar, the reliability of detected LMV should be estimated by the correlation data COR of each MEA. And, the FMV representing each field should be determined by selecting LMV obtained in the reliable MEA.

Referring to FIG. 6, the operation of FMV generation unit 12 is described. The weight generation block 61 stores the received LMVs and statistical variables in the unit of MEA, generates weight signals by sequentially analyzing the LMV when the FMV is generated, and determines the reliability of corresponding LMV by analyzing the statistical variables corresponding to the LMV. And, based on the reliability, the weight signal is provided in corresponding LMV or is ignored. Then, the FMV decision block 62 generates a FMV by multiplying the weight signals by LMVs and then adding them.

FIG. 7 shows the constitution of weight generation block 61 which adaptively gives weight value according to the irregular condition of image data. FIG. 8 shows the characteristic between image data having irregular condition and correlation data COR. Also, FIG. 9A shows the characteristic between isolativity and isolation weight of LMV, and FIG. 9B shows the characteristic between instability and stability weight of LMV. Here, it is assumed that the FMV is generated from four MEAs as shown in FIG. 3A.

First of all, the LMVs LMV1 to LMV4 and the statistical variables Cavg1 to Cavg 4, Cmax1 to Cmax4, and C2nd1 to C2nd4 received in the weight generation block 61 are sequentially generated from the LMV estimation block 24. Accordingly, while the weight generation block 61 stores the LMVs and statistical variables sequentially generated as described above when they are generated, it should be able to again sequentially process them when the FMV is generated. Accordingly, the received LMV is stored in the registers 751 to 754 whenever the MDCK is generated. Accordingly, when the search of MEAs is completed as shown in FIG. 3A and a MDCK4 is generated, LMV4 is stored in the register 751, the LMV3 is stored in the register 752, the LMV2 is stored in the register 753, and the LMV1 is stored in the register 754, respectively. In such a state, if LMVS1 and LMS0 are generated in the order of "00-01-10-11" as shown in FIG. 3C, the first selector 702 generates the LMVs in the order of "LMV1-LMV2-LMV3-LMV4". By the same way, the statistical variables are also generated in the order of "Cavg1-Cavg2-Cavg3-Cavg4", "Cmax1-Cmax2Cmax3-Cmax4", and "C2nd1-C2nd2-C2nd3-C2nd4". Accordingly, it can be known that the LMV and statistical variables generated from the same MEA are sequentially generated. Here, the LMV is used to generate a weight signal, and the statistical variables are used to determine the reliability of corresponding LMV.

When the weight signal of LMV generated as described above is obtained, the weight signal is given by obtaining isolativity and instability and then analyzing the obtained isolativity and instability. First of all, the isolativity means the difference between the LMV and the ALMV. Accordingly, the subtracter 711 computes a difference between LMV and ALMV received from the ALMV generation block 64, thereby generating isolativity, which is supplied to the isolation weight coder 713. Then, the isolation weight coder 713 computes isolation weight with the characteristic of FIG. 9A according to the isolativity received from the subtracter 711. That is, referring to FIG. 9A, when the isolativity is "0", the isolation weight has the value of "1", and as the isolativity increases, the isolation weight is decreased. And, when the isolativity has a very large value, the isolation weight has the value of "0". Accordingly, the isolation weight coder 713 analyzes the received isolativity, and then gives an isolation weight according to the characteristic curve of isolativity. Secondly, instability is measured by the magnitude, or absolute value of the difference between the LMV and the PFMV. Accordingly, the subtracter 712 computes the difference between the LMV and the PFMV, thereby generating a measure of the instability, which is supplied to the stability weight coder 714. Then, the stability weight coder 714 computes a stability weight with the characteristic such as FIG. 9B according to the measurement of instability received from the subtracter 712. That is, referring to FIG. 9B, when the instability is "0", the stability weight has the value of "1", and as the instability increases, the stability weight decreases and approaches to "0". Accordingly, the stability weight coder 714 analyzes the measurement of instability received from the subtracter 712 and then gives a stability weight according to the characteristic curve as shown in FIG. 9B. The isolation weight and stability weight generated as described above are added in the adder 715, and the divider 716 generates an averaged weight W by dividing the added weights of isolativity and stability by a half. Accordingly, the output of the divider 716 is an average value of isolation weight and stability weight, and is supplies as a weight W of LMV detected in corresponding MEA to the register 717. It is known that since LMVs are sequentially generated in the first selector 702, the weight signals are sequentially generated according to the respective corresponding LMVs.

The conditions determining the reliability of image data using the statistical variables are described. Such irregular conditions of the image data can be classified into an image with low contrast, an image with repeated form, an image with moving object, etc. First, in the image with low contrast, since the average value of correlation is decreased by a difference between overall two fields and accordingly, the coordinates having high correlation data COR are increased, the accuracy of detected LMV will be deteriorated. This will be more remarkable in the LMV generation unit 11 which uses data of full resolution after being filtered. As described above, since the LMV generation unit 11 using the binary edge signal as described above detects the edge in the sub-block state by the predetermined number of windows, the satisfying reliability is obtained even in the low contrast image. However, when the contrast is deteriorated below a constant level, the edge points are reduced, so that this method also deteriorates the reliability. Even in the image having overall normal contrast on the screen, when in the object having the MEAs with constant intensity, the MEA is the same as that having low contrast, so that there should be some preparation for this in photographing of a general object. FIG. 8 is a view for the correlation characteristic, where a LMV is detected by COR(i,j) when the correlation at the position moved by i,j is the largest one, and in case of image having normal contrast, the range of correlation becomes large as shown in 8(a). Contrarily, as shown in 8(b), in low contrast, a ratio of signal to noise S/N of image signal becomes smaller, thereby reducing the correlative average value, so that the accuracy of detected motion vector is deteriorated. To be adapted to the above low contrast, when the average correlation value Cavg used as a parameter is below a predetermined threshold value, the LMV obtained in the corresponding area is not used. The conditional equation for discriminating the above image state is: "average correlation value Cavg<first threshold value REF1". In the conditional equation, the average correlation value Cavg is the average number of matched edges and experimentally, when the first threshold value is over eight points, a satisfied motion vector can be obtained.

Accordingly, to determine whether the received image has low contrast as described above, the comparator 723 receives an average correlation value Cavg outputted from the divider 57 of the LMV estimation block 24 in one terminal and the first threshold value REF1 in the other terminal, thereby comparing them. At this time, if the average correlation value Cavg is greater than the first threshold value REF1, the contrast of received image data is regarded as being normal and the comparator 723 outputs a normal signal. However, if the average correlation value Cavg is smaller than the first threshold value REF1, the contrast of received image data is regarded as being abnormal, and the comparator 723 outputs an abnormal signal.

Secondly, it is considered that the moving object exists in image data. In general image data, a moving object exists in the picture, and if the moving object is within a MEA, the LMV in the corresponding MEA is detected being totally different from the motion due to hand-fluctuation. Accordingly, it is determined whether an object exists within MEA, and if there exists a moving object, the LMV detected in the corresponding MEA should be ignored. The conditional equation to determine whether a moving object exists within the MEA is: "(maximum correlation value Cmax−average correlation value Cavg)<second threshold value REF2". At this time, the average correlation value Cavg represents the average value of correlation of all motion vector candidates within the MEA, and the second threshold value REF2 is a threshold value for determining the moving object. If a moving object is generated in the image signal, exact matching with the previous field is hardly possible as shown in 8(d), so that the maximum correlation value Cmax is relatively reduced. To identify whether there exists a moving object in the image data as described above, the average correlation Cavg is subtracted from the maximum correlation value Cmax in the subtracter 721, thereby obtaining its difference. And, the comparator 724 receives an output of the subtracter 721 in its one terminal, and the second threshold value REF2 in the other terminal, thereby comparing the received two values. At this time, if the difference between the maximum correlation value Cmax and the average correlation value Cavg is greater than the second threshold value REF2, the absence of moving object in the received image data is regarded, and the comparator 724 outputs a normal signal. However, if the difference between the maximum correlation value Cmax and the average correlation value Cavg is smaller than the second threshold value REF2, the existence of moving object in the received image data is regarded and the comparator 724 outputs an abnormal signal.

Thirdly, the case of having repeated image form is considered. Repetition of constant form such as stripe can exist in the image data. In case that the image having repeated form exists in MEA, if the motion is detected by matching binary edge data in blocks, the overlapped portion of pattern is generated and accordingly a plurality of maximum correlation values Cmax are generated. Accordingly, the accuracy of LMV detected in corresponding MEA is degraded. Accordingly, the LMV detected in repeated form should be ignored, and the conditional equation of determining such state, using parameters is as follows: "(maximum correlation value Cmax−second maximum correlation value C2nd) <third threshold value REF3". In the conditional equation, the maximum correlation Cmax is a maximum number of edges matched in the LMV generation unit 11 and the second maximum correlation value C2nd represents the secondly large correlation. And, the third threshold value REF3 is an threshold value for determining a moving object and the result of the conditional equation becomes small even in low contrast image, thereby discriminating the repeated image form and the low contrast at the same time. In the image with repeated form, the difference of correlation becomes smooth as shown in 8(c). To determine the existence or absence of repeated image, the subtracter 722 subtracts the second maximum correlation value C2nd from the maximum correlation value Cmax to generate its difference signal. And, the comparator 725 receives the output of the subtracter 722 in its compared input terminal and the third threshold value REF3 in its reference input terminal, and compares the received two signals. At this time, if the difference between the maximum correlation value Cmax and the second maximum correlation value C2nd is greater than the third threshold value REF3, it is regarded that the received image data does not have the repeated image form, and the comparator 725 outputs a normal signal. However, if the difference between the maximum correlation value Cmax and the second maximum correlation value C2nd is smaller than the third threshold value REF3, the existence of repeated image form in the received image data is regarded, and the comparator 725 outputs an abnormal signal.

The reliability of LMV is determined by analyzing the state of received image data as described above and the outputting of the weight value of LMV is controlled according to the reliability. That is, since the output of the gate 726 which AND-gates the outputs of the comparators 723 to 725 is supplied as a control signal of the register 717 outputting a weight of corresponding LMV, if any one of the comparators 723 to 725 outputs an abnormal signal, the register 717 cannot output the generated weight by the AND gate 726. Also, in case of the reliable LMV, all of the comparators 723 to 725 output normal signals, and in this case, the AND gate 726 outputs a normal signal and accordingly the register 717 outputs the weight for corresponding LMV. Accordingly, the register 717 outputs or discards a weight of LMV according to the reliability.

As described above, the three conditional equations are to adaptively determine weights of LMV by correlation values according to the irregular image conditions. Accordingly, if the equations are applied in the respective MEAs, one of which satisfies the condition, the LMV is excluded in determination of FMV in consideration of reliability of LMV obtained in corresponding MEA. The most basic process of FMV can be obtained by averaging the reliable LMVs. Accordingly, LMVs having low reliability are ignored and the FMV having high reliability can be obtained using only the selected LMV candidates. However, the averaging of reliable LMVs generates a problem of losing overall accuracy of FMV using narrow LMVs according to correlation between two fields or using LMVs having improper similarity even in reliable MEA. To solve the problem, isolativity and instability of detected LMV are computed and the weight of LMV corresponding to the computed isolativity and stability is determined. In the above case, reliable LMVs are applied, so that an accurate FMV can be decided.

The weights Ws for a plurality of LMVs, generated as described above should be averaged to be generated as a FMV. FIG. 10 is a constitution of the FMV decision block 62, where the multiplier 101 sequentially outputs W1*LMV1, W2*LMV2, W3*LMV3, and W4*LMV4. Then, the adder 102 sequentially adds the outputs of the multiplier 101. Accordingly, the adder 102 generates W1*LMV1+W2*LMV2+W3*LMV3+W4*LMV4. Also, the adder 103 adds the weight signals outputted from the register 717 and then outputs the result. Accordingly, the adder 103 outputs W1+W2+W3+W4. Then, the divider 104 performs a division operation by receiving the output of the adder 103 as a divisor, and the output of the adder 102 as a dividend. The signal outputted from the divider 104 becomes (W1*LMV1+W2*LMV2+W3*LMV3+W4*LMV4)/(W1+W2+W3+W4). At this time, if an arbitrary weight signal has a value of "0" due to a problem in reliability of arbitrary LMV, the adder 103 cannot generate a divisor corresponding to the corresponding LMV. Accordingly, it is known that the adder 103 generates a detection-number signal of LMV detected in stable image among weight signals. Accordingly, it is known that if there is a LMV having no reliability in generation of FMV, the FMV decision block 62 does not compute the weight of corresponding LMV. The signal outputted from the divider 104 is a FMV.

The determination of FMV by comparing consecutive two fields as described above recognizes and compensates as hand-fluctuation the photographing of object with a camera user's intentional panning (i.e., panning, centering, tilt). In case of the above compensation, the image signal of zooming-processed picture shows a temporal stop of image in every exceeding of maximum motion vector compensation area. Accordingly, the image should be stabilized to remove the temporal stop of image in consideration of user's hand fluctuation. The LMV detected from the LMV generation unit 11 represents the two-dimensional motion on consecutive fields, and a stabilized output can be obtained by the step of continuously tracking FMV from the initial motion direction, which is to eliminate image motion component by the motion vector. Accordingly, even in intentional panning, a still image appears within a motion vector compensation area. To remove such a still image, the image having continuous motion in the initial direction at the panning operation of camera should be obtained, and the accumulated form of this can be done by implementation of linear equation such as "X(n+1)=k*X(n)+V(n)" having a constant coefficient. In the above equation, X(n+1) is an AMV in the current field, X(n) is an AMV in the previous field, V(n) is a FMV, and k is an attenuation-coefficient, where 0<k<1. The attenuation-coefficient k is an important factor determining the degree of motion compensation attenuation of image and the response characteristic during panning operation. As the attenuation-coefficient k is large, the error rate of AMV needed in hand-fluctuation compensation decreases, and on the other hand, the unnaturally stopped image appears due to the deterioration of the response characteristic for panning. If the attenuation-coefficient k is small, the accumulated error rate rapidly increases, so that the function of hand-fluctuation compensation is lost, but the response characteristic for panning is improved. To obtain satisfied attenuation-coefficient k in consideration of such characteristics, the relation between the fluctuation frequency of camera and error rate of AMV is experimentally measured and decided. In the present invention, with reference to the experimental result, the attenuation-coefficient is decided as 0.995 (hereinafter referred to as a first attenuation-coefficient k1) to obtain fluctuation compensation characteristic over 95% in the hand-fluctuation frequency, 2 to 10 Hz. Also, to improve the panning characteristic, the attenuation-coefficient becomes 0.97 (hereinafter referred to as a second attenuation-coefficient k2) in over hand-fluctuation frequency. The attenuation-coefficients k1 and k2 are switched by determining the existence of intentional panning and the existence of compensation area of motion vector. Accordingly, the AMV is convergent to "0" by the above equation, when the camera is still. The attenuation-coefficient is the first one k1 of 0.995 in the generation of initial motion vector and is the second one k2 of 0.97 by recognizing panning operation in the generation of motion vector in the identical direction over 3 to 10 frames by hand-fluctuation frequency. Also, the first attenuation-coefficient is used in case of existing within compensation area of motion vector and the second attenuation-coefficient k2 is used in case of exceeding the compensation area. Also, the upper limit of AMV representing the degree of hand-fluctuation to be compensated from the initial photographing direction is determined by digital zooming ratio. When the zooming ratio becomes little bit larger, the resolution is deteriorated, so that it is processed generally below 1.5 times. Accordingly, if the upper limit of AMV exceeded by panning, the reset step is performed. However, this shows a temporal stop of image, which is an eyesore, so that the limiting process of AMV is performed in the upper limit value. At this time, if the degree of hand-fluctuation is in the limit state, the attenuation-coefficient should be changed into a hand-fluctuation compensation mode, i.e., the first attenuation-coefficient k1 of 0.995.

FIG. 11 is a constitution diagram of the AMV generation unit 13 for compensating the panning due to hand-fluctuation characteristic. FIG. 12A is a timing diagram showing the generation of panning identification signal PID. FIG. 12B shows the relation between AMV and maximum motion vector compensation area, and FIG. 12C shows the step of compensating the hand-fluctuation by switching the attenuation-coefficients k1 and k2 in the state shown in FIG. 12B. The step of inhibiting the panning effect is described based on the above constitution. First of all, the panning identifying block 111 checks whether panning is currently generated, from the received FMV and correlation data COR and generates a panning identification signal PID. That is, the panning identifying block 111 analyzes the state of the received FMV, thereby generating a panning identification signal PID for representing panning generation if a motion vector is generated in an identical direction for over a predetermined number of frames. And, if not, hand-fluctuation is regarded and an identification signal for selecting the first attenuation-coefficient k1 is generated. Here, the number of frames is assumed as 10. The multiplexer 118 receiving the panning identification signal PID generated from the panning identifying portion 111 as a selection signal receives the output of the first attenuator 116 in its first terminal and the output of the second attenuator 117 in its second terminal. Here, the first attenuator 116 attenuates the received AMV by the first attenuation-coefficient k1, and the second attenuator 117 attenuates the AMV by the second attenuation-coefficient k2. Accordingly, the multiplexer 118 selects an output from the attenuators 116 and 117 according to the state of the panning identification signal PID, which is an output of the panning identifying block 111. At this time, the multiplexer 118 selects the output of the second attenuator 117 outputting the AMV attenuated by the second attenuation-coefficient k2, if the panning identification signal PID is generated, and generates the output of the first attenuator 116 outputting the AMV attenuated by the first attenuation-coefficient k1, if the panning identification signal PID is not generated. The first attenuator 116 attenuates the received AMV using the first attenuation-coefficient k1 of 0.995 and then supplies it to the first terminal of the multiplexer 118, and the second attenuator 117 attenuates the received AMV using the second attenuation-coefficient k2 of 0.97 and then supplies it to the second terminal of the multiplexer 118. Then, the multiplexer 118 receiving the output of the panning identifying block 111 as a selection signal selects an AMV attenuated by the corresponding attenuation-coefficient according to the panning identification signal PID and then supplies it to the adder 113. The adder 113 adds the output of the multiplexer 118 and the FMV outputted from the register 112, thereby generating a current AMV. Accordingly, it is known that the AMV generation unit 13 accumulates the FMV outputted from the FMV generation unit 12 by sequentially adding the FMV to the previous AMV. The output of the adder 113 is supplied to the limiter 114, which limiting-processes the AMV to prevent the temporal stop of image when the magnitude of AMV exceeds the upper limit of the compensation area. The AMV outputted from the limiter 114 is outputted through the register 115.

Also, the compensation area of AMV is determined according to the zoom ratio processed in the address control and zooming process unit 14. That is, in case of a large zoom ratio, the compensation area of AMV increases, but the picture quality of image signal zoom-processed according to this is deteriorated. Accordingly, a proper zoom ratio should be set, and an upper limit of AMV for implementing the set zoom ratio should be determined. When the magnitude of AMV reaches the upper limit, the AMV should be fast feedback in the zero direction by being greatly attenuated. In other words, when the magnitude of AMV reaches its upper limit, the small attenuation-coefficient is selected, thereby largely attenuating the AMV. This function is performed by the comparator 119, which receives the AMV as a compared input and the fourth threshold value REF4 as a reference input. Here, the fourth threshold value is one set for the AMV not to exceed the compensation area. The outputs of the comparator 119 and the panning identifying block 111 are supplied as a selection signal of the multiplexer 118 through the OR gate 120. Accordingly, the multiplexer 118 which performs the same operation as in generation of the panning identification signal PID, selects the output of the first attenuator 116 when the magnitude of AMV is within the normal compensation area (i.e., AMV>REF4), and selects the output of the second attenuator 117 when it exceeds the upper limit value of compensation area (i.e., AMV<REF4). Then, the same process as in the panning identification signal PID is performed, thereby generating an AMV.

Here, if the AMV is generated as shown in FIG. 12B, the comparator 119 outputs a signal for selecting the output of the first attenuator 116 when the AMV is smaller than the fourth threshold value REF4. Accordingly, the multiplexer 118 selects the AMV of the first attenuator 116, attenuated by the first attenuation-coefficient k1 of 0.995, before a time point T1, as shown in FIG. 12C, and supplies it to the adder 113. However, after the time point T1, the motion vector having the identical direction for over 10 frames is generated at a constant frequency due to hand-fluctuation, the panning identifying block 111 generates the panning identification signal PID as shown in FIG. 12A. Then, the multiplexer 118 selects the output of the second attenuator 117, attenuated by the second attenuation-coefficient k2 of 0.97, as shown in FIG. 12C, and supplies it to the adder 113. In this state, at the time point T2, if the panning identification signal PID is removed, the multiplexer 118 again selects and outputs the output of the first attenuator 116. While the output of the first attenuator 116 is selected as described above, if the magnitude of the AMV is larger than the fourth threshold value REF4, such as at the time point T3, the multiplexer 118 again selects the output of the second attenuator 117, so that the AMV is fast restored into a compensable magnitude.

However, if the AMV reaches the upper limit such as at the time point T4, the limiter 114 is operated after this time, thereby maintaining the AMV as a constant magnitude.

The Second Embodiment

Figure 13:
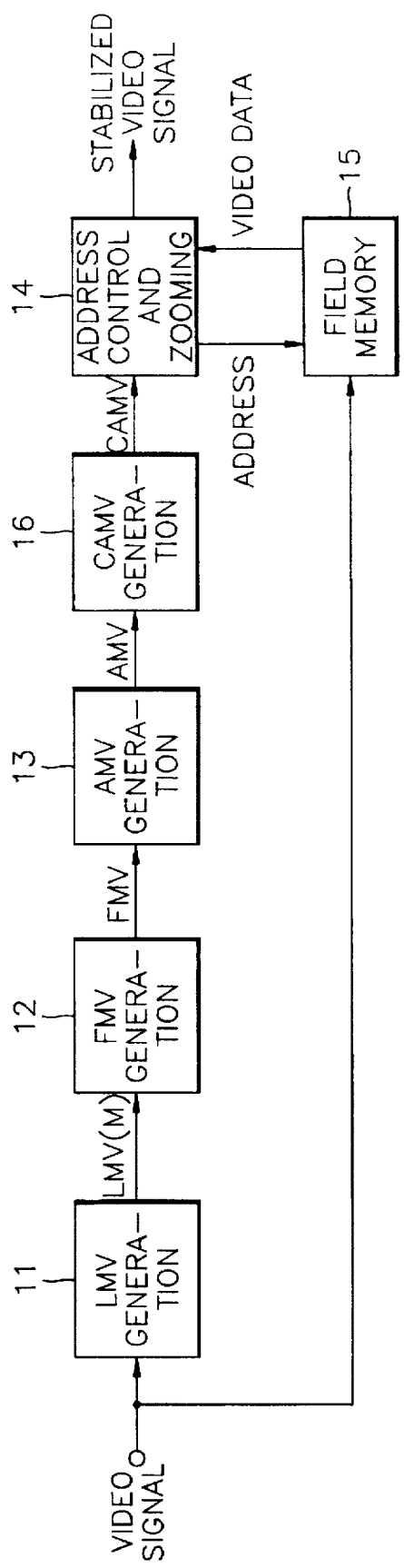
FIG. 13 is a constitution diagram showing a second embodiment of DIS system according to the present invention, which is modified by inserting a compensating accumulated motion vector generation unit between the accumulated motion vector generation unit and the address control and zooming process unit shown in the first embodiment.

FIG. 13 is a constitution diagram of second embodiment of DIS system according to the present invention. In the second embodiment of the present invention shown in FIG. 13, a compensating AMV generation unit 16 is coupled between the output terminal of the AMV generation unit 13 and the input terminal of the address control and zooming process unit 14 shown in FIG. 1. The constitution of FIG. 13 shown as the second embodiment is described. Digital image data generated from a camera is supplied to a LMV generation unit 11 and a field memory 15. The LMV generation unit 11 receives digital image data, detects binary edge signal of current field from the received image data, computes correlation value with comparison between two consecutive fields by matching patterns of detected current field binary edge signal and previous field binary edge signal in the unit of MEA, and generates LMV and statistical variables of corresponding MEA using the correlation data. A FMV generation unit 12 coupled to an output terminal of the LMV generation unit 11 receives LMVs and statistical variables. The FMV generation unit 12 generates a FMV showing a complete one-field motion from the received LMVs and statistical variables. An AMV generation unit 13 coupled to an output terminal of the FMV generation unit 12 accumulates the received FMVs, thereby generating an AMV for stabilizing the fluctuation between consecutive fields into an initial state. The compensating AMV generation unit 16 coupled to the output terminal of the AMV generation unit 13 detects falsely detected motion of the received AMV, thereby generating a compensating AMV (hereinafter referred to as CAMV) which can inhibit irregularity of image due to minute noise. The field memory 15 receives and stores the image data and reads and outputs the image data stored in corresponding area by a received read address. The address control and zooming process unit 14 coupled to the output terminal of the CAMV generation unit 16 generates a read address from the received CAMV and supplies the generated read address to the field memory 15. And, at the same time, it receives the image data read from the field memory 15 and performs a motion compensation. That is, the address control and zooming process unit 14 performs the motion compensation through the above process for the image data received from the field memory 15 by a read address, and outputs a finally stabilized image by zooming a predetermined potion of image with interpolation for the image signal in the digital zooming process step.

In the constitution of second embodiment, the CAMV generation unit 16 can make stabilized picture be reproduced by removing falsely detected motion vector component which can be shown by an AMV in a still. To do this, the CAMV generation unit 16 uses an adaptive error vector compensating value, and the AMV and the average maximum correlation difference Cad are used as elements for determining the error vector compensating value. In this case, as the magnitude of AMV and the maximum correlation difference are smaller, the probability of falsely detected motion vector is high, so that the minute motion can be removed by making the error vector compensating value be large. Accordingly, when the AMV is large or the average maximum correlation difference Cad is large, the motion compensation can be perfectly performed maximally using the detected motion vector.

Figure 14:
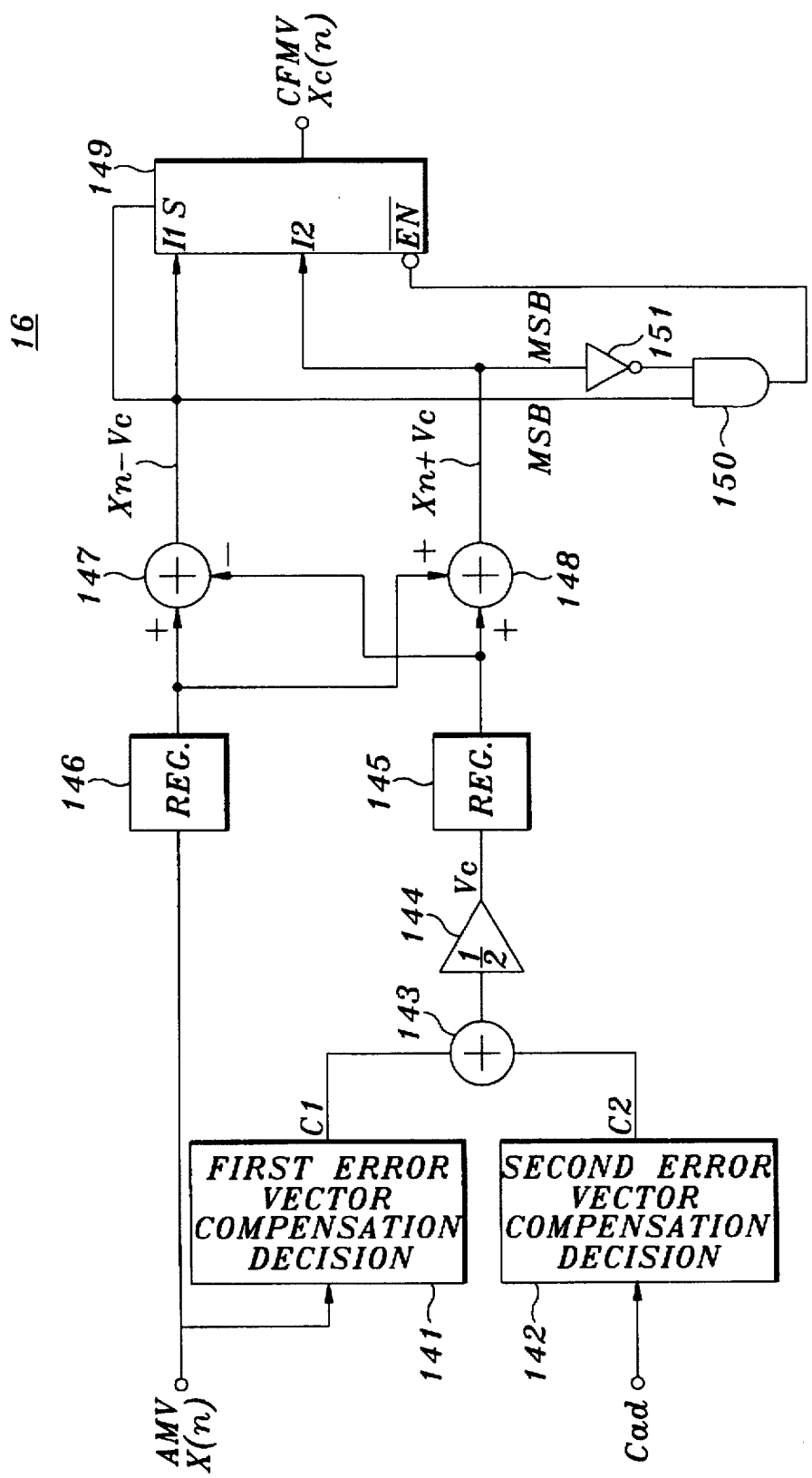
FIG. 14 is a constitution diagram of compensating accumulated motion vector generation unit shown in FIG. 13, which eliminates a minute error motion by determining correlation between accumulated motion vector and average maximum correlation difference.

FIG. 14 is a constitution diagram of CAMV generation unit 16 for inhibiting minute motion vector, when the AMV generated as described above includes minute motion vector due to noise. Minimum motion decision means is composed of error vector compensation deciding blocks 141 and 142, an adder 143, and a divider 144. The first error vector compensation deciding block 141 coupled to the output terminal of the AMV generation unit 13 decides a minimum motion of received AMV, thereby generating a first error vector compensating value C1. The second error vector compensation deciding block 142 coupled to the subtracter 54 generates a second error vector compensating value C2 by deciding a minimum effective motion of the received average maximum correlation difference Cad. The adder 143 coupled to the output terminals of first and second error vector compensation deciding blocks 141 and 142 adds the two error vector compensating values C1 and C2. The divider 144 coupled to the adder 143 generates an average error vector compensating value Vc by dividing the output C1+C2 of the adder 143 by a half. Accordingly, minimum motion decision means decides the minimum effective motions of received AMV and average maximum correlation difference Cad, and then averages and outputs the two error vector compensating values. CAMV generation means is composed of registers 145 and 146, adders 147 and 148, an AND gate 150, an inverter 151, and a multiplexer 149. The register 146 receives and stores the AMV. The register 145 receives and stores the average error vector compensating value Vc. The subtracter 147 receives outputs of the registers 145 and 146, and generates a first CAMV, X(n)–Vc, by subtracting the average minimum motion value Vc from the AMV. The adder 148 receives the outputs of the registers 145 and 146, and generates a second CAMV, X(n)+Vc, by adding the AMV to the error vector compensating value Vc. The AND gate 150 receives and ANDs the MSB of the first CAMV, X(n)–Vc, and the MSB of the inverted second CAMV, X(n)+Vc. The multiplexer 149 receives the output of the subtracter 147, i.e., the first CAMV X(n)–Vc, in its first terminal, the output of the adder 148, i.e., the second CAMV X(n)+Vc, in its second terminal, the MSB of the first CAMV X(n)–Vc in its selection terminal, and the output of the gate 120 in its enable terminal. The multiplexer 149 selects a CAMV according to the relation between the AMV and the error vector compensating value Vc, and outputs the selected vector to the address control and zooming process unit 14. Final motion vector generation means generates a first CAMV by subtracting the averaged minimum effective motion value from the AMV, generates a second CAMV by adding the CAMV to the averaged minimum effective motion value, and adaptively generates a CAMV by comparing the AMV with the error vector compensating value Vc, according to the minute motion generated due to the noise component. That is, when the AMV is positive and larger than the error vector compensating value Vc, the first CAMV, X(n)–Vc is selected and outputted as a CAMV, and when the AMV is positive and smaller than the error vector compensating value Vc, the CAMV is reset to "0". When the AMV is negative and smaller than the error vector compensating value Vc, the second CAMV, X(n)+Vc is selected and outputted as a CAMV, and when the AMV is negative and larger than the error vector compensating value Vc, the CAMV is reset to "0".

FIG. 15A is a characteristic view showing the relation between the AMV and the error vector compensating value processed in the first error vector compensation deciding block 141, and FIG. 15B is a characteristic view showing the relation between the average maximum correlation difference Cad and the error vector compensating value processed in the second error vector compensation deciding block 142.

Based on the above constitution, the operation process for the second embodiment of DIS system according to the present invention is described. Here, the step of generating the AMV is the same as in the first embodiment.

When the DIS system is implemented with hardware, in an experiment, small fluctuation due to noise component is detected even in a still image signal. Since the image signal is converted into binary data by edge detection, motion vectors having small magnitude are generated due to the effect of noise component near the maximum correlation value Cmax, and are accumulated, thereby generating unneeded continuous motion as time elapses. To remove the above problem in a still picture and provide a stabilized image, this second embodiment inhibits the error motion vector of the AMV. This is to reset the data corresponding to a small motion vector to "0" by inputting the AMV and outputting data reduced by the error vector compensating value. Then, the noise component of the motion vector is inhibited, thereby stabilizing the reproduction of picture. However, in the above case, minute real fluctuation component of FMV is also removed, so that the function of DIS system may be deteriorated. Accordingly, suggested characteristic equations for a process for inhibiting noise component and also satisfying the efficiency of DIS system, at the same time, are as follows:

$Xc(n)=X(n)-Vc$ ... where $X(n)>0$ and $X(n)>Vc$ $Xc(n)=0$ ... where $X(n)>0$ and $X(n)<Vc$ $Xc(n)=X(n)+Vc$ ... where $X(n)<0$ and $X(n)<-Vc$ $Xc(n)=X(n)-Vc$ ... where $X(n)<0$ and $X(n)>-Vc$ In these equations, $X(n)$ is an AMV of current field and $Xc(n)$ is a coring-processed AMV, and Vc represents an error vector compensating value (coring value) showing a minimum effective motion. Generally, the error vector compensating value Vc is an important element for the signal processing function, and its range can be adaptively varied by combining weights according to the existence or absence of still image by the magnitude of AMV and also according to the existence or absence of effect of noise component by the maximum correlation difference Cdif, i.e., the difference between the maximum correlation value Cmax and the second maximum correlation value C2nd. Here, since the maximum correlation difference Cdif is a signal generated in the unit of MEA, the average maximum correlation difference Cad averaged with one-field period from the maximum correlation difference signal is used. The average maximum correlation difference Cad is generated from the average maximum correlation difference generation block 65. Accordingly, if the AMV and the average maximum correlation difference Cdif are small, it means that the video camera is nearly still, so that the error vector compensating value becomes large to inhibit the noise component, corresponding to small motion. If the AMV and the average maximum correlation difference Cad are respectively large, the motion of video camera is large, so that the error vector compensating value becomes smaller to minimize the hand-fluctuation compensation error. The compensation of AMV and error motion vector could have a stable image maximally in pixel error vector compensating value of 0.5. As a result of an experiment, the coring process is needed in case of 5 pixels in AMV, and is needed in 10 edge matching or more in the average maximum correlation difference Cad. The present invention adaptively gives a predefined error vector compensating value according to the magnitude of AMV and average maximum correlation value Cad as shown in FIGS. 15A and 15B. The adaptive coring process for inhibiting noise component of the AMV can compensate the small motion generated by noise component of still image, while keeping the accuracy of hand-fluctuation compensation.

The hardware constitution for the AMV is shown in FIG. 14. In the present invention, the error vector compensating value is determined by the magnitude of AMV and the average maximum correlation difference Cad. That is, if the AMV and the average maximum correlation difference Cad are respectively small, it means that the camera is almost still, so that the error vector compensating value Vc becomes large so as to inhibit noise. Contrarily, if the AMV and the average maximum correlation difference Cad are respectively large, the motion of camera is large, so that the error vector compensating value Vc becomes small so as to minimize the hand-fluctuation compensation error.

Accordingly, the first error vector compensation deciding block 141 receiving the AMV outputted from the AMV generation unit 13 gives an error vector compensating value of the AMV. That is, the first error vector compensation deciding block 141 gives an error vector compensating value according to the magnitude of the AMV as shown in FIG. 12A. And, when the AMV is "0", the error vector compensating value is the maximum value 0.5, and as the AMV increases, the error vector compensating value linearly decreases, and when it is over "5", the value becomes zero. Also, the second error vector compensation deciding block 142 receiving an average maximum correlation difference Cad outputted from the subtracter 54 of the LMV estimation block 24 gives an error vector compensating value of the average maximum correlation difference Cad. That is, the second error vector compensation deciding block 142 gives an error vector compensating value according to the magnitude of the average maximum correlation difference Cad as shown in FIG. 12B. Experimentally, when the average maximum correlation difference Cad is "0", the error vector compensating value has a maximum value 0.5, and as the average maximum correlation difference Cad gradually increases, the minimum effective motion decreases, and when the average maximum correlation difference Cad is over 10, the value becomes 0. If the error vector compensating values for the AMV and the average maximum correlation difference Cad generated as described above are represented as C1 and C2, respectively, the adder 143 and the divider 144 obtain the average value by adding the C1 and C2 and then dividing the added value by 2. The average value is the error vector compensating value Vc, which is obtained by (C1+C2)/2.

If the error vector compensating value Vc is determined as described above, the motion vector having the inhibited minute motion can be obtained. That is, when the AMV is positive and smaller than the error vector compensating value, and when the AMV is negative and larger than the error vector compensating value, the AMV is reset to "0", thereby not performing motion compensation. When the AMV is positive and larger than the error vector compensating value, or when the AMV is negative and smaller than the error vector compensating value, the magnitude of the AMV is reduced by the error vector compensating value. To inhibit the minute motion as described above, the subtracter 147 subtracts the error vector compensating value Vc from the received AMV X(n), thereby generating the value of X(n)−Vc, and the adder 148 adds the error vector compensating value Vc to the AMV X(n), thereby generating the value of X(n)+Vc. The outputs of the subtracter 147 and the adder 148 are supplied to the first and second terminals of the multiplexer 149, respectively. And, the AND gate 150 receives and ANDs the sign bit MSB of the subtracter 147 and the inverted signal bit MSB of the adder 148, and supplies the generated signal to an enable signal of the multiplexer 149. Accordingly, when the sign bit of the subtracter 147 is "1" and the sign bit of the adder 148 is "0", i.e. when the AMV is positive and smaller in magnitude than the error vector compensating value or when the AMV is negative and smaller in magnitude than the error vector compensating value Vc, the AND gate 150 outputs a logic high signal. In this case, the multiplexer 149 is disenabled, thereby outputting the final AMV Xc(n) as "0". Accordingly, when the AMV has a small motion vector component, it is reset, thereby inhibiting the minute motion vector component generated by the noise component. However, in the other conditions, the gate 120 enables the multiplexer 149. At this time, the sign bit of the first CAMV X(n)−Vc outputted from the subtracter 147 is supplied as a selection signal of the multiplexer 149. Thus, according to the output logic of the subtracter 147, the multiplexer 149 selects and outputs as a final AMV Xc(n) the first final motion vector value of X(n)−Vc received in its first terminal, when the AMV X(n) is positive and larger than the error vector compensating value Vc, and selects and outputs as a final AMV Xc(n) the second CAMV X(n)+Vc received in its second terminal, when the AMV X(n) is negative and smaller than the error vector compensating value Vc. Accordingly, when the motion of camera is large, the AMV is reduced by the error vector compensating value Vc, thereby inhibiting the minute motion vector component generated by noise.

Accordingly, the minute motion component included in the AMV, due to the noise is removed through coringprocess. As a result, the AMV generation unit 13 can supply a signal of reliable motion vector component to the address control and zooming process unit 14. Accordingly, the address control and zooming process unit 14 can exactly control the access position of image data stored in the field memory 15 by the AMV. Accordingly, the address control and zooming process unit 14 implements the stabilized zooming image by zooming a predetermined portion of image with an interpolation method for the image data stored in the field memory 15.

The Third Embodiment

Figure 16:
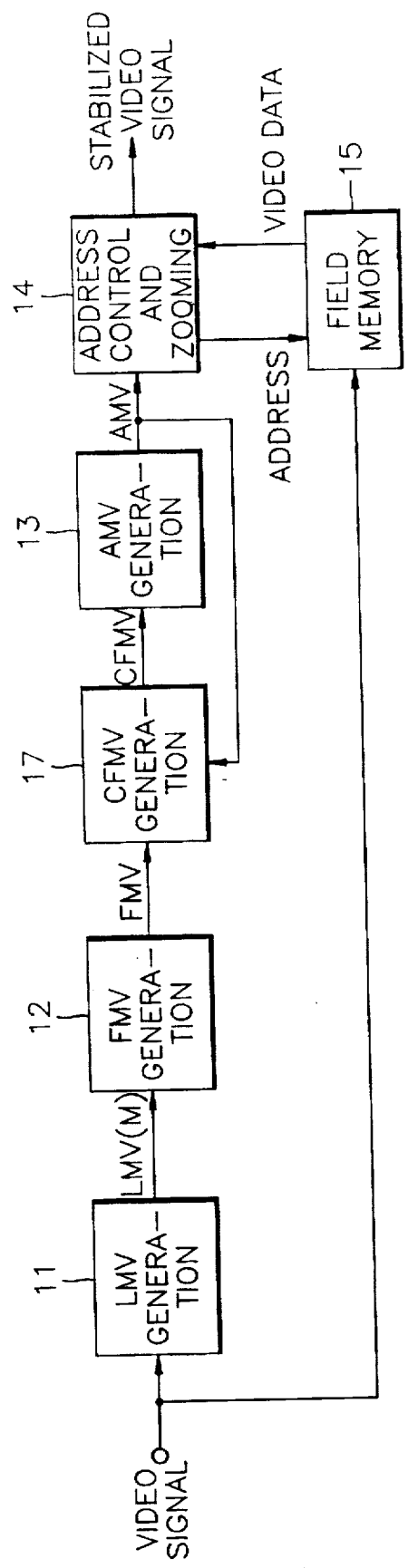
FIG. 16 is a constitution diagram of a third embodiment modified by inserting a compensated field motion vector generation unit between the field motion vector generation unit and the accumulated motion vector generation unit shown in the first embodiment.

FIG. 16 is a constitution diagram of third embodiment of DIS system according to the present invention. In the third embodiment of the present invention shown in FIG. 16, a compensated field motion vector generation unit 17 is coupled between the output terminal of FMV generation unit 12 and the input terminal of the AMV generation unit 13 shown in the first embodiment of FIG. 1. The constitution of FIG. 16 shown as the third embodiment is described. Digital image data generated from a camera is supplied to a LMV generation unit 11 and a field memory 15. The LMV generation unit 11 receives digital image data, detects binary edge signal of current field from the received image data, computes correlation value with comparison between two consecutive fields by matching patterns of detected current field binary edge signal and previous field binary edge signal in the unit of MEA, and generates LMV and statistical variables of corresponding MEA using the correlation data. A FMV generation unit 12 coupled to an output terminal of the LMV generation unit 11 receives LMVs and statistical variables. The FMV generation unit 12 generates a FMV showing a complete one-field motion from the received LMVs and statistical variables according to the existence or absence of stable image. The compensated FMV generation unit 17 coupled to the output terminal of the FMV generation unit 12 receives a FMV for the current field and the average motion vector for the previous field, stored in the unit 17 as previous-field average motion vector PAMV. The compensated FMV generation unit 17 responds to PAMV for determining the magnitude of minute motion that is to be suppressed, and generates a compensated FMV (hereinafter referred to as CFMV) by removing the error motion vector included in the received FMV. The AMV generation unit 13 coupled to an output terminal of the CFMV generation unit 17 receives the received CFMV. The AMV generation unit 13 accumulates the received CFMVs, thereby generating an AMV for stabilizing the fluctuation between consecutive fields into an initial state. The generated AMV is supplied as an input of the CFMV generation unit 17. A field memory 15 receives and stores the image data and outputs the image data stored in corresponding area by a received read address. The address control and zooming process unit 14 coupled to the output terminal of the AMV generation unit 13 generates a read address from the received AMV and supplies the generated read address to the field memory 15. And, at the same time, it receives the image data read from the field memory 15 and performs a motion compensation. That is, the address control and zooming process unit 14 performs the motion compensation through the above process for the image data received from the field memory 15 by a read address, and outputs a finally stabilized image by zooming a predetermined potion of image with interpolation for the image signal in the digital zooming process step.

In the constitution of third embodiment, the CFMV generation unit 17 removes an error motion vector included in the received FMV and accordingly, can remove minute motion component nearly like a still picture in FMV, thereby reproducing the stabilized image. Here, the error vector compensating value_for adaptively coring-processing the FMV can be implemented with the same form as in the second embodiment. That is, the CFMV generation unit 17 uses an adaptive error vector compensating value, and the PAMV and the average maximum correlation difference Cad are used as elements for determining the error vector compensating value. In this case, as the magnitude of PAMV and the average maximum correlation difference Cad are smaller, the probability of falsely detected motion vector is large, so that the error vector compensating value becomes large, thereby removing the minute motion included in the FMV. Accordingly, when the PAMV is large or the average maximum correlation difference Cad is large, the motion compensation can be perfectly performed maximally using the detected motion vector.

Figure 17:
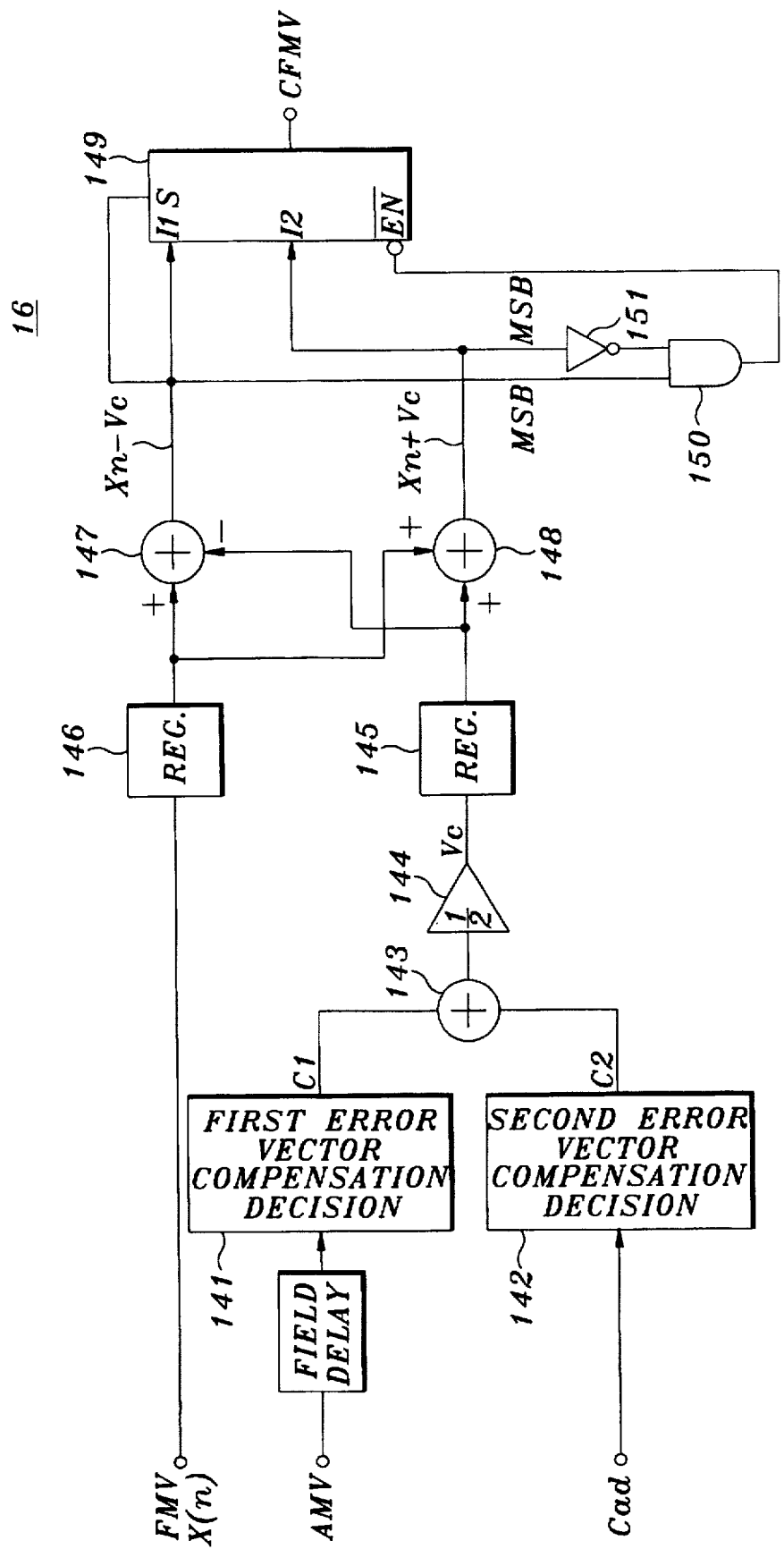
FIG. 17 is a constitution diagram of the compensated field motion vector generation unit shown in FIG. 16, which eliminates a minute error motion by determining correlation between previous accumulated motion vector and average maximum correlation difference.

FIG. 17 is a constitution diagram of CFMV generation unit 17 for inhibiting minute motion vector, when the CFMV includes minute motion vector due to noise. Minimum motion decision means is composed of error vector compensation deciding blocks 141 and 142, an adder 143, and a divider 144. The first error vector compensation deciding block 141 coupled to the output terminal of the AMV generation unit 13 decides a minimum motion of PAMV received through a field delay 152, thereby generating a first error vector compensating value C1. The second error vector compensation deciding block 142 coupled to the subtracter 54 generates a second error vector compensating value C2 by deciding a minimum motion of the received average maximum correlation difference Cad. The adder 143 coupled to the output terminals of first and second error vector compensation deciding blocks 141 and 142 adds the C1 and C2. The divider 144 coupled to the adder 143 generates an average error vector compensating value Vc by dividing the output C1+C2 of the adder 143 by a half.

Accordingly, minimum motion decision means decides the error vector compensating values of received PAMV and average maximum correlation difference Cad, respectively, and then averages and outputs as an error vector compensating value Vc the two error vector compensating values. Compensating motion vector generation means is composed of registers 145 and 146, a subtracter 147, an adder 148, an AND gate 150, an inverter 151, and a multiplexer 149. The register 146 receives and stores the FMV. The register 145 receives and stores the error vector compensating value Vc. The subtracter 147 receives outputs of the registers 145 and 146, and generates a first CFMV, X(n)Vc, by subtracting the error vector compensating value Vc from the FMV. The adder 148 receives the outputs of the registers 145 and 146, and generates a second CFMV, X(n)+Vc, by adding the FMV to the error vector compensating value Vc. The AND gate 150 receives and ANDs the MSB of the first CFMV, X(n)–Vc, and the MSB of the inverted second CFMV, X(n)+Vc. The multiplexer 149 receives the output of the subtracter 147, i.e., the first CFMV X(n)–Vc, in its first terminal, the output of the adder 148, i.e., the second CFMV X(n)+Vc, in its second terminal, the MSB of the first CFMV X(n)–Vc in its selection terminal, and the output of the gate 120 in its enable terminal. The multiplexer 149 generates a CFMV according to the relation between the FMV and the error vector compensating value Vc, and outputs the selected vector to the address control and zooming process unit 14. The compensating motion vector generation means generates a first CFMV by subtracting an error vector compensating value Vc showing an averaged minimum motion value from the FMV, generates a second CFMV by adding the FMV to the error vector compensating value. When the FMV is positive and larger in magnitude than the error vector compensating value Vc, the first CFMV, X(n)–Vc is selected and outputted as a CFMV, and when the FMV is negative and larger in magnitude than the error vector compensating value Vc, the second CFMV, X(n)+Vc, is selected and outputted as a CFMV. And, when the FMV is positive and smaller in magnitude than the error vector compensating value Vc or when the FMV is negative and smaller in magnitude than the error vector compensating value Vc, the CFMV is reset to "0", thereby inhibiting the noise component.

FIG. 15A is a characteristic view showing the relation between the PAMV and the error vector compensating value processed in the first error vector compensation deciding block 141, and FIG. 15B is a characteristic view showing the relation between the average maximum correlation difference Cad and the error vector compensating value processed in the second error vector compensation deciding block 142.

Figure 18:
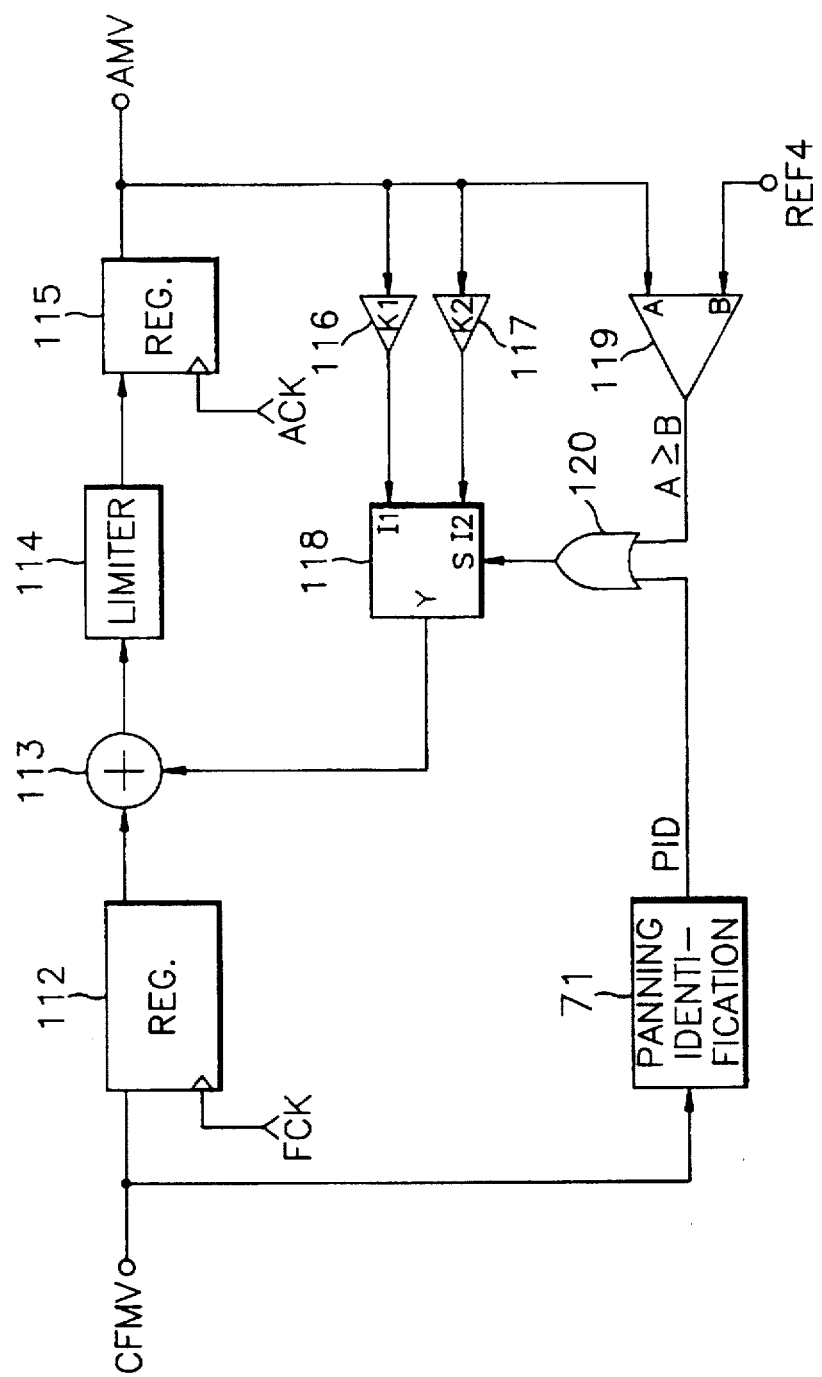
FIG. 18 is a constitution diagram of accumulated motion vector generation unit shown in FIG. 16, which attenuates an accumulated motion vector by selecting a proper attenuation-coefficient according to identification of panning and state of accumulated motion vector, and accumulates the attenuated accumulated motion vector into the compensated field motion vector.

FIG. 18 is a constitution diagram of the AMV generation unit 13 shown in FIG. 16. The panning identifying block 111 receives the CFMV and correlation data COR and regards as intentional panning that the CFMV is generated in the identical direction over a predetermined number of frames, thereby generating a panning identification signal PID for changing an attenuation-coefficient of the AMV. Also, a comparator 119 receives previous AMV as a compared input and receives as a reference input a fourth threshold value REF4 which makes the magnitude of AMV be within the maximum compensation area. The comparator 119 generates a compared result signal for changing an attenuation-coefficient of the AMV when the magnitude of AMV is larger than the fourth threshold value REF4. An OR gate 120 receives outputs of the panning identifying block 111 and comparator 119, and supplies the received signal as a selection signal of attenuation-coefficient. Attenuation decision means is composed of a multiplexer 118 and attenuators 116 and 117. The first attenuator 116 receives previous AMV and attenuates the received AMV by a first attenuation-coefficient K1 which has been set. The second attenuator 117 receives previous AMV and attenuates the received AMV by a second attenuation-coefficient K2. The multiplexer 118 receives an output of the first attenuator 116 in its first terminal, an output of the second attenuator 117 in its second terminal, and an output of the OR gate 120 in its selection terminal. The multiplexer 118 selects and outputs an output of the second attenuator 117 when the panning identification signal PID or a compared result signal is received, and selects and outputs an output of the first attenuator 116, in other cases. AMV generation means is composed of registers 112 and 115, an adder 113, and a limiter 114. The register 112 stores the received CFMV. The adder 113 receives outputs of the register 112 and the multiplexer 118, and generates an AMV by adding two signals. The limiter 114 receives the output of the adder 113 and performs limiting when the AMV is larger than a predetermined magnitude. The register 115 receives and stores an output of the limiter 114, and supplies the stored one as inputs of attenuators 116 and 117, and comparator 119 and at the same time, outputs it to the address control and zooming process unit 14.

FIG. 12A shows a form of panning identification signal PID, FIG. 12B is a view showing the movement of AMV according to the time, and FIG. 12C shows the step of switching the attenuation-coefficients to generate the AMV shown in FIG. 12B when the panning is sensed from the FMV.

Based on the above constitution, the operation process for the third embodiment of DIS system according to the present invention is described. Here, the step of generating the FMV is the same as in the operation step of the first embodiment.

When the DIS system is implemented with hardware as described above, small fluctuation is detected due to the noise component in a still image signal. This phenomenon is because a motion vector having a small magnitude is generated due to the effect of noise component near the maximum correlation value Cmax and is included in the FMV, when the image signal is converted into the binary data by edge detection. Accordingly, if the AMV generation unit 13 generates an AMV by accumulating the FMV, the falsely detected motion vectors are accumulated, thereby generating unneeded continuous motion according to time. To remove the above problem in a still picture and provide a stabilized image, the third embodiment inhibits the error motion vector included in the FMV. This is to reset the data corresponding to a small motion vector to "0" by inputting the FMV including the falsely detected minute motion vector and outputting data reduced by the error vector compensating value. Then, the noise component of the motion vector is inhibited, thereby stabilizing the reproduction of picture. However, in the above case, minute real fluctuation component of FMV is also removed, so that the function of DIS system can be deteriorated. Accordingly, suggested characteristic equations for a process for inhibiting noise component and also satisfying the efficiency of DIS system, at the same time, are as follows:

$Xc(n)=X(n)-Vc$ ... where $X(n)>0$ and $X(n)>Vc$ $Xc(n)=0$ ... where $X(n)>0$ and $X(n)<Vc$ $Xc(n)=X(n)+Vc$ ... where $X(n)<0$ and $X(n)<-Vc$ $Xc(n)=0$ ... where $X(n)<0$ and $X(n)>-Vc$ In these equations, $X(n)$ is a current FMV and $Xc(n)$ is a coring-processed FMV, i.e., CFMV, and Vc represents an error vector compensating value (coring value) showing a minimum effective motion. Generally, the error vector compensating value Vc is an important factor for the signal processing function, and its range can be adaptively varied by combining weights according to the existence or absence of still image by the magnitude of PAMV and also according to the existence or absence of effect of noise component by an one-field average signal of the maximum correlation difference Cdif, i.e., the difference between the maximum correlation value Cmax and the second maximum correlation value C2nd. That is, if the PAMV and the average maximum correlation difference Cad are small, it means that the video camera is almost still, so that the error vector compensating value becomes large to inhibit the noise component, corresponding to small motion. If the PAMV and the average maximum correlation difference Cad are respectively large, the motion of video camera is large, so that the error vector compensating value becomes smaller to minimize the hand-fluctuation compensation error.

The constitution of removing the minute noise of the FMV is shown in FIG. 17. As described above, a stabilized image signal is obtained, if the error motion vector included in the FMV is inhibited. To adaptively inhibit the error motion vector of FMV, the third embodiment decides the error vector compensating value by the magnitude of PAMV and the average maximum correlation difference Cad as in the second embodiment. That is, if the PAMV and the average maximum correlation difference Cad are respectively small, it means that the camera is nearly still, so that the error vector compensating value Vc becomes large so as to inhibit noise. Contrarily, if the PAMV and the average maximum correlation difference Cad are respectively large, the motion of camera is large, so that the error vector compensating value Vc becomes small so as to minimize the hand-fluctuation compensation error.

Accordingly, the first error vector compensation deciding block 141 receiving the PAMV gives an error vector compensating value showing a minimum effective motion of PAMV. That is, the first error vector compensation deciding block 141 gives an error vector compensating value according to the magnitude of the PAMV as shown in FIG. 12A. Also, the second error vector compensation deciding block 142 receiving an average maximum correlation difference Cad outputted from the subtracter 54 of the LMV estimation block 24 gives an error vector compensating value representing the minimum effective motion of the average maximum correlation difference Cad. That is, the second error vector compensation deciding block 142 gives an error vector compensating value according to the magnitude of the average maximum correlation difference Cad as shown in FIG. 12B. As described above, when the average maximum correlation difference Cad is "0", the error vector compensating value has a maximum value 0.5, and as the average maximum correlation difference Cad gradually increases, the minimum effective motion decreases, and when the average maximum correlation difference Cad is over 10, the value becomes 0. If the error vector compensating values for the PAMV and the average maximum correlation difference Cad generated as described above are represented as C1 and C2, respectively, the adder 143 and the divider 144 obtain the average value by adding the C1 and C2 and then dividing the added value by 2. The average value is the error vector compensating value Vc, which is obtained by $(C1+C2)/2$. If the error vector compensating value Vc is decided as described above, the CFMV having the inhibited minute motion can be obtained. To inhibit the minute motion as described above, the subtracter 147 subtracts the error vector compensating value Vc from the received FMV X(n), thereby generating the value of X(n)−Vc, and the adder 148 adds the error vector compensating value Vc to the received FMV X(n), thereby generating the value of X(n)+Vc. The outputs of the subtracter 147 and the adder 148 are supplied to the first and second terminals of the multiplexer 149, respectively. And, the OR gate 150 receives and OR-gates the sign bit MSB of the subtracter 147 and the inverted sign bit MSB of the adder 148, and supplies the generated signal as an enable signal of the multiplexer 149. Accordingly, when the sign bit of the subtracter 147 is "1" and the sign bit of the adder 148 is "0", i.e. when the FMV is positive and smaller than the error vector compensating value Vc or when the FMV is negative and larger than the error vector compensating value Vc, the OR gate 150 outputs a logic high signal. In this case, the multiplexer 149 is disabled, thereby outputting the CFMV Xc(n) as "0". Accordingly, when the received FMV has a small motion vector component, the CFMV is reset, thereby inhibiting the minute motion vector component. However, in the other conditions, the gate 150 enables the multiplexer 149. At this time, the sign bit of the first CFMV X(n)−Vc outputted from the subtracter 147 is supplied as a selection signal of the multiplexer 149. Thus, according to the output logic of the subtracter 147, the multiplexer 149 outputs the first final motion vector value of X(n)−Vc received in its first terminal as a CFMV, when the received FMV X(n) is positive and larger than the error vector compensating value Vc, and selects and outputs as a CFMV the second CFMV X(n)+Vc received in its second terminal, when the FMV X(n) is negative and smaller than the error vector compensating value Vc. Thus, a resultant CFMV is outputted as a value reduced by the error vector compensating value, and accordingly, minute motion vector of noise component included in the FMV can be inhibited.

Then, the CFMV generation unit 17 shown in FIG. 17 receives the FMV generated as described above and generates the CFMV. Here, the CFMV is a motion vector component where the falsely detected motion vector included in the FMV is removed. Accordingly, since the minute noise component included in the FMV is inhibited, the AMV generation unit 13 can generate an AMV with a stabilized operation. The operation of the AMV generation unit 13 is performed like those in the first and second embodiments.

Accordingly, the minute motion component included in the FMV as described above is removed through coringprocess. As a result, the AMV generation unit 13 can supplies a signal of reliable motion vector component to the address control and zooming process unit 14. Accordingly, the address control and zooming process unit 14 can exactly control the access position of image data stored in the field memory 15 by the AMV. Accordingly, the address control and zooming process unit 14 implements the stabilized zooming image by zooming a predetermined portion of image with interpolation method for image data stored in the field memory 15.

In other embodiments of the invention, in addition to the preferred embodiments described above, the weighted averaging of the LMVs to generate the FMV is performed without the weighting of the LMVs by stability weights, which sacrifices the benefit of confirming the validity of LMVs in the current field by reference to the FMV of the previous field(s). The benefits of improving the signal-to-noise ratio of the FMV by a few dB as long as the LMVs in the current field tend to correlate with each other are retained, however.

As described above, in the image stabilization system of the present invention, irregular phenomenon of image is adaptively processed, thereby deciding accurate motion vector. This adaptive DIS system can be applied in a video camera, VCR, etc. Such a DIS system performs switching of attenuation coefficients according to the identification of hand-fluctuation and panning, adaptive controlling of system by determination of image characteristic and weights, and noise elimination of motion vector by stopping and hand-fluctuation state determination, etc. Also, implementation of the above adaptive DIS system with only hardware shortens the operation time and at the same time, easily makes system integration.

What is claimed is:

1. An image stabilization device having a memory for storing image data in fields, and a control portion for correcting motion of image data stored in said memory by a received accumulated motion vector, said image stabilization device comprising:

local motion vector generation means for receiving image data, converting said received image data into binary edge data, sequentially generating correlation data in local motion estimation areas by matching patterns of said edge data of current field and previous field, and sequentially generating respective local motion vectors of said local motion estimation areas and respective statistical variables descriptive of said local motion vectors by analyzing said generated correlation data, said statistical variables including the respective isolativity of each of said local motion vectors from other local motion vectors within the same field and including the respective instability of each of said local motion vectors in each most recent field respective to a field just previous;

field motion vector generation means for receiving said local motion vectors and statistical variables, generating a respective isolation weight for each said local motion vector that is of decreased value with increased isolativity and is zero for isolativity beyond a predefined value, generating a respective stability weight signal that is of decreased value with increased instability, generating a respective output weight signal for each said local motion vector by additively combining its respective isolation and respective stability weights and generating a respective field motion vector by weighted averaging of the local motion vectors within each field, said weighted averaging including a multiplying of each of said local motion vectors within each field by a corresponding one of said output weight signals to form a product that selectively is included or is not included at all within a vector sum of weighted local motion vectors within each field, which vector sum is divided by a sum of the weights just of said weighted local motion vectors included in said vector sum in order to generate said respective field motion vector; and accumulated motion vector generation means for receiving said field motion vector and generating said accumulated motion vector by accumulating said received field motion vector into an attenuated response to the previous accumulated motion vector supplied by attenuator means included within said accumulated motion vector generation means.

2. An image stabilization device as claimed in claim 1, wherein said local motion vector generation means comprises:

edge detection means for receiving said image data and converting field image into binary edge data by analyzing said received image data;

storage means for temporarily storing said binary edge data for at least selected pixels in each of at least two local motion estimation areas, for receiving said binary edge data for each of said local motion estimation areas and storing that data until at least a next succeeding field;

edge pattern matching means for receiving binary edge data of current field supplied from said edge detection means as compared data and binary edge data of a previous field supplied from said storage means as reference data, matching patterns of said two block data, thereby sequentially generating correlation data of corresponding local motion estimation areas; and local motion vector estimation means for receiving said correlation data, and comparing said correlation data received from corresponding local motion estimation area with previous statistical variables detected in corresponding local motion estimation area, thereby generating a state of changed correlation data as statistical variables and at the same time, generating a position value of maximum correlation as a local motion vector of corresponding local motion estimation area.

3. An image stabilization device as claimed in claim 2, wherein said local motion vector estimation means comprises:

comparing means for comparing said received correlation data with a previous maximum correlation value of corresponding local motion estimation area, thereby generating a first comparing signal when said correlation data is larger;

local motion vector detection means for receiving address clocks and an output of said comparing means, generating a position value of said received correlation data by counting said address clocks, and generating a position value of said received correlation data as a local motion vector of corresponding local motion estimation area when said first comparing signal is received; and means for generating said statistical variables of corresponding local motion estimation area, which means comprises: maximum correlation generation means for receiving said received correlation data and an output of comparing means and generating said received correlation data as a maximum correlation value when said first comparing signal is received;

means for receiving outputs of said maximum correlation generation means and said comparing means and generating a previous maximum correlation value as a second maximum correlation value when said first comparing signal is received;

means for receiving said maximum correlation value and said second maximum correlation value and generating a maximum correlation difference by subtracting said second maximum correlation value from said maximum correlation value; and means for generating an average correlation value by adding said received correlation data into previous correlation data and dividing added correlation data by a number of motion vector candidates.

4. An image stabilization device as claimed in claim 1, wherein said control portion for correcting motion of image data stored in said memory receives a compensated accumulated motion vector, said image stabilization device further comprising:

compensated accumulated motion vector generation means for receiving said accumulated motion vector, generating an error motion compensating value responsive to the magnitude of said accumulated motion vector generated by said accumulated motion vector generation means, and generating said compensated accumulated motion vector by coring said accumulated motion vector, so as to reduce said compensated accumulated motion vector to zero whenever the amplitude of said accumulated motion vector is smaller than said error motion compensating value.

5. An image stabilization device as claimed in claim 4, wherein said local motion vector generation means comprises:

edge detection means for receiving said image data and converting field image into binary edge data by analyzing said received image data;

storage means for temporarily storing said binary edge data for at least selected pixels in each of at least two local motion estimation areas, for receiving said binary edge data for each of said local motion estimation areas and storing that data until at least a next succeeding field;

edge pattern matching means for receiving binary edge data of current field supplied from said edge detection means as compared data and binary edge data of a previous field supplied from said storage mean-s as reference data, matching patterns of said two block data, thereby sequentially generating correlation data of corresponding local motion estimation areas; and local motion vector estimation means for receiving said correlation data, and comparing said correlation data received from corresponding local motion estimation area with previous statistical variables detected in corresponding local motion estimation area, thereby generating a state of changed correlation data as statistical variables and at the same time, generating a position value of maximum correlation as a local motion vector of corresponding local motion estimation area.

6. An image stabilization device as claimed in claim 5, wherein said local motion vector estimation means comprises:

comparing means for comparing said received correlation data with a previous maximum correlation value of corresponding local motion estimation area, thereby generating a first comparing signal when said correlation data is larger;

local motion vector detection means for receiving address clocks and an output of said comparing means, generating a position value of said received correlation data by counting said address clocks, and generating a position value of said received correlation data as a local motion vector of corresponding local motion estimation area when said first comparing signal is received; and means for generating said statistical variables of corresponding local motion estimation area, which means comprises: maximum correlation generation means for receiving said received correlation data and an output of comparing means and generating said received correlation data as a maximum correlation value when said first comparing signal is received;

means for receiving outputs of said maximum correlation generation means and said comparing means and generating a previous maximum correlation value as a second maximum correlation value when said first comparing signal is received;

means for receiving said maximum correlation value and said second maximum correlation value and generating a maximum correlation difference by subtracting said second maximum correlation value from said maximum correlation value; and means for generating an average correlation value by adding said received correlation data into previous correlation data and dividing added correlation data by a number of motion vector candidates.

7. An image stabilization device as claimed in claim 6, wherein said local motion vector generation sequentially generates respective statistical variables descriptive of said local motion vectors other than the respective isolativity and the respective instability of each of said local motion vectors, and wherein said field motion vector generation means comprises:

reliability determination means for receiving said other statistical variables sequentially supplied from said local motion estimation means, determining from said other statistical variables whenever an irregular condition of image data occurs deteriorating reliability of local motion vector, and generating an abnormal-condition signal whenever said reliability determination means determines that an irregular condition of image data occurs;

weight signal generation means for receiving the respective isolativity and the respective instability of each local motion vector from said local motion vector generation means, generating said weight signal for each said local motion vector with a value dependent on both its respective isolativity and its respective stability, supplying said weight signal as an output weight signal as long as said reliability determination means does not generate an abnormal-condition signal, and supplying a zero value as said output weight signal whenever said reliability determination means generates an abnormal-condition signal; and field motion decision means for sequentially receiving said output weight signals and said local motion vectors, sequentially applying said output weight signals to received local motion vectors of local motion estimation areas, respectively, and generating a respective field motion vector for each field by averaging the resulting weighted local motion vectors thereof that are provided with non-zero weights.

8. An image stabilization device as claimed in claim 7, wherein said reliability determination means comprises:

first comparing means for comparing said average correlation value with a reference value of low contrast, i.e., a first threshold value, and generating an abnormal-condition signal when said average correlation value is smaller than said first threshold value;

second comparing means for generating a first difference signal by subtracting said average correlation value from said maximum correlation value, comparing said first difference signal with a reference value determining a moving object, i.e., a second threshold, and generating an abnormal-condition signal when said first difference signal is smaller than said second threshold value; and third comparing means for generating a second difference signal by subtracting said second maximum correlation value from said maximum correlation value, comparing said second difference signal with a reference value determining a repeated image, i.e., a third threshold value, and generating an abnormal-condition signal when said second difference signal is smaller than said third threshold value.

9. An image stabilization device having a memory for storing image data in fields, and a control portion for correcting motion of image data stored in said memory by a received accumulated motion vector, said image stabilization device comprising:

local motion vector generation means for receiving image data, converting said received image data into binary edge data, sequentially generating correlation data in local motion estimation areas by matching patterns of said edge data of current field and previous field, sequentially generating respective local motion vectors of said local motion estimation areas and respective statistical variables descriptive of said local motion vectors by analyzing said generated correlation data, said statistical variables including the respective isolativity of each of said local motion vectors from other local motion vectors within the same field, which respective isolativity is generated as the magnitude of the result of differentially comparing said local motion vector with an average of the local motion vectors for the same image field, said statistical variables including the respective instability of each of said local motion vectors from a corresponding local motion vector within the previous field, which respective instability is generated as the magnitude of the result of differentially comparing said local motion vector with the corresponding local motion vector within the previous field, and said statistical variables also including other statistical variables besides said isolativities and instabilities;

reliability determination circuitry receiving said other statistical variables sequentially supplied from said local motion estimation means, determining from said other statistical variables whether an abnormal condition deteriorating reliability of local motion vector occurs or not, and generating an abnormal-condition signal whenever a result of such determinations is indicative that an abnormal condition occurs;

weight signal generation means for receiving for each field said local motion vectors sequentially supplied from said local motion vector estimation means and average local motion vectors generated in fields, generating a respective isolation weight signal for each local motion vector that is of decreased value with increased isolativity and is zero for isolativity beyond a predefined value, generating a respective stability weight signal that is of decreased value with increased instability, supplying an output weight signal dependent on the sum of said isolation weight signal and said stability weight signal as long as said reliability determination circuitry does not generate an abnormal-condition signal, and supplying an output weight signal of zero value whenever said reliability determination circuitry generates an abnormal-condition signal;

field motion decision means for sequentially receiving said output weight signals and said local motion vectors, and applying said output weight signals to corresponding received local motion vectors of local motion estimation areas, as a part of generating a respective field motion vector for each field by performing a weighted averaging of said local motion vectors within that field; and accumulated motion vector generation means for receiving said field motion vector and generating said accumulated motion vector by accumulating said received field motion vector into an attenuated response to the previous accumulated motion vector supplied by attenuator means included within said accumulated motion vector generation means.

10. An image stabilization device as claimed in claim 9; wherein said other statistical variables besides said isolativities include average correlation when matching patterns of said edge data of a current field and a previous field, maximum correlation when matching patterns of said edge data of the current field and the previous field, and a second maximum correlation corresponding to the most recent past maximum correlation; and wherein said reliability determination circuitry comprises:

first comparing means for comparing said average correlation value with a reference value of low contrast, i.e., a first threshold value, and generating an abnormal-condition signal when said average correlation value is smaller than said first threshold value;

second comparing means for generating a first difference signal by subtracting said average correlation value from said maximum correlation value, comparing said first difference signal with a reference value determining a moving object, i.e., a second threshold, and generating an abnormal-condition signal when said first difference signal is smaller than said second threshold value; and third comparing means for generating a second difference signal by subtracting said second maximum correlation value from said maximum correlation value, comparing said second difference signal with a reference value determining a repeated image, i.e., a third threshold value, and generating an abnormal-condition signal when said second difference signal is smaller than said third threshold value.

11. An image stabilization device having a memory for storing image data in fields, and a control portion for correcting motion of image data stored in said memory by a received accumulated motion vector said image stabilization device comprising:

local motion vector generation means for receiving image data, converting said received image data into binary edge data, sequentially generating correlation data in local motion estimation areas by matching, patterns of said edge data of current field and previous field, sequentially generating respective local motion vectors of said local motion estimation areas and respective statistical variables descriptive of said local motion vectors by analyzing said generated correlation data, said statistical variables including the respective isolativity of each of said local motion vectors from other local motion vectors within the same field, which respective isolativity is generated as the magnitude of the result of differentially comparing said local motion vector with an average of the local motion vectors for the same image field, said statistical variables including the respective instability of each of said local motion vectors from a corresponding local motion vector within the previous field, which respective instability is generated as the magnitude of the result of differentially comparing said local motion vector with the corresponding local motion vector within the previous field, and said statistical variables also including other statistical variables besides said isolativities and instabilities;

reliability determination circuitry receiving said other statistical variables sequentially supplied from said local motion estimation means, determining from said other statistical variables whether an abnormal condition deteriorating reliability of local motion vector occurs or not, and generating an abnormal-condition signal whenever a result of such determinations is indicative that an abnormal condition occurs;

weight signal generation means for receiving for each field said local motion vectors sequentially supplied from said local motion vector estimation means and average local motion vectors generated in fields, generating a respective isolation weight signal for each local motion vector that is of decreased value with increased isolativity and is zero for isolativity beyond a predefined value, generating a respective stability weight signal that is of decreased value with increased instability, generating a respective output weight signal for each said local motion vector by averaging its respective isolation and respective stability weights as long as said reliability determination circuitry does not generate said abnormal-condition signal, and supplying an output weight signal of zero value whenever said reliability determination circuitry generates an abnormal-condition signal, field motion decision means for sequentially receiving said output weight signals and said local motion vectors, and applying said output weight signals to corresponding received local motion vectors of local motion estimation areas, as a part of generating a respective field motion vector for each field by performing a weighted averaging of said local motion vectors within that field; and accumulated motion vector generation means for receiving said field motion vector and generating said accumulated motion vector by accumulating said received field motion vector into an attenuated response to the previous accumulated motion vector supplied by attenuator means included within said accumulated motion vector generation means.

12. An image stabilization device as claimed in claim 11, wherein said field motion decision means comprises:

means for generating weighted local motion vectors by multiplying said sequentially received local motion vectors each by a respective corresponding isolation weight signal and by a respective stability weight signal to generate respective ones of said weighted local motion vectors;

means for summing said isolation and stability weight signals to generate a summed weight signal; and means for generating a field motion vector by summing said weighted local motion vectors and then dividing said summed local motion vector by said summed weight signal.

13. An image stabilization device as claimed in claim 11; wherein said other statistical variables besides said isolativity for each local motion vector include average correlation when matching patterns of said edge data of a current field and a previous field, maximum correlation when matching patterns of said edge data of the current field and the previous field, and a second maximum correlation corresponding to the most recent past maximum correlation; and wherein said reliability determination means comprises:

first comparing means for comparing said average correlation value with a reference value of low contrast, i.e., a first threshold value, and generating an abnormal-condition signal when said average correlation value is smaller than said first threshold value;

second comparing means for generating a first difference signal by subtracting said average correlation value from said maximum correlation value, comparing said first difference signal with a reference value determining a moving object, i.e., a second threshold, and generating an abnormal-condition signal when said first difference signal is smaller than said second threshold value; and third comparing means for generating a second difference signal by subtracting said second maximum correlation value from said maximum correlation value, comparing said second difference signal with a reference value determining a repeated image, i.e., a third threshold value, and generating an abnormal-condition signal when said second difference signal is smaller than said third threshold value.

14. An image stabilization device having a memory for storing image data in fields, and a control portion for correcting motion of image data stored in said memory by a received accumulated motion vector, said image stabilization device comprising:

local motion vector generation means for receiving image data, converting said received image data into binary edge data, sequentially generating correlation data in local motion estimation areas by matching patterns of said edge data of current field and previous field, sequentially generating respective local motion vectors of said local motion estimation areas and respective statistical variables descriptive of said local motion vectors by analyzing said generated correlation data, said statistical variables including the respective isolativity of each of said local motion vectors from other local motion vectors within the same field, which respective isolativity is generated as the magnitude of the result of differentially comparing said local motion vector with an average of the local motion vectors for the same image field, said statistical variables including the respective instability of each of said local motion vectors from a corresponding local motion vector within the previous field, which respective instability is generated as the magnitude of the result of differentially comparing said local motion vector with the corresponding local motion vector within the previous field, and said statistical variables also including other statistical variables besides said isolativities and instabilities, reliability determination circuitry receiving said other statistical variables sequentially supplied from said local motion estimation means, determining from said other statistical variables whether an abnormal condition deteriorating reliability of local motion vector occurs or not, and generating an abnormal-condition signal whenever a result of such determinations is indicative that an abnormal condition occurs;

weight signal generation means for receiving for each field said local motion vectors sequentially supplied from said local motion vector estimation means and average local motion vectors generated in fields generating a respective isolation weight signal for each local motion vector that is of decreased value with increased isolativity and is zero for isolativity beyond a predefined value, generating a respective stability weight signal that is of decreased value with increased instability supplying an output weight signal dependent on said isolation weight signal and on said stability weight signal as long as said reliability determination circuitry does not generate an abnormal-condition signal and supplying an output weight signal of zero value whenever said reliability determination circuitry generates an abnormal-condition signal;

field motion decision means for sequentially receiving said output weight signals and said local motion vectors, and applying said output weight signals to corresponding received local motion vectors of local motion estimation areas, as a part of generating a respective field motion vector for each field by performing a weighted averaging of said local motion vectors within that field;

panning identification means for receiving said field motion vectors, regarding generation of field motion vectors having substantially identical values over a predetermined number of fields as resulting from deliberate panning, and generating an indication of the occurrence of deliberate panning;

means for determining whether or not said received accumulated motion vector tends to leave a range in which undesired motion of said image data stored in said memory can be corrected for; and accumulated motion vector generation means for receiving said field motion vector and generating said accumulated motion vector by accumulating said received field motion vector into an attenuated response to the previous accumulated motion vector supplied by attenuator means included within said accumulated motion vector generation means, for multiplying said previous accumulated motion vector by a first factor smaller than one to generate said attenuated response when there is no indication of the occurrence of deliberate panning generated and it is determined said received accumulated motion vector does not tend to leave said range in which undesired motion of said image data stored in said memory can be corrected for, for multiplying said previous accumulated motion vector by a second factor smaller than said first factor to generate said attenuated response whenever said indication of the occurrence of deliberate panning, is generated, and for multiplying said previous accumulated motion vector by said second factor whenever it is determined said received accumulated motion vector tends to leave said range.

15. An image stabilization device as claimed in claim 14, further comprising:

means for receiving said accumulated motion vector and an upper limit value of said accumulated motion vector, i.e., a threshold value, and generating a second-attenuation-means selection signal of said selection means when a magnitude of said accumulated motion vector is larger than said threshold value; and a limiter coupled between said adding means and said control portion, for maintaining said accumulated motion vector with a constant value when said accumulated motion vector exceeds a maximum compensation area of motion vector.

16. An image stabilization device having a memory for storing image data in fields, and a control portion for correcting motion of image data stored in said memory by a compensated accumulated motion vector, said image stabilization device comprising:

local motion vector generation means for receiving image data, converting said received image data into binary edge data, sequentially generating correlation data in local motion estimation areas by matching patterns of said edge data of current field and previous field and sequentially generating respective local motion vectors of said local motion estimation areas and respective statistical variables descriptive of said local motion vectors by analyzing said generated correlation data, said statistical variables including the respective isolativity of each of said local motion vectors from other local motion vectors within the same field, said statistical variables including the respective instability of each of said local motion vectors in each most recent field respective to a field just previous, and said statistical variables also including other statistical variables besides said isolativities and instabilities;

field motion vector generation means for receiving said local motion vectors and statistical variables, generating a respective isolation weight for each said local motion vector that is of decreased value with increased isolativity and is zero for isolativity beyond a predefined value, and generating a respective field motion vector by weighted averaging of the local motion vectors within each field, said weighted averaging including a multiplying of each of said local motion vectors within each field by a corresponding one of said isolation weights to form a product that selectively is included or is not included at all within a vector sum of weighted local motion vectors within each field, which vector sum is divided by a sum of the weights just of said weighted local motion vectors included in said vector sum in order to generate said respective field motion vector;

accumulated motion vector generation means for receiving said field motion vector and generating said accumulated motion vector by accumulating said received field motion vector into an attenuated response to the previous accumulated motion vector supplied by attenuator means included within said accumulated motion vector generation means, and compensated accumulated motion vector generation means for receiving said accumulated motion vector, generating an error motion compensating value responsive to the magnitude of said accumulated motion vector generated by said accumulated motion vector generation means, and generating said compensated accumulated motion vector by coring said accumulated motion vector, so as to reduce said compensated accumulated motion vector to zero whenever the amplitude of said accumulated motion vector is smaller than said error motion compensating value—wherein said field motion vector generation means comprises:

first comparing means for comparing said average correlation value with a reference value of low contrast, i.e., a first threshold value, and generating an abnormal-condition signal when said average correlation value is smaller than said first threshold value;

second comparing means for generating a first difference signal by subtracting said average correlation value from said maximum correlation value, comparing said first difference signal with a reference value determining a moving object, i.e., a second threshold, and generating an abnormal-condition signal when said first difference signal is smaller than said second threshold value;

third comparing means for generating a second difference signal by subtracting said second maximum correlation value from said maximum correlation value, comparing said second difference signal with a reference value determining a repeated image, i.e., a third threshold value, and generating an abnormal-condition signal when said second difference signal is smaller than said third threshold value;

means for receiving the respective isolativity of each said local motion vector and generating an isolation weight signal that is relatively small when said isolativity increases and that is relatively large when said isolativity decreases, said isolation weight being generated in a predefined inverse relationship to said isolativity;

means for receiving the respective instability of each said local motion vector and generating a stability weight signal that is relatively small when said instability increases and is relatively large when said instability decreases, said stability weight signal being generated in a predefined inverse relationship to said instability; and means for receiving said isolation weight signal and said stability weight signal of each said local motion vector, receiving an output of said reliability determination means as a control signal, and generating a respective output weight signal for each said local motion vector, which output weight signal is of zero value when said control signal is an abnormal-condition signal, and which output weight signal is generated by averaging said two received weight signals when said control signal is not an abnormal-condition signal—wherein said local motion vector generation means comprises:

edge detection means for receiving said image data and converting field image into binary edge data by analyzing said received image data;

storage means composed of at least two local motion estimation areas, for receiving said binary edge data and making one-field delay by sequentially extracting block data on reference areas of said local motion estimation areas;

edge pattern matching means for receiving binary edge data of current field outputted from said edge detection means as compared data and binary edge data of previous field outputted from said storage means as reference data, matching patterns of said two block data, thereby sequentially generating correlation data of corresponding local motion estimation areas; and local motion vector estimation means for receiving said correlation data, and comparing said correlation data received from corresponding local motion estimation area with previous statistical variables detected in corresponding local motion estimation area, thereby generating a state of changed correlation data as statistical variables and at the same time, generating a position value of maximum correlation value as a local motion vector of corresponding local motion estimation area—and wherein said local motion vector estimation means comprises:

comparing means for comparing said received correlation data with a previous maximum correlation value of corresponding local motion estimation area, thereby generating a first comparing signal when said correlation data is larger, local motion vector detection means for receiving address clocks and an output of said comparing means, generating a position value of said received correlation data by counting said address clocks, and generating a position value of said received correlation data as a local motion vector of corresponding local motion estimation area when said first comparing signal is received, and means for generating said statistical variables of corresponding local motion estimation area, which means comprises:

maximum correlation generation means for receiving said received correlation data and an output of comparing means and generating said received correlation data as a maximum correlation value when said first comparing signal is received, means for receiving outputs of said maximum correlation generation means and said comparing means and generating a previous maximum correlation value as a second maximum correlation value when said first comparing signal is received, means for receiving said maximum correlation value and said second maximum correlation value and generating a maximum correlation difference by subtracting said second maximum correlation value from said maximum correlation value, and means for generating an average correlation value by adding said received correlation data into previous correlation data and dividing added correlation data by a number of motion vector candidates.

17. An image stabilization device as claimed in claim 16, wherein said field motion decision means comprises:

means for generating weighted local motion vectors by multiplying said sequentially received local motion vectors each by a respective corresponding isolation weight signal and by a respective stability weight signal to generate respective ones of said weighted local motion vectors;

means for summing said isolation and stability weight signals to generate a summed weight signal; and means for generating a field motion vector by summing said weighted local motion vectors and then dividing said summed local motion vector by said summed weight signal.

18. An image stabilization device as claimed in claim 17, further comprising:

panning identification means for receiving said field motion vectors, regarding generation of field motion vectors having substantially identical values over a predetermined number of fields as resulting from deliberate panning, and generating an indication of the occurrence of deliberate panning; and means for determining whether or not said received accumulated motion vector tends to leave a range in which undesired motion of said image data stored in said memory can be corrected for; wherein said attenuator means is of a type for multiplying said previous accumulated motion vector by a first factor smaller than one to generate said attenuated response whenever it is determined that said received accumulated motion vector is within said range in which undesired motion of said image data stored in said memory can be corrected for at the same that there is no indication of the occurrence of deliberate panning, for multiplying said previous accumulated motion vector by a second factor smaller than said first factor to generate said attenuated response whenever it is determined that said received accumulated motion vector is outside that said range, and for multiplying said previous accumulated motion vector by said second factor to generate said attenuated response whenever there is an indication of the occurrence of deliberate panning.

19. An image stabilization device as claimed in claim 17, further comprising:

panning identification means for receiving said field motion vectors, regarding generation of field motion vectors having substantially identical values over a predetermined number of fields as resulting from deliberate panning, and generating an indication of the occurrence of deliberate panning; and means for determining whether or not said received accumulated motion vector tends to leave a range in which undesired motion of said image data stored in said memory can be corrected for; wherein said attenuator means is of a type for multiplying said previous accumulated motion vector by a first factor smaller than one to generate said attenuated response whenever it is determined that said received accumulated motion vector is within said range in which undesired motion of said image data stored in said memory can be corrected for at the same that there is no indication of the occurrence of deliberate panning, for multiplying said previous accumulated motion vector by a second factor smaller than said first factor to generate said attenuated response whenever it is determined that said received accumulated motion vector is outside that said range, and for multiplying, said previous accumulated motion vector by said second factor to generate said attenuated response whenever there is an indication of the occurrence of deliberate panning.

20. An image stabilization device as claimed in claim 17 further comprising compensated accumulated motion vector generation means, which said compensated accumulated motion vector generation means generates a respective compensated accumulated motion vector responsive to each said accumulated motion vector and comprises:

means for receiving said accumulated motion vector, checking a magnitude of said accumulated motion vector, and generating an error motion compensating value that varies inversely with change in the magnitude of said accumulated motion vector, thereby making said error motion compensating value be large when said magnitude is small, and be small when said magnitude is large;

means for receiving said error motion compensating value and said accumulated motion vector, and generating a first compensated accumulated motion vector by subtracting said error motion compensating value from said accumulated motion vector;

means for receiving said error motion compensating value and said accumulated motion vector, and generating a second compensated accumulated motion vector by adding said accumulated motion vector into said error motion compensating value; and means for comparing said error motion compensating value with said magnitude of accumulated motion vector, and selecting said first compensated accumulated motion vector as a revised value of said accumulated motion vector if said accumulated motion vector is positive and larger in magnitude than said error motion compensating value, resetting said compensated accumulated motion vector value to an initial value if said accumulated motion vector is positive and smaller in magnitude than said error motion compensating value, selecting said second compensated accumulated motion vector as a revised value of said accumulated motion vector if said accumulated motion vector is negative and larger in magnitude than said error motion compensating value, and resetting said compensated accumulated motion vector to said initial value if said accumulated motion vector is negative and smaller in magnitude than said error motion compensating value.

21. An image stabilization device as claimed in claim 19 further comprising compensated accumulated motion vector generation means, which said compensated accumulated motion vector generation means comprises:

means for receiving said accumulated motion vector, checking a magnitude of said accumulated motion vector and generating a first error motion compensating value that varies inversely with change in the magnitude of said accumulated motion vector, thereby making said first error motion compensating value be large when said magnitude of said accumulated motion vector is small, and be small when said magnitude of said accumulated motion vector is large;

means having means generating an average maximum correlation difference of one field by receiving maximum correlation differences generated from said respective local motion estimation areas, for checking a magnitude of said average maximum correlation difference, and generating a second error motion compensating value that varies inversely with change in the magnitude of said average maximum correlation difference, thereby making said second error motion compensating value be large when said magnitude of said average maximum correlation difference is small, and be small when said magnitude of said average maximum correlation difference is large;

means for generating an error motion compensating value by averaging said first error motion compensating value and said second error motion compensating value;

means for receiving said averaged error motion compensating value and said accumulated motion vector, and generating a first compensated accumulated motion vector by subtracting said error motion compensating value from said accumulated motion vector;

means for receiving said averaged error motion compensating value and said accumulated motion vector, and generating a second compensated accumulated motion vector by adding said accumulated motion vector into said error motion compensating value; and means for comparing said error motion compensating value with a magnitude of said accumulated motion vector, and selecting said first compensated accumulated motion vector as a revised value of said accumulated motion vector if said accumulated motion vector is positive and larger in magnitude than said error motion compensating value, resetting said compensated accumulated motion vector value to an initial value if said accumulated motion vector is positive and smaller in magnitude than said error motion compensating value, selecting said second compensated accumulated motion vector as a revised value of said accumulated motion vector if said accumulated motion vector is negative and larger in magnitude than said error motion compensating value, and resetting said compensated accumulated motion vector to said initial value if said accumulated motion vector is negative and smaller in magnitude than said error motion compensating value.

22. An image stabilization device having a memory for storing image data in fields, and a control portion for correcting motion of image data stored in said memory by a received accumulated motion vector, comprising:

local motion vector generation means for receiving image data, converting said received image data into binary edge data, sequentially generating correlation data in local motion estimation areas by matching patterns of said edge data of current field and previous field, and sequentially generating local motion vectors of said corresponding local motion estimation areas and respective statistical variables descriptive of said local motion vectors by analyzing said generated correlation data, said statistical variables including the respective isolativity of each of said local motion vectors from other local motion vectors within the same field and including the respective instability of each of said local motion vectors in each most recent field respective to a field just previous;

field motion vector generation means for receiving said local motion vectors and statistical variables, generating a respective isolation weight for each said local motion vector that is of decreased value with increased isolativity and is zero for isolativity beyond a predefined value, generating a respective stability weight signal that is of decreased value with increased instability, generating a respective output weight signal for each said local motion vector by additively combining its respective isolation and respective stability weights and generating a respective field motion vector by weighted averaging of the local motion vectors within each field, said weighted averaging including a multiplying of each of said local motion vectors within each field by a corresponding one of said output weight signals to form a product that selectively is included or is not included at all within a vector sum of weighted local motion vectors within each field, which vector sum is divided by a sum of the weights just of said weighted local motion vectors included in said vector sum in order to generate said respective field motion vector;

compensated field motion vector generation means for receiving said field motion vector and a previous accumulated motion vector, generating an error motion compensating value responsive to the magnitude of said previous accumulated motion vector, and generating said compensated field motion vector by coring said field motion vector, so as to reduce said compensated field motion vector to zero whenever the amplitude of said field motion vector is smaller than said error motion compensating value; and accumulated motion vector generation means for receiving said compensated field motion vector and generating said accumulated motion vector by accumulating said received compensated field motion vector into said previous accumulated motion vector as attenuated by attenuator means included within said accumulated motion vector generation means.

23. An image stabilization device as claimed in claim 22, wherein said local motion vector generation means comprises:

edge detection means for receiving said image data and converting field image into binary edge data by analyzing said received image data;

storage means for temporarily storing said binary edge data for at least selected pixels in each of at least two local motion estimation areas, for receiving said binary edge data for each of said local motion estimation areas and storing that data until at least a next succeeding field;

edge pattern matching means for receiving binary edge data of current field supplied from said edge detection means as compared data and binary edge data of a previous field supplied from said storage means as reference data, matching patterns of said two block data, thereby sequentially generating correlation data of corresponding local motion estimation areas; and local motion vector estimation means for receiving said correlation data, and comparing said correlation data received from corresponding local motion estimation area with previous statistical variables detected in corresponding local motion estimation area, thereby generating a state of changed correlation data as statistical variables and at the same time, generating a position value of maximum correlation as a local motion vector of corresponding local motion estimation area.

24. An image stabilization device having a memory for storing image data in fields, and a control portion for correcting motion of image data stored in said memory by a received accumulated motion vector, comprising:

local motion vector generation means for receiving image data, converting said received image data into binary edge data, sequentially generating correlation data in local motion estimation areas by matching patterns of said edge data of current field and previous field, and sequentially generating local motion vectors of said corresponding local motion estimation areas and respective statistical variables descriptive of said local motion vectors by analyzing said generated correlation data, said statistical variables including the respective isolativity and the respective instability of each of said local motion vectors;

field motion vector generation means for receiving and sequentially storing said local motion vectors and statistical variables generating a respective isolation weight for each of said stored local motion vectors inversely related to its respective isolativity over a range and zero-valued for larger isolativity values, generating a respective stability weight for each of said stored local motion vectors inversely related to its respective instability, and generating a respective field motion vector from a weighted average of said local motion vectors with each field, with each local motion vector being weighted by a result of additively mixing its respective isolation and stability weights;

compensated field motion vector generation means for receiving said field motion vector and a previous accumulated motion vector, generating an error motion compensating value responsive to the magnitude of said previous accumulated motion vector, and generating said compensated field motion vector by coring said field motion vector, so as to reduce said compensated field motion vector to zero whenever the amplitude of said field motion vector is smaller than said error motion compensating value; and accumulated motion vector generation means for receiving said compensated field motion vector and generating said accumulated motion vector by accumulating said received compensated field motion vector into said previous accumulated motion vector as attenuated by attenuator means included within said accumulated motion vector generation means—wherein said local motion vector generation means comprises;

edge detection means for receiving said image data and converting field image into binary edge data by analyzing said received image data;

storage means composed of at least two local motion estimation areas, for receiving said binary edge data and making one-field delay by sequentially extracting block data on reference areas of said local motion estimation areas;

edge pattern matching means for receiving binary edge data of current field outputted from said edge detection means as compared data and binary edge data of previous field outputted from said storage means as reference data, and matching patterns of said two block data, thereby sequentially generating correlation data of corresponding local motion estimation areas; and local motion vector estimation means for receiving said correlation data, and comparing said correlation data received from corresponding local motion estimation area with previous statistical variables detected in corresponding local motion estimation area, thereby generating a state of changed correlation data as statistical variables and at the same time, generating a position value of maximum correlation as a local motion vector of corresponding local motion estimation area—and wherein said local motion vector estimation means comprises:

comparing means for comparing said received correlation data with a previous maximum correlation value of corresponding local motion estimation area, thereby generating a first comparing signal when said correlation data is larger;

local motion vector detection means for receiving address clocks and an output of said comparing means, generating a position value of said received correlation data by counting said address clocks, and generating a position value of said received correlation data as a local motion vector of corresponding local motion estimation area when said first comparing signal is received; and means for generating said statistical variables of corresponding local motion estimation area, which means comprises:

maximum correlation generation means for receiving said received correlation data and an output of comparing means and generating said received correlation data as a maximum correlation value when said first comparing signal is received;

means for receiving outputs of said maximum correlation generation means and said comparing means and generating a previous maximum correlation value as a second maximum correlation value when said first comparing signal is received;

means for receiving said maximum correlation value and said second maximum correlation value and generating a maximum correlation difference by subtracting said second maximum correlation value from said maximum correlation value; and means for generating an average correlation value by adding said received correlation data into previous correlation data and dividing added correlation data by a number of motion vector candidates.

25. An image stabilization device as claimed in claim 24, wherein said local motion vector generation sequentially generates respective statistical variables descriptive of said local motion vectors other than the respective isolativity and the respective instability of each of said local motion vectors, and wherein said field motion vector generation means comprises:

first comparing means for comparing said average correlation value with a reference value of low contrast, i.e., a first threshold value, and generating an abnormal-condition signal when said average correlation value is smaller than said first threshold value;

second comparing means for generating a first difference signal by subtracting said average correlation value from said maximum correlation value, comparing said first difference signal with a reference value determining a moving object, i.e., a second threshold, and generating an abnormal-condition signal when said first difference signal is smaller than said second threshold value;

third comparing means for generating a second difference signal by subtracting said second maximum correlation value from said maximum correlation value, comparing said second difference signal with a reference value determining a repeated image, i.e., a third threshold value, and generating an abnormal-condition signal when said second difference signal is smaller than said third threshold value;

means for receiving the respective isolativity of each said local motion vector and generating an isolation weight signal that is relatively small when said isolativity increases and that is relatively large when said isolativity decreases, said isolation weight being generated in a predefined inverse relationship to said isolativity;

means for receiving the respective instability of each said local motion vector and generating a stability weight signal that is relatively small when said instability increases and is relatively large when said instability decreases, said stability weight signal being generated in a predefined inverse relationship to said instability; and means for receiving said isolation weight signal and said stability weight signal, receiving an output of said reliability determination means as a control signal, and generating a weight signal for a corresponding local motion vector by averaging said two received weight signals.

26. An image stabilization device as claimed in claim 25, wherein said field motion decision means comprises:

means for generating weighted local motion vectors by multiplying said sequentially received local motion vectors each by a respective corresponding isolation weight signal and by a respective stability weight signal to generate respective ones of said weighted local motion vectors;

means for summing said isolation and stability weight signals to generate a summed weight signal; and means for generating a field motion vector by summing said weighted local motion vectors and then dividing said summed local motion vector by said summed weight signal.

27. An image stabilization device as claimed in claim 26, wherein said compensated field motion vector generation means comprises:

means for receiving said previous accumulated motion vector, checking a magnitude of said previous accumulated motion vector, and generating an error motion compensating value that varies inversely with change in the magnitude of said previous accumulated motion vector, thereby making said error motion compensating value be large when said magnitude is small, and be small when said magnitude is large;

means for receiving said error motion compensating value and said field motion vector, and generating a first compensated field motion vector by subtracting said error motion compensating value from said field motion vector;

means for receiving said error motion compensating value and said field motion vector, and generating a second compensated field motion vector by adding said field motion vector into said error motion compensating value; and means for comparing said error motion compensating value with a magnitude of said field motion vector, and selecting and outputting said first compensated field motion vector if said field motion vector is positive and larger than said error motion compensating value, resetting said compensated field motion vector value if said field motion vector is positive and smaller than said error motion compensating value, selecting and outputting said second compensated field motion vector if said field motion vector is negative and smaller than said error motion compensating value, and resetting said compensated field motion vector if said field motion vector is negative and larger than said error motion compensating value.

28. An image stabilization device as claimed in claim 26, wherein said compensated field motion vector generation means comprises:

means for receiving said previous accumulated motion vector and generating a first error motion compensating value inversely related to the magnitude of said previous accumulated motion vector, thus making an error motion compensating value be large when said magnitude is small, and be small when said magnitude is large;

means having means generating an average maximum correlation difference of one field by receiving maximum correlation differences generated from said respective local motion estimation areas and generating a second error motion compensating value inversely related to the magnitude of said said average maximum correlation difference, thus making an error motion compensating value be large when said magnitude is small, and be small when said magnitude is large;

means for generating an error motion compensating value by averaging said first error motion compensating value and said second error motion compensating value;

means for receiving said averaged error motion compensating value and said field motion vector, and generating a first compensated field motion vector by subtracting said error motion compensating value from said field motion vector;

means for receiving said averaged error motion compensating value and said field motion vector, and generating a second compensated field motion vector by adding said field motion vector into said error motion compensating value; and means for comparing said error motion compensating value with a magnitude of said field motion vector, and selecting and outputting said first compensated field motion vector if said field motion vector is positive and larger in magnitude than said error motion compensating value, resetting said compensated field motion vector value if said field motion vector is positive and smaller in magnitude than said error motion compensating value, selecting and outputting said second compensated field motion vector if said field motion vector is negative and larger in magnitude than said error motion compensating value, and resetting said compensated field motion vector if said field motion vector is negative and smaller in magnitude than said error motion compensating value.

29. An image stabilization device as claimed in claim 28, further comprising:

panning identification means for receiving said field motion vectors, regarding generation of field motion vectors having substantially identical values over a predetermined number of fields as resulting from deliberate panning, and generating an indication of the occurrence of deliberate panning;

means for determining whether or not said received accumulated motion vector tends to leave a range in which undesired motion of said image data stored in said memory can be corrected for; wherein said attenuator means is of a type for multiplying said previous accumulated motion vector by a first factor smaller than one to generate said attenuated response whenever it is determined that said received accumulated motion vector is within said range in which undesired motion of said image data stored in said memory can be corrected for at the same that there is no indication of the occurrence of deliberate panning, for multiplying said previous accumulated motion vector by a second factor smaller than said first factor to generate said attenuated response whenever it is determined that said received accumulated motion vector is outside that said range, and for multiplying said previous accumulated motion vector by said second factor to generate said attenuated response whenever there is an indication of the occurrence of deliberate panning; and a limiter coupled between said accumulated motion vector generation means and said control portion, for preventing said control portion receiving those portions of said accumulated motion vector as tend to exceed a maximum compensation available for undesired camera movement.

30. An image stabilization device as claimed in claim 24, wherein said local motion vector generation sequentially generates respective statistical variables descriptive of said local motion vectors other than the respective isolativity and the respective instability of each of said local motion vectors, and wherein said field motion vector generation means comprises:

reliability determination means for receiving said other statistical variables sequentially supplied from said local motion estimation means, determining from said other statistical variables whenever an irregular condition of image data occurs deteriorating reliability of local motion vector, and generating an abnormal-condition signal whenever said reliability determination means determines that an irregular condition of image data occurs;

weight signal generation means for receiving the respective isolativity and the respective instability of each local motion vector from said local motion vector generation means, generating said weight signal for each said local motion vector with a value dependent on both its respective isolativity and its respective stability, supplying said weight signal as an output weight signal as long as said reliability determination means does not generate an abnormal-condition signal, and supplying a zero value as said output weight signal whenever said reliability determination means generates an abnormal-condition signal; and field motion decision means for sequentially receiving said output weight signals and said local motion vectors, and applying said output weight signals to corresponding received local motion vectors of local motion estimation areas, as a part of generating a respective field motion vector for each field by performing a weighted averaging of said local motion vectors within that field.

31. An image stabilization device as claimed in claim 30, wherein said reliability determination means comprises:

first comparing means for comparing said average correlation value with a reference value of low contrast, i.e., a first threshold value, and generating an abnormal-condition signal when said average correlation value is smaller than said first threshold value;

second comparing means for generating a first difference signal by subtracting said average correlation value from said maximum correlation value, comparing said first difference signal with a reference value determining a moving object, i.e., a second threshold, and generating an abnormal-condition signal when said first difference signal is smaller than said second threshold value; and third comparing means for generating a second difference signal by subtracting said second maximum correlation value from said maximum correlation value, comparing said second difference signal with a reference value determining a repeated image, i.e., a third threshold value, and generating an abnormal-condition signal when said second difference signal is smaller than said third threshold value.

32. An adaptive motion vector decision method for a digital image stabilization system having a memory for storing image data in fields, and a control portion for correcting motion of image data stored in said memory by a received accumulated motion vector, comprising the steps of:

converting said received image data in fields into binary edge data;

receiving said binary edge data, extracting reference block data of local motion estimation areas, and sequentially storing extracted reference block data in corresponding reference data storage areas;

receiving said converted current-field binary edge data as compared block data, and sequentially generating correlation data in local motion estimation areas by matching patterns of said reference block data of said corresponding local motion estimation area;

generating statistical variables and local motion vectors of corresponding local motion estimation areas by analyzing said sequentially received correlation data, said statistical variables including the isolativity of each of said local motion vectors from other local motion vectors for the same field, the stability of each of said local motion vectors respective to the correspondingly located local motion vector of the previous field, and other statistical variables;

sequentially storing said received local motion vectors and statistical variables;

sequentially checking said stored local motion vectors when a field search ending signal is received;

determining from the stored corresponding statistical variables for each of said stored local motion vectors whether said image data in the local motion estimation area generating that said local motion vector was of irregular condition, as would cause that said local motion vector to be insufficiently reliable for consideration when generating a field motion vector, or was of regular condition, as would cause that said local motion vector to be sufficiently reliable for consideration when generating a field motion vector;

generating a weight signal dependent on isolativity and stability for each of said local motion vectors determined to be generated from image data of regular condition, but generating a zero-valued weight signal for each of said local motion vectors determined to be generated from image data of irregular condition, the step for generating said weight signal dependent on isolativity and stability for each of said local motion vectors determined to be generated from image data of regular condition being performed by additive rather than multiplicative processing;

generating a respective field motion vector for each field period, by multiplying by corresponding weight signals said local motion vectors sequentially received within each field period, summing the resulting product vectors, and dividing the resulting sum vector by the sum of the respective weight signals of the local motion vectors sequentially received within that same field period;

generating said accumulated motion vector, by substeps of:

attenuating a previous accumulated motion vector, so as to result in its being multiplied by a predefined factor, and adding said attenuated previous accumulated motion vector and said field motion vector to obtain said accumulated motion vector.

33. An adaptive motion vector decision method for a digital image stabilization system as set forth in claim 32, further comprising the steps of:

generating an error motion compensating value inversely related to the magnitude of said accumulated motion vector, and generating a compensated accumulated motion vector by coring said accumulated motion vector, so as to reduce said compensated accumulated motion vector to zero whenever said accumulated motion vector is smaller than said error motion compensating value.

34. An adaptive motion vector decision method as set forth in claim 32, wherein said step of determining from the stored corresponding statistical variables for each of said stored local motion vectors whether said image data in the local motion estimation area generating that said local motion vector was of irregular condition or was of regular condition comprises the substeps of:

generating a respective first difference signal for said local motion vector under consideration by subtracting its respective average correlation value from its respective maximum correlation value, comparing said respective first difference signal with a first threshold value determinative of a moving object having crossed the local motion estimation area from which said local motion vector under consideration was generated, and determining said image data in the local motion estimation area generating said local motion vector under consideration was of irregular condition, whenever said respective first difference signal is smaller than said threshold value determinative of a moving object having crossed the local motion estimation area from which said local motion vector under consideration was generated.

35. An adaptive motion vector decision method as set forth in claim 34 wherein said step of determining from the stored corresponding statistical variables for each of said stored local motion vectors whether said image data in the local motion estimation area generating that said local motion vector was of irregular condition or was of regular condition further comprises the substeps of:

generating a respective second difference signal for said local motion vector under consideration by subtracting its respective second maximum correlation value from its said respective maximum correlation value, comparing said respective second difference signal with a second threshold value determinative of repeated image in the local motion estimation area from which said local motion vector under consideration was generated, and determining said image data in the local motion estimation area generating said local motion vector under consideration was of irregular condition, whenever said second difference signal is smaller than said third threshold value determinative of repeated image in the local motion estimation area from which said local motion vector under consideration was generated.

36. An adaptive motion vector decision method as set forth in claim 35 wherein said step of determining from the stored corresponding statistical variables for each of said stored local motion vectors whether said image data in the local motion estimation area generating that said local motion vector was of irregular condition or was of regular condition further comprises the substeps of:

comparing said respective average correlation value for said local motion vector under consideration with a threshold value determinative of low contrast in the local motion estimation area from which said local motion vector under consideration was generated, and determining said image data in the local motion estimation area generating said local motion vector under consideration was of irregular condition, whenever said respective average correlation value is smaller than said threshold value determinative of low contrast in the local motion estimation area from which said local motion vector under consideration was generated.

37. An adaptive motion vector decision method for a digital image stabilization system having a memory for storing image data in fields, and a control portion for correcting motion of image data stored in said memory by a received accumulated motion vector, comprising the steps of:

converting said received image data in field into binary edge data;

receiving said binary edge data, extracting reference block data of local motion estimation areas, and sequentially storing said extracted reference block data in corresponding reference data storage areas;

receiving said converted current-field binary edge data as compared block data, and sequentially generating correlation data in local motion estimation areas by matching patterns of said reference block data of said corresponding local motion estimation area;

generating statistical variables and local motion vectors of corresponding local motion estimation areas by analyzing said sequentially received correlation data, said statistical variables including the isolativity of each of said local motion vectors from other local motion vectors for the same field, the stability of each of said local motion vectors respective to the correspondingly located local motion vector of the previous field, and other statistical variables;

sequentially storing said received local motion vectors and statistical variables;

sequentially checking said stored local motion vectors when a field search ending signal is received;

determining from the stored corresponding statistical variables for each of said stored local motion vectors whether said image data in the local motion estimation area generating that said local motion vector was of irregular condition, as would cause that said local motion vector to be insufficiently reliable for consideration when generating a field motion vector, or was of regular condition, as would cause that said local motion vector to be insufficiently reliable for consideration when generating a field motion vector;

generating a weight signal dependent on isolativity and stability for each of said local motion vectors determined to be generated from image data of regular condition, but generating a zero-valued weight signal for each of said local motion vectors determined to be generated from image data of irregular condition, the step for generating said weight signal dependent on isolativity and stability for each of said local motion vectors determined to be generated from image data of regular condition being performed by additive rather than multiplicative processing;

generating a respective field motion vector for each field period, by multiplying by corresponding weight signals said local motion vectors sequentially received within each field period, summing the resulting product vectors, and dividing the resulting stun vector by the sum of the respective weight signals of the local motion vectors sequentially received within that same field period;

generating an error motion compensating value inversely related to the magnitude of a previous accumulated motion vector;

generating a respective compensated field motion vector by coring each said field motion vector, so as to reduce said compensated field motion vector to zero whenever said field motion vector is smaller than said error motion compensating value; and generating said accumulated motion vector, by attenuating a previous accumulated motion vector by a predefined rate and adding said attenuated previous accumulated motion vector into said compensated field motion vector.

38. An adaptive motion vector decision method as set forth in claim 37 wherein said step of determining from the stored corresponding statistical variables for each of said stored local motion vectors whether said image data in the local motion estimation area generating that said local motion vector was of irregular condition or was of regular condition comprises the substeps of:

generating a respective first difference signal for said local motion vector under consideration by subtracting its respective average correlation value from its respective maximum correlation value, comparing said respective first difference signal with a first threshold value determinative of a moving object having crossed the local motion estimation area from which said local motion vector under consideration was generated, and determining said image data in the local motion estimation area generating said local motion vector under consideration was of irregular condition, whenever said respective first difference signal is smaller than said threshold value determinative of a moving object having crossed the local motion estimation area from which said local motion vector under consideration was generated.

39. An adaptive motion vector decision method as set forth in claim 38 wherein said step of determining from the stored corresponding statistical variables for each of said stored local motion vectors whether said image data in the local motion estimation area generating that said local motion vector was of irregular condition or was of regular condition further comprises the substeps of:

generating a respective second difference signal for said local motion vector under consideration by subtracting its respective second maximum correlation value from its said respective maximum correlation value, comparing said respective second difference signal with a second threshold value determinative of repeated image in the local motion estimation area from which said local motion vector under consideration was generated, and determining said image data in the local motion estimation area generating said local motion vector wider consideration was of irregular condition, whenever said second difference signal is smaller the said third threshold value determinative of repeated image in the local motion estimation area from which said local motion vector wider consideration was generated.

40. An adaptive motion vector decision method as set forth in claim 39 wherein said step of determining from the stored corresponding statistical variables for each of said stored local motion vectors whether said image data in the local motion estimation area generating that said local motion vector was of irregular condition or was of regular condition further comprises the substeps of:

comparing said respective average correlation value for said local motion vector under consideration with a threshold value determinative of low contrast in the local motion estimation area from which said local motion vector under consideration was generated, and determining said image data in the local motion estimation area generating said local motion vector under consideration was of irregular condition, whenever said respective average correlation value is smaller than said threshold value determinative of low contrast in the local motion estimation area from which said local motion vector under consideration was generated.

41. An adaptive motion vector decision method for a digital image stabilization system having a memory for storing image data in fields, and a control portion for connecting motion of image data stored in said memory by a received accumulated motion vector, comprising the steps of:

converting said received image data in fields into binary edge data;

receiving said binary edge data, extracting reference block data of local motion estimation areas, and sequentially storing extracted reference block data in corresponding reference data storage areas;

receiving said converted current-field binary edge data as compared block data and sequentially generating correlation data in local motion estimation areas by matching patterns of said reference block data of said corresponding local motion estimation area;

generating statistical variables and local motion vectors of corresponding local motion estimation areas by analyzing said sequentially received correlation data said statistical variables including the isolativity of each of said local motion vectors from other local motion vectors for the same field, the stability of each of said local motion vectors respective to the correspondingly located local motion vector of the previous field, and other statistical variables;

sequentially storing said received local motion vectors and statistical variables:

sequentially checking said stored local motion vectors when a field search ending signal is received;

determining from the stored corresponding statistical variables for each of said stored local motion vectors whether said image data in the local motion estimation area generating that said local motion vector was of irregular condition as would cause that said local motion vector to be insufficiently reliable for consideration when generating a field motion vector, or was of regular condition, as would cause that said local motion vector to be sufficiently reliable for consideration when generating a field motion vector;

generating a weight signal dependent on isolativity and stability for each of said local motion vectors determined to be generated from image data of regular condition, but generating a zero-valued weight signal for each of said local motion vectors determined to be generated from image data of irregular condition;

generating a respective field motion vector for each field period, by multiplying by corresponding weight signals said local motion vectors sequentially received within each field period, summing the resulting product vectors, and dividing the resulting sum vector by the sum of the respective weight signals of the local motion vectors sequentially received within that same field period;

generating said accumulated motion vector, by substeps of attenuating a previous accumulated motion vector, so as to result in its being multiplied by a predefined factor, and adding said attenuated previous accumulated motion vector and said field motion vector to obtain said accumulated motion vector;

determining when said field motion vectors have been of substantially identical direction over at least a predetermined number of fields to generate a decision that there is deliberate camera movement in the most recent field;

determining whether or not said received accumulated motion vector tends to leave a range in which undesired motion of said image data stored in said memory can be corrected for;

selecting a first gain factor of about 0.995 for said step of attenuating said previous accumulated motion vector, unless it is decided that there is deliberate camera movement in the most recent field or it is determined that said received accumulated motion vector tends to leave a range in which undesired motion of said image data stored in said memory can be corrected for; and selecting a second gain factor of about 0.97 for said step of attenuating said previous accumulated motion vector when it is decided that there is deliberate camera movement in the most recent field or it is determined that said received accumulated motion vector tends to leave a range in which undesired motion of said image data stored in said memory can be corrected for.

42. An image stabilization device having a memory for storing image data in fields, and a control portion for correcting motion of image data stored in said memory by a received accumulated motion vector, said image stabilization device comprising:

local motion vector generation circuitry receiving image data for predefined local motion estimation areas within each of successive fields and generating respective local motion vectors descriptive of field-to-field change of image data in said local motion estimation areas and respective statistical variables descriptive of said local motion vectors, said statistical variables including the respective isolativity of each of said local motion vectors from other local motion vectors within the same field determined by the magnitude of the result of differentially comparing that said local motion vector with the others of said local motion vectors for the same field period;

comparator circuitry for receiving ones of said statistical variables descriptive of said local motion vectors, other than the respective isolativity of each of said local motion vectors from other local motion vectors within the same field, and comparing said other statistical variables descriptive of each of said local motion vectors to threshold values for said other statistical variables for determining whether each of said local motion vectors is sufficiently reliable for consideration when generating a field motion vector or is insufficiently reliable for consideration when generating a field motion vector;

field motion vector generator circuitry for receiving said local motion vectors and statistical variables, generating a respective isolation weight for each said local motion vector that is of decreased value with increased isolativity and is zero for isolativity beyond a predefined value, supplying a respective output weight signal that is zero-valued for each local motion vector determined to be insufficiently reliable for consideration when generating a field motion vector, and otherwise supplying a respective output weight signal generated for each local motion vector determined to be sufficiently reliable for consideration when generating a field motion vector, which respective output weight signal depends on the respective isolation weight for that said local motion vector, and generating a field motion vector for each of said successive fields by said local motion vectors within said field in accordance with their respective output weights; and accumulation circuitry for generating a respective accumulated motion vector for each of said successive fields, said accumulation circuitry comprising an adder for generating a respective accumulated motion vector for each said successive field as the sum of the field motion vector with an attenuated response to the accumulated motion vector for the previous field and attenuator circuitry for generating said attenuated response to the accumulated motion vector for the previous field, wherein said local motion vector generation circuitry is of a type generating said statistical variables so as to include, in addition to the respective isolativity of each of said local motion vectors and said other said statistical variables, the respective instability of each of said local motion vectors, as determined by the magnitude of the result of differentially comparing that said local motion vector with the field motion vector for the preceding field period: wherein said field motion vector generator circuitry is of a type generating a respective stability weight for each said local motion vector that is of decreased value with increased instability, and supplying a respective output weight signal generated for each local motion vector determined to be sufficiently reliable for consideration when generating a field motion vector, which respective output weight signal depends on a summation of the respective isolation weight and the respective stability weight for that said local motion vector, rather than on a product of the respective isolation weight and the respective stability weight for that said local motion vector.

43. An image stabilization device as set forth in claim 42; wherein said statistical variables descriptive of said local motion vectors include average correlation when matching patterns of said edge data of a current field and a previous field, maximum correlation when matching patterns of said edge data of the current field and the previous field, and a second maximum correlation corresponding to the most recent past maximum correlation; and wherein said comparator circuitry comprises:

a first comparator for comparing a respective said average correlation value associated with each said local motion vector with a first threshold value and, when said average correlation value is smaller, determining that low image contrast causes said local motion vector associated with said respective average correlation value to be insufficiently reliable to be considered when generating a field motion vector;

a first subtracter for subtracting said respective average correlation value for each said local motion vector from a respective said maximum correlation value for the same said local motion vector to generate a first difference signal;

a second comparator for comparing said first difference signal with a second threshold value and, when said first difference signal is smaller than said second threshold value, determining that a moving object causes said local motion vector associated with said respective average correlation value to be insufficiently reliable to be considered when generating a field motion vector;

a second subtracter for subtracting a respective said second maximum correlation value associated with each said local motion vector from said respective maximum correlation value associated with the same said local motion vector to generate a second difference signal; and a third comparator for comparing said second difference signal with a third threshold value and, when said second difference signal is smaller than said third threshold value, determining that a repeated image causes said local motion vector associated with said respective maximum and second maximum correlation values to be insufficiently reliable to be considered when generating a field motion vector.

44. An image stabilization device as set forth in claim 42, wherein said local motion vector generation circuitry is of a type converting said received images data into binary edge data and generating respective local motion vectors descriptive of field-to-field change of said binary edge data in said local motion estimation areas; wherein said statistical variables descriptive of said local motion vectors include average correlation when matching patterns of said binary edge data of a current field and a previous field, maximum correlation when matching patterns of said binary edge data of the current field and the previous field, and a second maximum correlation corresponding to the most recent past maximum correlation; and wherein said comparator circuitry comprises:

a first comparator for comparing said respective average correlation value associated with each said local motion vector with a first threshold value and, when said average correlation value is smaller, determining that low image contrast causes said local motion vector associated with said respective average correlation value to be insufficiently reliable to be considered when generating a field motion vector;

a first subtracter for subtracting said respective average correlation value for each said local motion vector from a respective said maximum correlation value for the same said local motion vector to generate a first difference signal;

a second comparator for comparing said first difference signal with a second threshold value and, when said first difference signal is smaller than said second threshold value, determining that a moving object causes said local motion vector associated with -said respective average correlation value to be insufficiently reliable to be considered when generating a field motion vector;

a second subtracter for subtracting a respective said second maximum correlation value associated with each said local motion vector from said respective maximum correlation value associated with the same said local motion vector to generate a second difference signal; and a third comparator for comparing said second difference signal with a third threshold value and, when said second difference signal is smaller than said third threshold value, determining that a repeated image causes said local motion vector associated with said respective maximum and second maximum correlation values to be insufficiently reliable to be considered when generating a field motion vector.

45. An image stabilization device as claimed in claim 42 further comprising compensated accumulated motion vector generation circuitry, which said compensated accumulated motion vector generation circuitry generates a respective compensated accumulated motion vector in controlled cored response to each said accumulated motion vector, the coring being controlled so as to be reduced as the magnitude of said accumulated motion vector increases from zero to a level above which coring is discontinued.

46. An image stabilization device as set forth in claim 42, wherein said local motion vector generation circuitry is of a type for receiving said image data, converting successive fields of said image data into binary edge data by analyzing said received image data, and estimating local motion vectors by procedures including the correlation of patterns of binary edge data for successive fields.

47. An image stabilization device having a memory for storing image data in fields, and a control portion for correcting motion of image data stored in said memory by a received accumulated motion vector, said image stabilization device comprising:

local motion vector generation circuitry receiving image data for predefined local motion estimation areas within each of successive fields and generating respective local motion vectors descriptive of field-to-field change of image data in said local motion estimation areas and respective statistical variables descriptive of said local motion vectors, said statistical variables including the respective isolativity of each of said local motion vectors from other local motion vectors within the same field determined by the magnitude of the result of differentially comparing that said local motion vector with the others of said local motion vectors for the same field period;

comparator circuitry for receiving ones of said statistical variables descriptive of said local motion vectors, other than the respective isolativity of each of said local motion vectors from other local motion vectors within the same field, and comparing said other statistical variables descriptive of each of said local motion vectors to threshold values for said other statistical variables for determining whether each of said local motion vectors is sufficiently reliable for consideration when generating a field motion vector or is insufficiently reliable for consideration when generating a field motion vector;

field motion vector generator circuitry for receiving said local motion vectors and statistical variables, generating a respective isolation weight for each said local motion vector that is of decreased value with increased isolativity and is zero for isolativity beyond a predefined value, supplying a respective output weight signal that is zero-valued for each local motion vector determined to be insufficiently reliable for consideration when generating a field motion vector, and otherwise supplying a respective output weight signal generated for each local motion vector determined to be sufficiently reliable for consideration when generating a field motion vector, which respective output weight signal depends on the respective isolation weight for that said local motion vector, and generating a field motion vector for each of said successive fields by said local motion vectors within said field in accordance with their respective output weights; and accumulation circuitry for generating a respective accumulated motion vector for each of said successive fields, said accumulation circuitry comprising an adder for generating a respective accumulated motion vector for each said successive field as the sum of the field motion vector with an attenuated response to the accumulated motion vector for the previous field and attenuator circuitry for generating said attenuated response to the accumulated motion vector for the previous field which attenuator circuitry is of a controlled type, providing a less attenuated response responsive to a first condition of an attenuation control signal for said attenuator circuitry and providing a more attenuated response responsive to a second condition of said attenuation control signal for said attenuator circuitry;

a threshold detector for detecting when said received accumulated motion vector supplied to said control portion of said image stabilization device has more than a prescribed magnitude to generate a threshold detector output signal of a second logic sense, said threshold detector output signal otherwise being of a first logic sense; and logic circuitry responding to said threshold detector output signal being of said second logic sense for generating said second condition of said attenuation control signal and at least conditionally responding to said threshold detector output signal being of said first logic sense for generating said first condition of said attenuation control signal.

48. An image stabilization device as as set forth in claim 47 further comprising:

panning identification circuitry responding to said field motion vectors having been of substantially identical direction over at least a predetermined number of fields for generating an indication of intentional panning, which indication is supplied to said logic circuitry for conditioning said logic circuitry to generate said second condition of said attenuation control signal and not said first condition of said attenuation control signal.

49. An image stabilization device as set forth in claim 48; wherein said local motion vector generation circuitry is of a type generating said statistical variables so as to include, in addition to the respective isolativity of each of said local motion vectors and said other said statistical variables, the respective instability of each of said local motion vectors, as determined by the magnitude of the result of differentially comparing that said local motion vector with the field motion vector for the preceding field period; and wherein said field motion vector generator circuitry is of a type generating a respective stability weight for each said local motion vector that is of decreased value with increased instability, and supplying a respective output weight signal generated for each local motion vector determined to be sufficiently reliable for consideration when generating a field motion vector, which respective output weight signal depends both on the respective isolation weight and the respective stability weight for that said local motion vector.

50. An image stabilization device as set forth in claim 49; wherein said statistical variables descriptive of said local motion vectors include average correlation when matching patterns of said edge data of a current field and a previous field, maximum correlation when matching patterns of said edge data of the current field and the previous field, and a second maximum correlation corresponding to the most recent past maximum correlation; and wherein said comparator circuitry comprises:

a first comparator for comparing said respective average correlation value associated with each said local motion vector with a first threshold value and, when said average correlation value is smaller, determining that low image contrast causes said local motion vector associated with said respective average correlation value to be insufficiently reliable to be considered when generating a field motion vector;

a first subtracter for subtracting said respective average correlation value for each said local motion vector from a respective said maximum correlation value for the same said local motion vector to generate a first difference signal;

a second comparator for comparing said first difference signal with a second threshold value and, when said first difference signal is smaller than said second threshold value, determining that a moving object causes said local motion vector associated with said respective average correlation value to be insufficiently reliable to be considered when generating a field motion vector;

a second subtracter for subtracting a respective said second maximum correlation value associated with each said local motion vector from said respective maximum correlation value associated with the same said local motion vector to generate a second difference signal; and a third comparator for comparing said second difference signal with a third threshold value and, when said second difference signal is smaller than said third threshold value, determining that a repeated image causes said local motion vector associated with said respective maximum and second maximum correlation values to be insufficiently reliable to be considered when generating a field motion vector.

51. An image stabilization device as set forth in claim 50, wherein the respective output weight signal generated for each local motion vector determined to be sufficiently reliable for consideration when generating a field motion vector, depends on a summation of the respective isolation weight and the respective stability weight for that said local motion vector, rather than on a product of the respective isolation weight and the respective stability weight for that said local motion vector.

52. An image stabilization device as set forth in claim 49, wherein the respective output weight signal generated for each local motion vector determined to be sufficiently reliable for consideration when generating a field motion vector, depends on a summation of the respective isolation weight and the respective stability weight for that said local motion vector, rather than on a product of the respective isolation weight and the respective stability weight for that said local motion vector.

53. An image stabilization device having a memory for storing image data in fields, and a control portion for correcting motion of image data stored in said memory by a received accumulated motion vector, said image stabilization device comprising:

local motion vector generation circuitry receiving image data for predefined local motion estimation areas within each of successive fields and generating respective local motion vectors descriptive of field-to-field change of image data in said local motion estimation areas and respective statistical variables descriptive of said local motion vectors, said statistical variables including the respective isolativity of each of said local motion vectors from other local motion vectors within the same field determined by the magnitude of the result of differentially comparing that said local motion vector with the others of said local motion vectors for the same field period;

comparator circuitry for receiving ones of said statistical variables descriptive of said local motion vectors, other than the respective isolativity of each of said local motion vectors from other local motion vectors within the same field, and comparing said other statistical variables descriptive of each of said local motion vectors to threshold values for said other statistical variables for determining whether each of said local motion vectors is sufficiently reliable for consideration when generating a field motion vector or is insufficiently reliable for consideration when generating a field motion vector;

field motion vector generator circuitry for receiving said local motion vectors and statistical variables, generating a respective isolation weight for each said local motion vector that is of decreased value with increased isolativity and is zero for isolativity beyond a predefined value, supplying a respective output weight signal that is zero-valued for each local motion vector determined to be insufficiently reliable for consideration when generating a field motion vector, and otherwise supplying a respective output weight signal generated for each local motion vector determined to be sufficiently reliable for consideration when generating a field motion vector, which respective output weight signal depends on the respective isolation weight for that said local motion vector, and generating a field motion vector for each of said successive fields by said local motion vectors within said field in accordance with their respective output weights; and accumulation circuitry for generating a respective accumulated motion vector for each of said successive fields, said accumulation circuitry comprising an adder for generating a respective accumulated motion vector for each said successive field as the sum of the field motion vector with an attenuated response to the accumulated motion vector for the previous field and attenuator circuitry for generating said attenuated response to the accumulated motion vector for the previous field; and compensated accumulated motion vector generation circuitry, which said compensated accumulated motion vector generation circuitry generates a respective compensated accumulated motion vector in controlled cored response to each said accumulated motion vector and comprises:

circuitry for generating a first error motion compensating value that decreases from a prescribed value dependent on increase in the magnitude of said accumulated motion vector when the magnitude of said accumulated motion vector is within a range between zero and a prescribed value at and beyond which said first error motion compensating value is zero-valued;

circuitry for generating a second error motion compensating value that decreases from a prescribed value dependent on increase in the magnitude of said average maximum correlation difference, when the magnitude of said average maximum correlation difference is within a range between zero and a prescribed value at and beyond which said second error motion compensating value is zero-valued;

averaging circuitry averaging said first error motion compensating value and said second error motion compensating value for generating an averaged motion compensating value; and controlled coring circuitry supplying said respective compensated accumulated motion vector in cored response to said accumulated motion vector supplied from said accumulation circuitry for generating a respective accumulated motion vector for each of said successive fields, which cored response is zero-valued except when the magnitude of said accumulated motion vector supplied from said accumulation circuitry exceeds said averaged motion compensating value.

54. An image stabilization device as set forth in claim 53, wherein said controlled coring circuitry comprises:

a first subtracter for generating a first compensated accumulated motion vector by subtracting said averaged error motion compensating value from said accumulated motion vector;

a second subtracter for generating a second compensated accumulated motion vector by adding said averaged error motion compensating value and said accumulated motion vector;

a comparator for comparing said averaged error motion compensating value and the magnitude of said accumulated motion vector; and multiplexer circuitry arranged for providing a zero-value output signal as a revised value of said accumulated motion vector responsive to said comparator furnishing an indication that the magnitude of said accumulated motion vector is smaller than said averaged error motion compensating value, for selecting said first compensated accumulated motion vector as a revised value of said accumulated motion vector responsive to said comparator furnishing an indication that the magnitude of said accumulated motion vector is larger than said averaged error motion compensating value at a time said accumulated motion vector is positive, and for selecting said second compensated accumulated motion vector as a revised value of said accumulated motion vector responsive to said comparator furnishing an indication that the magnitude of said accumulated motion vector is larger than said averaged error motion compensating value at a time said accumulated motion vector is negative.

55. An image stabilization device having a memory for storing image data in fields, and a control portion for correcting motion of image data stored in said memory by a received accumulated motion vector, said image stabilization device comprising:

local motion vector generation circuitry receiving image data for predefined local motion estimation areas within each of successive fields and generating respective local motion vectors descriptive of field-to-field change of image data in said local motion estimation areas and respective statistical variables descriptive of said local motion vectors, said statistical variables including the respective isolativity of each of said local motion vectors from other local motion vectors within the same field determined by the magnitude of the result of differentially comparing that said local motion vector with the others of said local motion vectors for the same field period;

comparator circuitry for receiving ones of said statistical variables descriptive of said local motion vectors, other than the respective isolativity of each of said local motion vectors from other local motion vectors within the same field, and comparing said other statistical variables descriptive of each of said local motion vectors to threshold values for said other statistical variables for determining whether each of said local motion vectors is sufficiently reliable for consideration when generating a field motion vector or is insufficiently reliable for consideration when generating a field motion vector;

field motion vector generator circuitry for receiving said local motion vectors and statistical variables, generating a respective isolation weight for each said local motion vector that is of decreased value with increased isolativity and is zero for isolativity beyond a predefined value, supplying a respective output weight signal that is zero-valued for each local motion vector determined to be insufficiently reliable for consideration when generating a field motion vector, and otherwise supplying a respective output weight signal generated for each local motion vector determined to be sufficiently reliable for consideration when generating a field motion vector, which respective output weight signal depends on the respective isolation weight for that said local motion vector, and generating a field motion vector for each of said successive fields by said local motion vectors within said field in accordance with their respective output weights, compensated field motion vector generation circuitry, which said compensated field motion vector generation circuitry generates a respective compensated field motion vector in controlled cored response to each said field motion vector supplied by said field motion vector generator circuitry; and accumulation circuitry for generating a respective accumulated motion vector for each of said successive fields, said accumulation circuitry comprising an adder for generating a respective accumulated motion vector for each said successive field as the sum of the compensated field motion vector with an attenuated response to the accumulated motion vector for the previous field and attenuator circuitry for generating said attenuated response to the accumulated motion vector for the previous field: wherein said local motion vector generation circuitry is of a type generating said statistical variables so as to include, in addition to the respective isolativity of each of said local motion vectors and said other said statistical variables, the respective instability of each of said local motion vectors, as determined by the magnitude of the result of differentially comparing that said local motion vector with the field motion vector for the preceding field period: wherein said field motion vector generator circuitry is of a type generating a respective stability weight for each said local motion vector that is of decreased value with increased instability and supplying, a respective output weight signal generated for each local motion vector determined to be sufficiently reliable for consideration when generating a field motion vector; and wherein the respective output weight signal generated for each local motion vector determined to be sufficiently reliable for consideration when generating a field motion vector, depends on a summation of the respective isolation weight and the respective stability weight for that said local motion vector, rather than on a product of the respective isolation weight and the respective stability weight for that said local motion vector.

56. An image stabilization device as set forth in claim 55; wherein said statistical variables descriptive of said local motion vectors include average correlation when matching patters of said edge data of a current field and a previous field, maximum correlation when matching patterns of said edge data of the current field and the previous field, and a second maximum correlation corresponding to the most recent past maximum correlation; and wherein said comparator circuitry comprises:

a first comparator for comparing said respective average correlation value associated with each said local motion vector with a first threshold value and, when said average correlation value is smaller, determining that low image contrast causes said local motion vector associated with said respective average correlation value to be insufficiently reliable to be considered when generating a field motion vector;

a first subtracter for subtracting said respective average correlation value for each said local motion vector from a respective said maximum correlation value for the same said local motion vector to generate a first difference signal;

a second comparator for comparing said first difference signal with a second threshold value and, when said first difference signal is smaller than said second threshold value, determining that a moving object causes said local motion vector associated with said respective average correlation value to be insufficiently reliable to be considered when generating a field motion vector;

a second subtracter for subtracting a respective said second maximum correlation value associated with each said local motion vector from said respective maximum correlation value associated with the same said local motion vector to generate a second difference signal; and a third comparator for comparing said second difference signal with a third threshold value and, when said second difference signal is smaller than said third threshold value, determining that a repeated image causes said local motion vector associated with said respective maximum and second maximum correlation values to be insufficiently reliable to be considered when generating a field motion vector.

57. An image stabilization device as set forth in claim 55, wherein said local motion vector generation circuitry is of a type for receiving said image data, converting successive fields of said image data into binary edge data by analyzing said received image data, and estimating local motion vectors by procedures including the correlation of patterns of binary edge data for successive fields.

58. An image stabilization device as set forth in claim 55; wherein said local motion vector generation circuitry is of a type converting said received image data into binary edge data and generating respective local motion vectors descriptive of field-to-field change of said binary edge data in said local motion estimation areas; wherein said statistical variables descriptive of said local motion vectors include average correlation when matching patterns of said binary edge data of a current field and a previous field, maximum correlation when matching patterns of said binary edge data of the current field and the previous field, and a second maximum correlation corresponding to the most recent past maximum correlation; and wherein said comparator circuitry comprises:

a first comparator for comparing said respective average correlation value associated with each said local motion vector 1×nth a first threshold value and, when said average correlation value is smaller, determining that low image contrast causes said local motion vector associated with said respective average correlation value to be insufficiently reliable to be considered when generating a field notion vector;

a first subtracter for subtracting said respective average correlation value for each said local motion vector from a respective said maximum correlation value for the same said local motion vector to generate a first difference signal;

a second comparator for comparing said first difference signal with a second threshold value and, when said first difference signal is smaller than said second threshold value, determining that a moving object causes said local motion vector associated with said respective average correlation value to be insufficiently reliable Lo be considered when generating a field motion vector;

a second subtracter for subtracting a respective said second maximum correlation value associated with each said local motion vector from said respective maximum correlation value associated with the same said local motion vector to generate a second difference signal; and a third comparator for comparing said second difference signal with a third threshold value and, when said second difference signal is smaller than said third threshold value, determining that a repeated image causes said local motion vector associated with said respective maximum and second maximum correlation values to be insufficiently reliable to be considered when generating a field motion vector.

59. An image stabilization device as claimed in claim 55, wherein said compensated field motion vector generation circuitry comprises:

circuitry for generating a first error motion compensating value that decreases from a prescribed value dependent on increase in the magnitude of said accumulated motion vector when the magnitude of said accumulated motion vector is within a range between zero and a prescribed value at and beyond which said first error motion compensating value is zero-valued;

circuitry for generating a second error motion compensating value that decreases from a prescribed value dependent on increase in the magnitude of said average maximum correlation difference, when the magnitude of said average maximum correlation difference is within a range between zero and a prescribed value at and beyond which said second error motion compensating value is zero-valued;

averaging circuitry averaging said first error motion compensating value and said second error motion compensating value for generating an averaged motion compensating value; and controlled coring circuitry supplying said respective compensated field motion vector in cored response to said field motion vector supplied from said field motion vector generation circuitry for each of said successive fields, which cored response is zero-valued except when the magnitude of said field motion vector supplied from said field motion vector generation circuitry exceeds said averaged motion compensating value.

60. An image stabilization device as claimed in claim 59, wherein said controlled coring circuitry comprises:

a first subtracter for generating a first compensated accumulated motion vector by subtracting said averaged error motion compensating value from said accumulated motion vector;

a second subtracter for generating a second compensated accumulated motion vector by adding said averaged error motion compensating value and said accumulated motion vector;

a comparator for comparing said averaged error motion compensating value and the magnitude of said accumulated motion vector; and multiplexer circuitry arranged for providing a zero-value output signal as a revised value of said accumulated motion vector responsive to said comparator furnishing an indication that the magnitude of said accumulated motion vector is smaller than said averaged error motion compensating value, for selecting said first compensated accumulated motion vector as a revised value of said accumulated motion vector responsive to said comparator furnishing an indication that the magnitude of said accumulated motion vector is larger than said averaged error motion compensating value at a time said accumulated motion vector is positive, and for selecting said second compensated accumulated motion vector as a revised value of said accumulated motion vector responsive to said comparator furnishing an indication that the magnitude of said accumulated motion vector is larger than said averaged error motion compensating value at a time said accumulated motion vector is negative.

61. An image stabilization device having a memory for storing image data in fields, and a control portion for correcting motion of image data stored in said memory by a received accumulated motion vector, said image stabilization device comprising:

local motion vector generation circuitry receiving image data for predefined local motion estimation areas within each of successive fields and generating respective local motion vectors descriptive of field-to-field change of image data in said local motion estimation areas and respective statistical variables descriptive of said local motion vectors, said statistical variables including the respective isolativity of each of said local motion vectors from other local motion vectors within the same field determined by the magnitude of the result of differentially comparing that said local motion vector with the others of said local motion vectors for the same field period;

comparator circuitry for receiving ones of said statistical variables descriptive of said local motion vectors, other than the respective isolativity of each of said local motion vectors from other local motion vectors within the same field, and comparing said other statistical variables descriptive of each of said local motion vectors to threshold values for said other statistical variables for determining whether each of said local motion vectors is sufficiently reliable for consideration when generating a field motion vector or is insufficiently reliable for consideration when venerating a field motion vector:

field motion vector generator circuitry for receiving said local motion vectors and statistical variables, generating a respective isolation weight for each said local motion vector that is of decreased value with increased isolativity and is zero for isolativity beyond a predefined value, supplying a respective output weight signal that is zero-valued for each local motion vector determined to be insufficiently reliable for consideration when generating a field motion vector, and otherwise supplying a respective output weight signal generated for each local motion vector determined to be sufficiently reliable for consideration when generating a field motion vector, which respective output weight signal depends on the respective isolation weight for that said local motion vector, and generating a field motion vector for each of said successive fields by said local motion vectors within said field in accordance with their respective output weights;

compensated field motion vector generation circuitry, which said compensated field motion vector generation circuitry generates a respective compensated field motion vector in controlled cored response to each said field motion vector supplied by said field motion vector generator circuitry; and accumulation circuitry for generating a respective accumulated motion vector for each of said successive fields, said accumulation circuitry comprising an adder for generating a respective accumulated motion vector for each said successive field as the sum of the compensated field motion vector with an attenuated response to the accumulated motion vector for the previous field and attenuator circuitry for generating said attenuated response to the accumulated motion vector for the previous field, wherein said attenuator circuitry for generating said attenuated response to the accumulated motion vector for the previous field is of a controlled type, providing a less attenuated response responsive to a first condition of an attenuation control signal for said attenuator circuitry and providing a more attenuated response responsive to a second condition of said attenuation control signal for said attenuator circuitry;

a threshold detector for detecting when said received accumulated motion vector supplied to said control portion of said image stabilization device has more than a prescribed magnitude to generate a threshold detector output signal of a second logic sense, said threshold detector output signal otherwise being of a first logic sense; and logic circuitry responding to said threshold detector output signal being of said second logic sense for generating said second condition of said attenuation control signal and at least conditionally responding to said threshold detector output signal being of said first logic sense for generating said first condition of said attenuation control signal.

62. An image stabilization device as as set forth in claim 61 further comprising:

panning identification circuitry responding to said field motion vectors having been of substantially identical direction over at least a predetermined number of fields for generating an indication of intentional panning, which indication is supplied to said logic circuitry for conditioning said logic circuitry to generate said second condition of said attenuation control signal and not said first condition of said attenuation control signal.

63. An image stabilization device as set forth in claim 62; wherein said local motion vector generation circuitry is of a type generating said statistical variables so as to include, in addition to the respective isolativity of each of said local motion vectors and said other said statistical variables, the respective instability of each of said local motion vectors, as determined by the magnitude of the result of differentially comparing that said local motion vector with the field motion vector for the preceding field period; and wherein said field motion vector generator circuitry is of a type generating a respective stability weight for each said local motion vector that is of decreased value with increased instability, and supplying a respective output weight signal generated for each local motion vector determined to be sufficiently reliable for consideration when generating a field motion vector, which respective output weight signal depends both on the respective isolation weight and the respective stability weight for that said local motion vector.

64. An image stabilization device as set forth in claim 63; wherein said statistical variables descriptive of said local motion vectors include average correlation when matching patterns of said edge data of a current field and a previous field, maximum correlation when matching patterns of said edge data of the current field and the previous field, and a second maximum correlation corresponding to the most recent past maximum correlation; and wherein said comparator circuitry comprises:

a first comparator for comparing said respective average correlation value associated with each said local motion vector with a first threshold value and, when said average correlation value is smaller, determining that low image contrast causes said local motion vector associated with said respective average correlation value to be insufficiently reliable to be considered when generating a field motion vector;

a first subtracter for subtracting said respective average correlation value for each said local motion vector from a respective said maximum correlation value for the same said local motion vector to generate a first difference signal;

a second comparator for comparing said first difference signal with a second threshold value and, when said first difference signal is smaller than said second threshold value, determining that a moving object causes said local motion vector associated with said respective average correlation value to be insufficiently reliable to be considered when generating a field motion vector;

a second subtracter for subtracting a respective said second maximum correlation value associated with each said local motion vector from said respective maximum correlation value associated with the same said local motion vector to generate a second difference signal; and a third comparator for comparing said second difference signal with a third threshold value and, when said second difference signal is smaller than said third threshold value, determining that a repeated image causes said local motion vector associated with said respective maximum and second maximum correlation values to be insufficiently reliable to be considered when generating a field motion vector.

65. An image stabilization device as set forth in claim 63, wherein the respective output weight signal generated for each local motion vector determined to be sufficiently reliable for consideration when generating a field motion vector, depends on a summation of the respective isolation weight and the respective stability weight for that said local motion vector, rather than on a product of the respective isolation weight and the respective stability weight for that said local motion vector.

66. An image stabilization device as set forth in claim 64, wherein the respective output weight signal generated for each local motion vector determined to be sufficiently reliable for consideration when generating a field motion vector, depends on a summation of the respective isolation weight and the respective stability weight for that said local motion vector, rather than on a product of the respective isolation weight and the respective stability weight for that said local motion vector.

67. An adaptive motion vector decision method for a digital image stabilization system having a memory for storing image data in fields, and a control portion for correcting motion of image data stored in said memory by a received accumulated motion vector, comprising the steps of:

determining, from said received image data as fall in each field into local motion estimation areas, respective local motion vectors and statistical variables descriptive of said local motion vectors;

determining a respective field motion vector for each field from said local motion vectors and statistical variables descriptive of said local motion vectors;

determining when field motion vectors have been of substantially identical direction over at least a predetermined number of fields;

determining when the magnitude of said received accumulated motion vector exceeds a prescribed threshold value; and generating said accumulated motion vector, by substeps of:

selecting a first gain factor of about 0.995 except when said received accumulated motion vector exceeds said prescribed threshold value or field motion vectors have been of substantially identical direction over at least a predetermined number of fields, selecting a second gain factor of about 0.97 when said received accumulated motion vector exceeds said prescribed threshold value or said field motion vectors have been of substantially identical direction over at least said predetermined number of fields, attenuating a previous accumulated motion vector, so as to result in its being multiplied by the selected one of said first and second gain factors, and adding said attenuated previous accumulated motion vector and said field motion vector to obtain said accumulated motion vector.

68. An adaptive motion vector decision method for a digital image stabilization system having a memory for storing image data in fields, and a control portion for correcting motion of image data stored in said memory by a received accumulated motion vector, comprising the steps of:

determining, from said received image data as fall in each field into local motion estimation areas, respective local motion vectors and statistical variables descriptive of said local motion vectors;

determining from the corresponding statistical variables for each of said local motion vectors whether said image data in the local motion estimation area generating that said local motion vector was of irregular condition, as would cause that said local motion vector to be insufficiently reliable for consideration when generating a field motion vector, or was of regular condition, as would cause that said local motion vector to be insufficiently reliable for consideration when generating a field motion vector;

generating a weight signal dependent on isolativity and stability for each of said local motion vectors determined to be generated from image data of regular condition, but generating a zero-valued weight signal for each of said local motion vectors determined to be generated from image data of irregular condition the step for venerating said weight signal dependent on isolativity and stability for each of said local motion vectors determined to be generated from image data of regular condition being performed by additive rather than multiplicative processing;

performing a weighted averaging of said local motion vectors within each field for generating a respective field motion vector; and generating said accumulated motion vector, by substeps of:

attenuating a previous accumulated motion vector, so as to result in its being multiplied by a predefined factor, and adding said attenuated previous accumulated motion vector and said field motion vector to obtain said accumulated motion vector.

69. An adaptive motion vector decision method for a digital image stabilization system having a memory for storing image data in fields, and a control portion for correcting motion of image data stored in said memory by a received accumulated motion vector, comprising the steps of:

determining, from said received image data as fall in each field into local motion estimation areas, respective local motion vectors and statistical variables descriptive of said local motion vectors;

determining from the corresponding statistical variables for each of said local motion vectors whether said image data in the local motion estimation area generating that said local motion vector was of irregular condition, as would cause that said local motion vector to be insufficiently reliable for consideration when generating a field motion vector, or was of regular condition, as would cause that said local motion vector to be insufficiently reliable for consideration when generating a field motion vector;

generating a weight signal dependent on isolativity and stability for each of said local motion vectors determined to be generated from image data of regular condition, but generating a zero-valued weight signal for each of said local motion vectors determined to be generated from image data of irregular condition the step for generating said weight signal dependent on isolativity and stability for each of said local motion vectors determined to be generated from image data of regular condition being performed by additive rather than multiplicative processing;

performing a weighted averaging of said local motion vectors within each field for generating a respective field motion vector;

coring said field motion vector; and generating said accumulated motion vector, by substeps of:

attenuating a previous accumulated motion vector, so as to result in its being multiplied by a predefined factor, and adding said attenuated previous accumulated motion vector and said cored field motion vector to obtain said accumulated motion vector.

70. An image stabilization device having a memory for storing image data in fields, and a control portion for correcting motion of image data stored in said memory by a received accumulated motion vector, comprising:

local motion vector generation means for receiving image data, converting said received image data into binary edge data, sequentially generating correlation data in local motion estimation areas by matching patterns of said edge data of current field and previous field, and sequentially generating local motion vectors of said corresponding local motion estimation areas and respective statistical variables descriptive of said local motion vectors by analyzing said generated correlation data, said statistical variables including the respective isolativity and the respective instability of each of said local motion vectors;

field motion vector generation means for receiving and sequentially storing said local motion vectors and statistical variables, generating a respective isolation weight for each of said stored local motion vectors inversely related to its respective isolativity over a range and zero-valued for larger isolativity values, generating a respective stability weight for each of said stored local motion vectors inversely related to its respective instability, and generating a respective field motion vector from a weighted average of said local motion vectors with each field, with each local motion vector being weighted by a result of additively mixing its respective isolation and stability weights;

compensated field motion vector generation means for receiving said field motion vector and a previous accumulated motion vector, generating an error motion compensating value responsive to the magnitude of said previous accumulated motion vector, and generating said compensated field motion vector by coring said field motion vector, so as to reduce said compensated field motion vector to zero whenever the amplitude of said field motion vector is smaller than said error motion compensating value; and accumulated motion vector generation means for receiving said compensated field motion vector and generating said accumulated motion vector by accumulating said received compensated field motion vector into said previous accumulated motion vector as attenuated by attenuator means included within said accumulated motion vector generation means—wherein said local motion vector generation means comprises:

edge detection means for receiving said image data and converting field image into binary edge data by analyzing said received image data;

storage means for temporarily storing said binary edge data for at least selected pixels in each of at least two local motion estimation areas, for receiving said binary edge data for each of said local motion estimation areas and storing that data until at least a next succeeding field;

edge pattern matching means for receiving binary edge data of current field supplied from said edge detection means as compared data and binary edge data of a previous field supplied from said storage means as reference data, and matching patterns of said two block data, thereby sequentially generating correlation data of corresponding local motion estimation areas; and local motion vector estimation means for receiving said correlation data, and comparing said correlation data received from corresponding local motion estimation area with previous statistical variables detected in corresponding local motion estimation area, thereby generating a state of changed correlation data as statistical variables and at the same time, generating a position value of maximum correlation as a local motion vector of corresponding local motion estimation area—and wherein said local motion vector estimation means comprises:

comparing means for comparing said received correlation data with a previous maximum correlation value of corresponding local motion estimation area, thereby generating a first comparing signal when said correlation data is larger;

local motion vector detection means for receiving address clocks and an output of said comparing means, generating a position value of said received correlation data by counting said address clocks, and generating a position value of said received correlation data as a local motion vector of corresponding local motion estimation area when said first comparing signal is received; and means for generating said statistical variables of corresponding local motion estimation area, which means comprises:

maximum correlation generation means for receiving said received correlation data and an output of comparing means and generating said received correlation data as a maximum correlation value when said first comparing signal is received;

means for receiving outputs of said maximum correlation generation means and said comparing means and generating a previous maximum correlation value as a second maximum correlation value when said first comparing signal is received;

means for receiving said maximum correlation value and said second maximum correlation value and generating a maximum correlation difference by subtracting said second maximum correlation value from said maximum correlation value; and means for generating an average correlation value by adding said received correlation data into previous correlation data and dividing added correlation data by a number of motion vector candidates.

* * * * *